US009461764B2

(12) United States Patent
Calderon et al.

(10) Patent No.: US 9,461,764 B2
(45) Date of Patent: Oct. 4, 2016

(54) APPARATUS AND METHOD FOR COMMUNICATING DATA OVER A COMMUNICATION CHANNEL

(71) Applicant: CORTINA SYSTEMS, INC., Sunnyvale, CA (US)

(72) Inventors: Juan-Carlos Calderon, Fremont, CA (US); Jean-Michel Caia, Plymouth, CA (US); Arash Farhoodfar, Sunnyvale, CA (US); Arun Zarabi, Sacramento, CA (US); Michael Miller, Raleigh, NC (US)

(73) Assignee: CORTINA SYSTEMS, INC., Sunnyvale, CA (US)

( * ) Notice: Subject to any disclaimer, the term of this patent is extended or adjusted under 35 U.S.C. 154(b) by 25 days.

(21) Appl. No.: 14/295,054

(22) Filed: Jun. 3, 2014

(65) Prior Publication Data

US 2015/0003827 A1 Jan. 1, 2015

Related U.S. Application Data

(60) Provisional application No. 61/841,703, filed on Jul. 1, 2013.

(51) Int. Cl.
*H04J 3/16* (2006.01)
*H04B 10/00* (2013.01)
(Continued)

(52) U.S. Cl.
CPC ........... *H04J 3/1652* (2013.01); *H04B 10/516* (2013.01); *H04L 25/14* (2013.01); *H04J 3/0691* (2013.01); *H04J 2203/0001* (2013.01); *H04J 2203/0003* (2013.01)

(58) Field of Classification Search
CPC . H04B 10/25–10/2507; H04B 10/27–10/278; H04B 10/50; H04B 10/516; H04B 10/5161; H04B 10/60; H04J 3/1611; H04J 3/1652; H04J 3/1664; H04J 2203/0001; H04J 2203/0003
USPC ....... 398/43, 45–79, 89, 140, 182, 183, 201, 398/202, 212
See application file for complete search history.

(56) References Cited

U.S. PATENT DOCUMENTS 7,362,779 B1 * 4/2008 Zabezhinsky .......... H04J 3/1611 370/512
8,045,863 B2 * 10/2011 Meagher ................ H04J 3/047 370/356

(Continued)

OTHER PUBLICATIONS

Matharu: "100 G Dual Gearbox: Improving Port Density on Line Cards in Core Network Equipment" White Paper: Virtex-7 HT FPGAs, Mar. 1, 2012.*

(Continued)

*Primary Examiner* — Li Liu
(74) *Attorney, Agent, or Firm* — Amin, Turocy & Watson, LLP

(57) ABSTRACT

Provided is an apparatus and method for transmitting data over a communication channel having at least one physical lane for transmitting data. The apparatus includes, for each physical lane, allocation circuitry configured for allocating data in logical lanes corresponding to the physical lane. The apparatus also includes, for each physical lane, a multiplexer configured for bit-interleaving the data from the logical lanes corresponding to the physical lane into interleaved data for transmission over the physical lane. In accordance with an embodiment of the present disclosure, for each physical lane, the allocation circuitry is configured for allocating the data such that the interleaved data for transmission over the physical lane has clusters of sequential bits of the same symbol. Thus, upon transmission and reception by a receiver, any correlated errors affecting sequential bits may affect fewer symbols. Also provided is an apparatus and method for receiving data in a complementary manner.

26 Claims, 16 Drawing Sheets

100
OTN Framer Device 111
Connector
OTN backplane 130
Connector
OTN Framer or Switch Device 121
First OTN Card 110
Second OTN Card 120

(51) Int. Cl.
*H04B 10/516* (2013.01)
*H04L 25/14* (2006.01)
*H04J 3/06* (2006.01)

(56) References Cited

U.S. PATENT DOCUMENTS

| | | | | |
|---|---|---|---|---|
| 8,165,176 | B1 * | 4/2012 | Lo | H04L 1/0079 370/503 |
| 8,270,422 | B2 * | 9/2012 | Yin | H04J 3/0688 370/412 |
| 8,331,793 | B2 * | 12/2012 | Takeuchi | H04J 3/1652 398/140 |
| 8,601,340 | B2 * | 12/2013 | Farhoodfar | H03M 13/2707 714/752 |
| 8,705,570 | B2 * | 4/2014 | Uchida | H04J 3/14 370/393 |
| 8,705,974 | B2 * | 4/2014 | Koganei | H04J 3/1652 398/136 |
| 8,910,016 | B2 * | 12/2014 | Farhoodfar | H03M 13/2707 714/752 |
| 9,071,364 | B1 * | 6/2015 | Voois | H04B 10/58 |
| 2009/0169217 | A1 * | 7/2009 | Meagher | H04J 3/047 398/140 |
| 2009/0324215 | A1 * | 12/2009 | Yin | H04J 3/0688 398/2 |
| 2010/0158518 | A1 * | 6/2010 | Shin | H04J 3/0605 398/45 |
| 2010/0215060 | A1 * | 8/2010 | Haas | H04L 25/49 370/509 |
| 2010/0281343 | A1 * | 11/2010 | Caggioni | H03M 13/05 714/776 |
| 2010/0322630 | A1 * | 12/2010 | Takeuchi | H04J 3/1652 398/65 |
| 2011/0123196 | A1 * | 5/2011 | Ye | H04J 3/1652 398/66 |
| 2011/0150468 | A1 * | 6/2011 | Uchida | H04J 3/14 398/45 |
| 2012/0219282 | A1 * | 8/2012 | Koganei | H04J 3/1652 398/1 |
| 2013/0177309 | A1 * | 7/2013 | El-Ahmadi | H04B 10/40 398/25 |
| 2013/0259478 | A1 * | 10/2013 | Komaki | H04B 10/516 398/58 |
| 2014/0226981 | A1 * | 8/2014 | Kuwabara | H04J 3/1652 398/65 |
| 2015/0132012 | A1 * | 5/2015 | Furukawa | H04L 25/14 398/154 |

OTHER PUBLICATIONS

International Telecommunications Union, ITU-T G.709/Y.1331 (Feb. 2012), Telecommunication Standardization Sector of ITU, Series G: Transmission Systems and Media, Digital Systems and Networks, Digital terminal equipments—General, Series Y: Global Information Infrastructure, Internet Protocol Aspects and Next-Generation Networks, Internet protocol aspects—Transport, Interfaces for the optical transport network, pp. 1-240.

COAST-OHI-2013-041, Interaction between GFEC and OTL4.10/OTL4.4, Cortina Systems, Abstract, Vancouver, BC; Jun. 11-13, 2013, pp. 1-8.

IEEE P 802.3/D3.2 , Draft Standard for Ethernet, May 22, 2012, pp. 1-400, United States.

* cited by examiner

| | 1 | | | | | 4080 |
|---|---|---|---|---|---|---|
| 1 | 1:16 (FAS) | 17:32 | 33:48 | 49:64 | ... | 4065:4080 |
| 2 | 4081:4096 | 4097:5012 | 5013:5028 | 5029:5044 | | 9145:9160 |
| 3 | 9161:9176 | 9177:9192 | 9193:9208 | 9209:9224 | | 12225:12240 |
| 4 | 12241:12256 | 12257:12272 | 12273:12288 | 12289:13304 | | 16305:16320 |

FIG. 2

| | 1 16 | 17 | | | | 4080 |
|---|---|---|---|---|---|---|
| 1 | 16B group #0 | #1 | #2 | #3 | ... | #254 |
| 2 | #255 | #256 | #257 | #258 | | #509 |
| 3 | #510 | #511 | #512 | #513 | | #764 |
| 4 | #765 | #766 | #767 | #768 | | 16B group #1019 |

FIG. 3

G = 0, 20, 40, ... , 1000
G
G+1
G+2
G+3
G+4
G+5
G+6
G+7
G+8
G+9
G+10
G+11
G+12
G+13
G+14
G+15
G+16
G+17
G+18
G+19
16B
LANE ROTATION
(example for LLM=1)
LLM
LLM
G
Allocation Circuitry
405
Allocation Circuitry
406
Allocation Circuitry
407
Allocation Circuitry
408
LL #0
LL #1
LL #2
LL #3
LL #4
LL #5
LL #6
LL #7
LL #8
LL #9
LL #10
LL #11
LL #12
LL #13
LL #14
LL #15
LL #16
LL #17
LL #18
LL #19
5:1 mux
80B
28G Lane
0
28G Lane
1
28G Lane
2
28G Lane
3
401
402
403
404
11-1
11-2
11-3

G = 0, 20, 40, ..., 1000
G
G+1
G+2
G+3
G+4
G+5
G+6
G+7
G+8
G+9
G+10
G+11
G+12
G+13
G+14
G+15
G+16
G+17
G+18
G+19
16B
LANE ROTATION
(example for LLM=1)
LLM
Allocation Circuitry 409
Allocation Circuitry 410
Allocation Circuitry 411
Allocation Circuitry 412
LLM G
LL #0
LL #1
LL #2
LL #3
LL #4
LL #5
LL #6
LL #7
LL #8
LL #9
LL #10
LL #11
LL #12
LL #13
LL #14
LL #15
LL #16
LL #17
LL #18
LL #19
5:1 mux
80B
28G Lane #0
28G Lane #1
28G Lane #2
28G Lane #3
401
402
403
404
14-1
14-2
14-3

APPARATUS AND METHOD FOR COMMUNICATING DATA OVER A COMMUNICATION CHANNEL

RELATED APPLICATION

This application claims priority from U.S. Provisional Patent Application Ser. No. 61/841,703 filed Jul. 1, 2013, the entire disclosure of which is incorporated by reference.

FIELD OF THE DISCLOSURE

The present disclosure relates to communication systems, and more particularly to communicating data over a communication channel.

BACKGROUND

A transmitter can transmit a signal to a receiver over a communication channel such as a backplane. The signal can encode various data. If the communication channel is not perfect, then the signal received by the receiver may not be identical to the signal transited by the transmitter. For instance, the communication channel may have introduced noise into the signal. If the signal received by the receiver is distorted enough by the communication channel, then the data may not be recoverable by the receiver.

BRIEF DESCRIPTION OF THE DRAWINGS

Embodiments of the present disclosure will now be described with reference to the attached drawings in which:

FIG. 2 is an example OTN frame that may be communicated between the OTN cards shown in FIG. 1;

FIG. 3 is an alternative representation of the example OTN frame shown in FIG. 2;

DETAILED DESCRIPTION OF EMBODIMENTS

Figure 1:
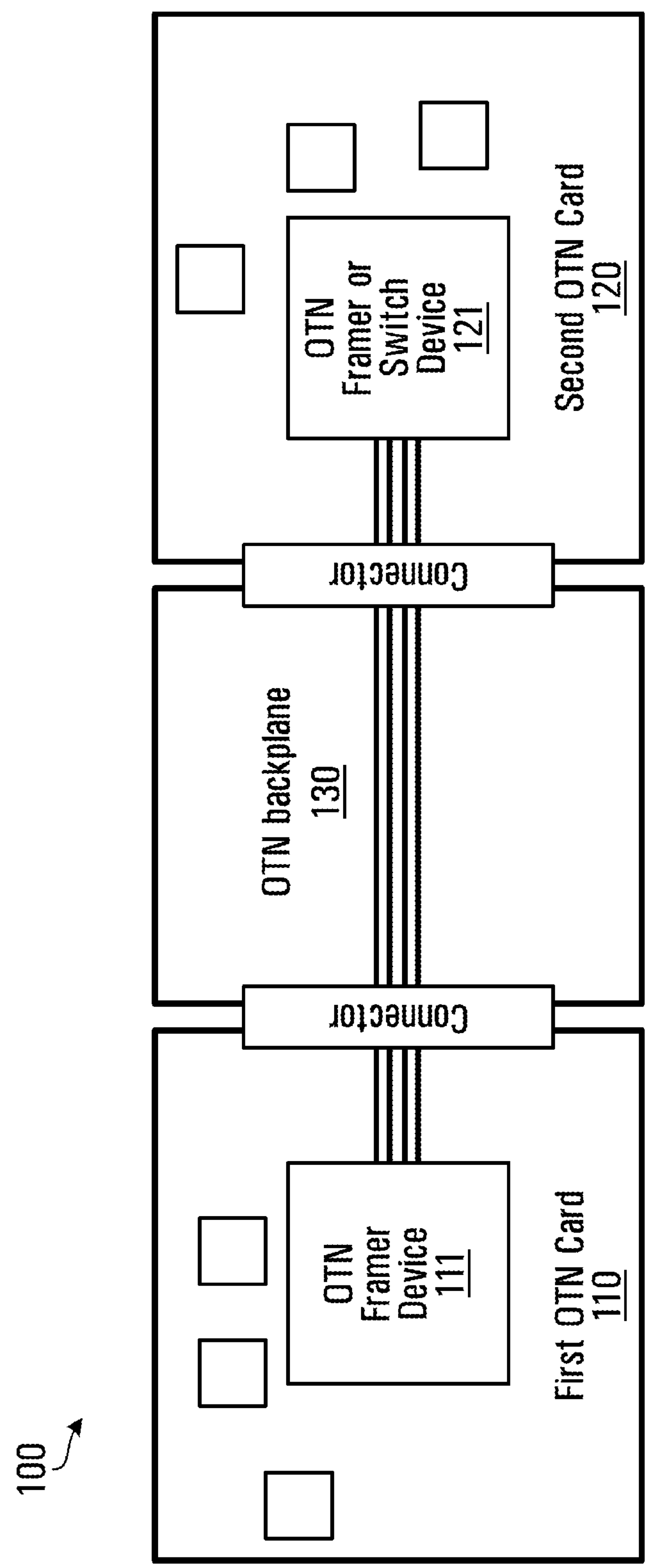
FIG. 1 is a block diagram of an OTN (Optical Transport Network) system having first and second OTN cards connected via an OTN backplane.

It should be understood at the outset that although illustrative implementations of one or more embodiments of the present disclosure are provided below, the disclosed systems and/or methods may be implemented using any number of techniques, whether currently known or in existence. The present disclosure should in no way be limited to the illustrative implementations, drawings, and techniques illustrated below, including the exemplary designs and implementations illustrated and described herein, but may be modified within the scope of the appended claims along with their full scope of equivalents.

This disclosure is related to communication systems involving transmission of OTN frames over a communication channel having multiple (optical or electrical) parallel lanes. In other words, this disclosure is related to communication over fiber optics (OTN optical modules) and/or communication over electrical/optical backplanes (OTN backplanes). Some examples include:

- Transmission of OTN frames over optical fiber: line cards on OTN cross-connects, traditional DWDM platforms (transponder/muxponder/ADM), switch/routers, etc.
- Transmission of OTN frames over backplanes used to interconnect OTN line cards to OTN line cards (transponder, muxponder, ADM, . . . ), or to interconnect OTN line cards to OTN switches (OTN cross-connects).

Provided is an apparatus and method for transmitting data over a communication channel having at least one physical lane for transmitting data. The apparatus includes, for each physical lane, allocation circuitry configured for allocating data in logical lanes corresponding to the physical lane. The apparatus also includes, for each physical lane, a multiplexer configured for bit-interleaving the data from the logical lanes corresponding to the physical lane into interleaved data for transmission over the physical lane. In accordance with an embodiment of the present disclosure, for each physical lane, the allocation circuitry is configured for allocating the data such that the interleaved data for transmission over the physical lane has clusters of sequential bits of the same symbol. Thus, upon transmission and reception by a receiver, any correlated errors affecting sequential bits may affect fewer symbols. Also provided is an apparatus and method for receiving data in a complementary manner.

Also provided is an apparatus and method for transmitting data over a communication channel having at least one physical lane for transmitting data. The apparatus includes, for each physical lane, allocation circuitry configured for allocating data in logical lanes corresponding to the physical lane. The apparatus also includes, for each physical lane, a multiplexer configured for bit-interleaving the data from the logical lanes corresponding to the physical lane into interleaved data for transmission over the physical lane. In accordance with an embodiment of the present disclosure, for each physical lane, the allocation circuitry is configured for mixing data portions without mixing any data portion containing FAS information. Thus, a receiver looking to find the FAS information in a data reception can find the FAS information in the same place that the FAS information would be expected had the allocation step not been executed. Also provided is an apparatus and method for receiving data in a complementary manner.

Other aspects and features of the present disclosure will become apparent, to those ordinarily skilled in the art, upon review of the following description of the specific embodiments of the invention.

Introduction

Referring first to FIG. 1, shown is a block diagram of an OTN system 100 having first and second OTN cards 110,120 connected via an OTN backplane 130. This includes (but is not limited to) the connection of two OTN line cards (transponder, muxponder or ADM applications) or the connection of an OTN line card to an OTN switch card (OTN cross-connect application). Each OTN card 110,120 has an OTN framer device 111,121 or a switch device 121 as shown in the illustrated example. As an alternative to the switch device 121, there may be an FPGA (Field Programmable Gate Array) and/or other circuitry not specially shown. The block diagram of FIG. 1 is a simplified and generalized view of an OTN DWDM (Dense Wavelength Division Multiplexing) system and is applicable to many different applications: transponder or muxponder applications (e.g. both of the OTN cards 110,120 are OTN line cards interconnected through the OTN backplane 130), optical transmission (e.g. the first OTN card 110 on the left contains the OTN framer device 111 and the OTN card 121 on the right contains circuitry for optics), or even an OTN cross-connect (e.g. the first OTN card 110 on the left is an OTN line card and the second OTN card 120 on the right is an OTN switch card having the switch device 121).

Each OTN framer device 111,121 (or switch device, FPGA, other circuitry, etc.) is configured to generate OTN frames, which can be transmitted across the backplane 130 thereby enabling communication between the OTN cards 110,120. One OTN framer device 111 can operate as a transmitter (i.e. encoding an FEC) with the other OTN framer device 121 operating as a receiver (i.e. decoding the FEC). Note that both OTN framer devices 111,121 may be capable of operating as a transmitter and a receiver. In some implementations, both OTN framer devices 111,121 contain high-speed interfaces (e.g. analog design) to serialize information at high speed rates (e.g. ~28 Gbps). In some implementations, the OTN framer devices have a DFE (Decision Feedback Equalizer) that can be used to implement the high-speed interface for receiving data.

Referring now to FIG. 2, shown is an example OTN frame that may be communicated between the OTN cards 110,120 shown in FIG. 1. In some implementations, the OTN frame is an OTUk (Optical channel Transport Unit[1]) frame as standardized by ITU (International Telecommunication Union) in G.709/Y.1331 (February 2012) Interfaces for the optical transport network, which is incorporated by reference in its entirety and hereinafter referred to as "ITU G.709". Alternatively, the OTN frame may adhere to some other standard.

[1] k (=1, 2, 3, 4) indicates rate (e.g. OTU1=10 Gbps, OTU2=10 Gbps, OTU3=40 Gbps, OTU4=100 Gbps)

In specific implementations, the OTN frame is an OTU4 frame that is organized in 1020 16-byte groups. The first 16-byte group includes FAS (frame alignment signal) information, which includes information pertaining to alignment of the OTN frame. The first-byte group may also include MFAS (multi-frame alignment signal) information, which includes information pertaining to alignment of multiple OTN frames. The remaining 16-byte groups include data payload and may also include parity for FEC (Forward Error Correction) purposes. Specific details are provided in Annex C of ITU G.709.

Referring now to FIG. 3, shown is an alternative representation of the example OTN frame shown in FIG. 2. This OTN frame is identical to the one shown in FIG. 2, but the 1020 16-byte groups have been labelled as groups 0 through 1019. FIG. 3 indicates that each OTN frame has 1020 16-byte groups.

One or more OTN frames may be transmitted and/or received over the OTN backplane 130 shown in FIG. 1. In this disclosure, many of the examples assume that the OTN backplane 130 includes four 28 G physical lanes for transmitting OTN frames and four 28 G physical lanes for receiving OTN frames. However, other OTN backplanes are possible in which there may be a different number of physical lanes and/or the physical lanes may be rated to a speed other than 28 G. The manner in which OTN frames may be transmitted over the OTN backplane 130 will be described below with reference to FIGS. 4 through 16.

OTL4.4 for Transmitting OTN Frames

Figure 4:
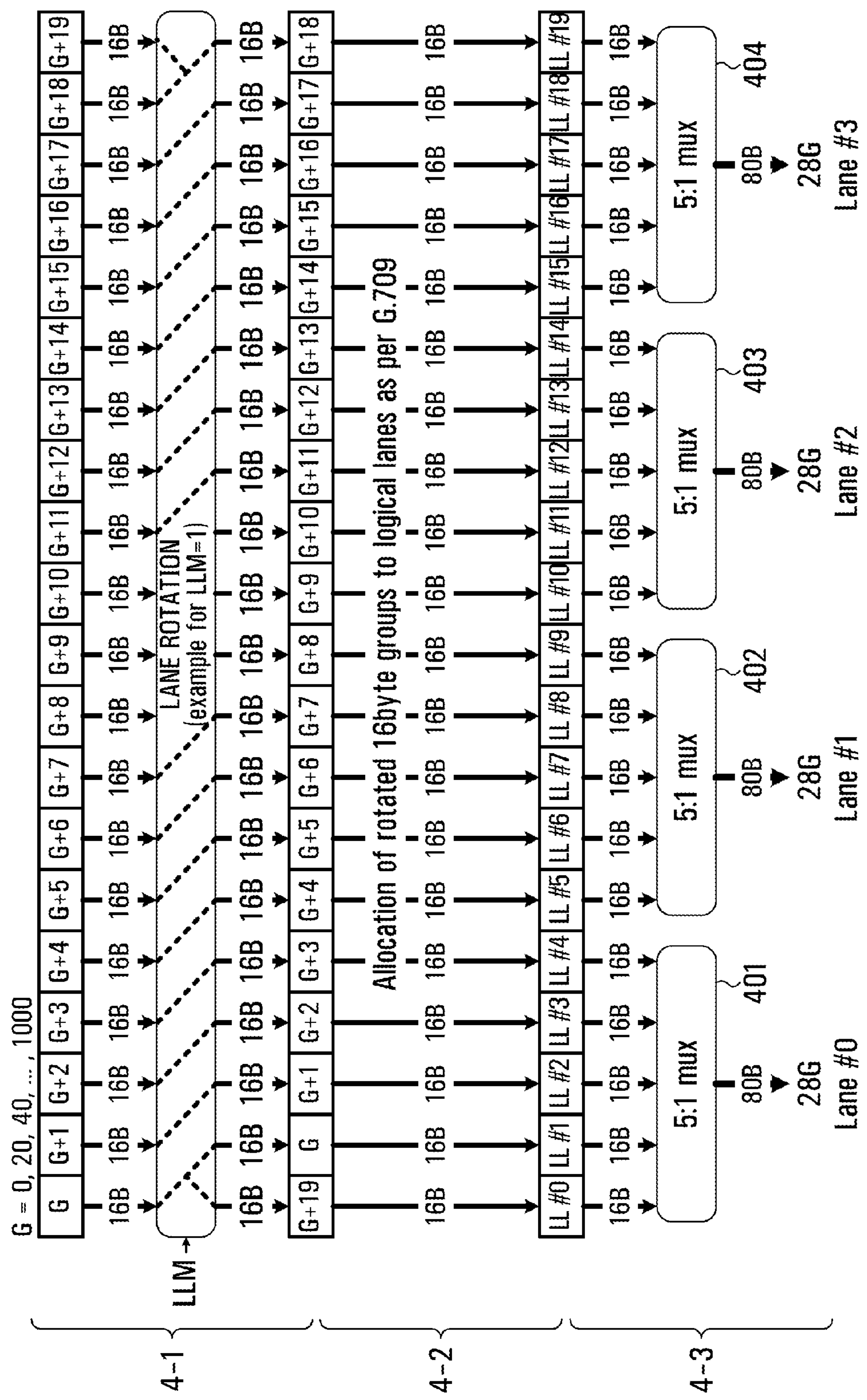
FIG. 4 is a functional diagram of an example OTL4.4 (Optical Channel Transport Lane) for transmitting OTN frames.

FIG. 4 is a functional diagram of an example OTL4.4 (Optical Channel Transport Lane) for transmitting OTN frames. Each OTN frame is subjected to various processing prior to being transmitted over 28 G physical lanes. By way of overview, this processing includes distributing 4-1 the 16-byte groups into logical lanes, allocating 4-2 the 16-byte groups in the logical lanes, and interleaving 4-3 the 16-byte groups from the logical lanes into the 28 G physical lanes. Such processing will be described in further detail below.

At step 4-1, each 16-byte group is distributed, round robin, to each of a plurality of logical lanes. In the illustrated example, it is assumed that there are 20 logical lanes. However, other implementations are possible in which there may be a different number of logical lanes. For 28 G physical lanes, the logical lanes are 5.6 G logical lanes. Since each frame has 1020 16-byte groups and there are 20 logical lanes, there will be 51 16-byte groups distributed to each logical lane.

In some implementations, step 4-1 includes lane rotation as shown in FIG. 4. Logical lane assignments are rotated on each frame boundary. Thus, sequential frames differ in terms of how the 16-byte groups are distributed. In some implementations, for each frame, the third OA2 byte position (i.e. sixth byte position in the frame) is used to carry an LLM (Logical Lane Marker), which indicates how the 16-byte groups of the frame have been distributed. The LLM increments on successive frames, from 0 to 239, but since there are only 20 logical lanes, there are only 20 unique distributions as summarised in Table 1 below. The logical lane number is recovered from the third OA2 value by a "modulo 20" operation.

TABLE 1

| Logical lane rotation assignments | | | | | |
|---|---|---|---|---|---|
| LLM MOD 20 | Lane 0 | Lane 1 | . . . | Lane 18 | Lane 19 |
| 0 | 1:16 | 17:32 | | 289:304 | 305:320 |
| 1 | 305:320 | 1:16 | | 273:288 | 289:304 |
| . | | | | | |
| . | | | | | |
| . | | | | | |
| 18 | 33:48 | 49:64 | | 1:16 | 17:32 |
| 19 | 17:32 | 33:48 | | 305:320 | 1:16 |

Figure 5:
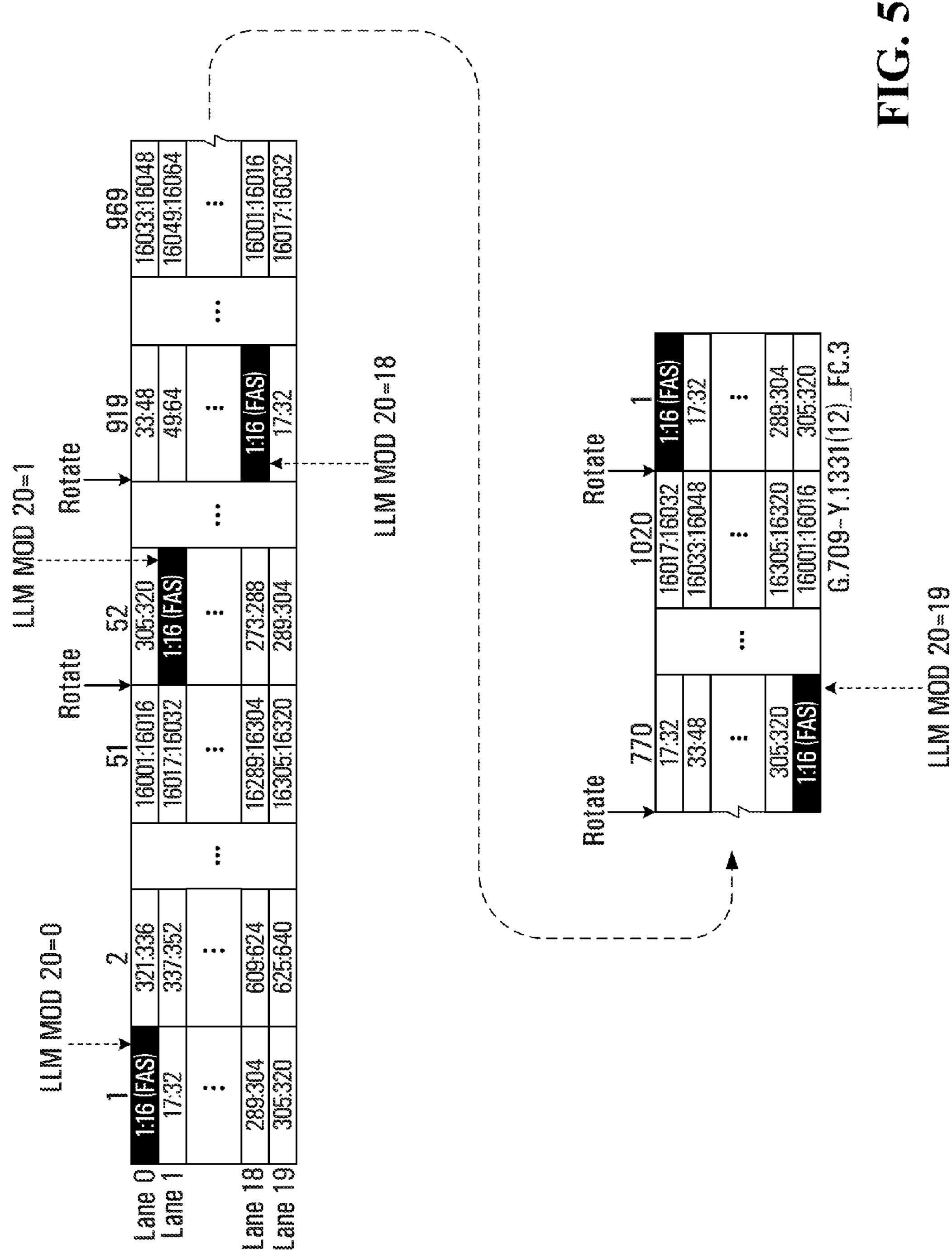
FIG. 5 is a schematic showing, for the OTL4.4 of FIG. 4, how lane assignments are rotated on each frame boundary.

Referring momentarily to FIG. 5, shown is a schematic illustrating, for the OTL4.4 of FIG. 4, how logical lane assignments are rotated on each frame boundary. Note that for sequential frames, the first 16-byte group containing the FAS (and possibly MFAS) information is in a different logical lane. For example, the first 16-byte group of the first frame is placed in logical lane 0 (i.e. no logical lane rotation with LLM MOD 20=0) while the first 16-byte group of the second frame is placed in logical lane 1 (i.e. logical lane rotation with LLM MOD 20=1). For each frame, the other 16-byte groups are also distributed accordingly as shown in FIG. 5.

Note that the lane rotation described above with reference to FIGS. 4 and 5 is very specific for exemplary purposes only. Other lane rotations are possible and are within the scope of this disclosure. In alternative implementations, step 4-1 does not include any lane rotation.

Referring back to FIG. 4, after distributing 4-1 the 16-byte groups into logical lanes, there is a step of allocating 4-2 the 16-byte groups in the logical lanes. According to this example, the allocation is merely one to one. However, embodiments of this disclosure cover allocations that are not one to one. Examples of this will be described later with reference to FIGS. 11 through 16.

After allocating 4-2 the 16-byte groups in the logical lanes, there is a step of interleaving 4-3 the 16-byte groups from the logical lanes into the 28 G physical lanes. In the illustrated example, such interleaving is accomplished using four multiplexers 401,402,403,404. Each multiplexer 401, 402,403,404 performs bit-interleaving of data from five logical lanes. While the interleaving is accomplished using four multiplexers 401,402,403,404, other implementations are possible in which there may be a different number of multiplexers.

In some implementations, the data provided to the OTL4.4 of FIG. 4 has been coded using an FEC scheme such as Reed Solomon. Such FEC coding may help to address any subsequent errors in data transmission over the physical lanes. Subsequent details of resulting codeword and symbol allocation into a 28 G physical lane for the OTL4.4 of FIG. 4 and for additional OTLs described later are provided below for the case of Reed Solomon coded data. However, it is to be understood that other FEC schemes (e.g. Golay, BCH, Multidimensional parity, Hamming codes, etc.) are possible and are within the scope of the disclosure. Alternative implementations may entail no FEC scheme at all.

Figure 6:
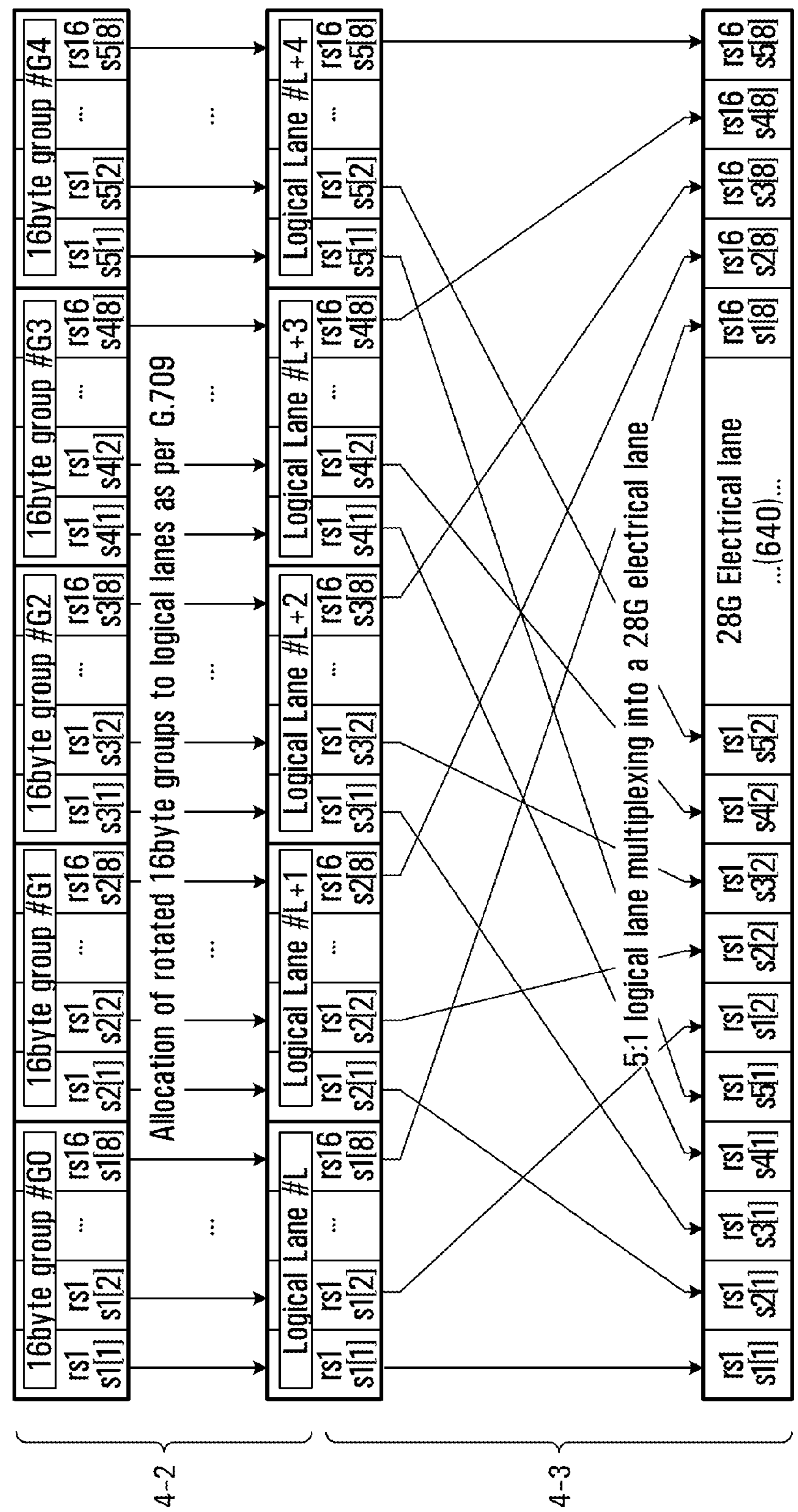
FIG. 6 is a schematic illustrating, for the OTL4.4 of FIG. 4, resulting codeword (rs1-rs16) and symbol (s1[1:8]-s255[1:8]) allocation into a 28 G physical lane.

Referring now to FIG. 6, shown is a schematic illustrating, for the OTL4.4 of FIG. 4, resulting codeword (rs1-rs16) and symbol (s1[1:8]-s255[1:8]) allocation into a 28 G physical lane. The allocation 4-2 and bit-interleaving 4-3 is shown in FIG. 6 for only one multiplexer for the case of five 16-byte groups. Each 16-byte group has 128 bits, which are allocated into logical lanes with no logical lane rotation in this example (i.e. LLM MOD 20=0). As similarly shown in FIG. 4, the 16-byte groups are allocated 4-2 in the logical lanes in a one to one manner. The multiplexer performs bit-interleaving 4-3 so that bits are taken from each logical lane in round robin. Thus, the transmission on the 28 G physical lane includes a bit from the first logical lane (i.e. rs1 s1[1]), then a bit from the second logical lane (i.e. rs1 s2[1]), then a bit from the third logical lane (i.e. rs1 s3[1]), etc. After a bit is taken from the fifth logical lane (i.e. rs1 s5[1]), a bit is then taken from the first logical lane (i.e. rs1 s1[2]), and this interleaving continues until all bits of the five 16-byte groups have been transmitted.

Figure 7:
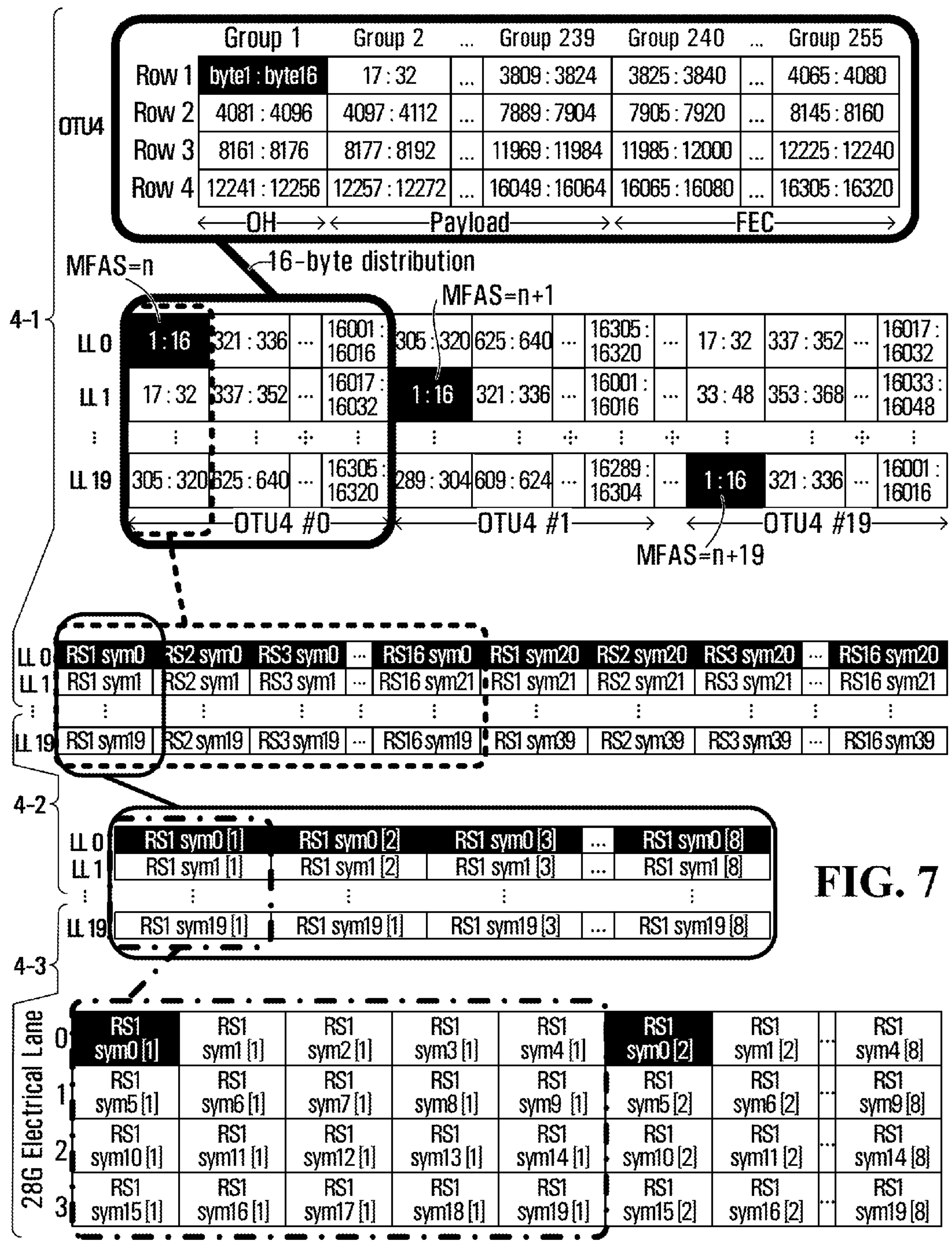
FIG. 7 is a schematic illustrating, for the OTL4.4 of FIG. 4, resulting codeword (rs1-rs16) and symbol (s1[1:8]-s255[1:8]) allocation into four 28 G physical lanes.

Referring now to FIG. 7, shown is a schematic illustrating, for the OTL4.4, of FIG. 4, resulting codeword (rs1-rs16) and symbol (s1[1:8]-s255[1:8]) allocation into four 28 G physical lanes. This schematic differs from the schematic in FIG. 6 primarily in that the bit-interleaving is shown for all four multiplexers (i.e. bit-interleaving is shown for all four 28 G physical lanes). The schematic shows the distributing 4-1, allocating 4-2 and bit-interleaving 4-3 steps previously described. Since these steps as the same as those previously described, no further description is provided here.

As previously described, data is transmitted by the OTL4.4 over the 28 G physical lanes for reception by an OTN framer device or a switch device as shown in FIG. 1. Upon reception, the data is processed in a manner that is complementary to the logical lane assignment and bit interleaving described earlier. In other words, upon reception of the data, there is bit de-interleaving using de-multiplexers, and frame(s) are recovered from logical lanes. In some implementations, the receiver implements the following process:

(1) De-interleave each 28 G physical lane into five 5.6 G logical lanes.

(2) Identify each logical lane (who is who?) by using the LLM information.

(3) Deskew and reorder the logical lanes so the original OTU4 frame can be properly reassembled.

Further details of how data is received can be found in ITU G.709.

Optical transmission modulation schemes usually map the OTL4.L (physical or logical) lanes directly into the parallel bit streams used for the modulation. As an example, a DP-QPSK scheme usually maps each of the four 28 G electrical lanes into the I and Q components of each of the two polarizations (X and Y).

Figure 8A:
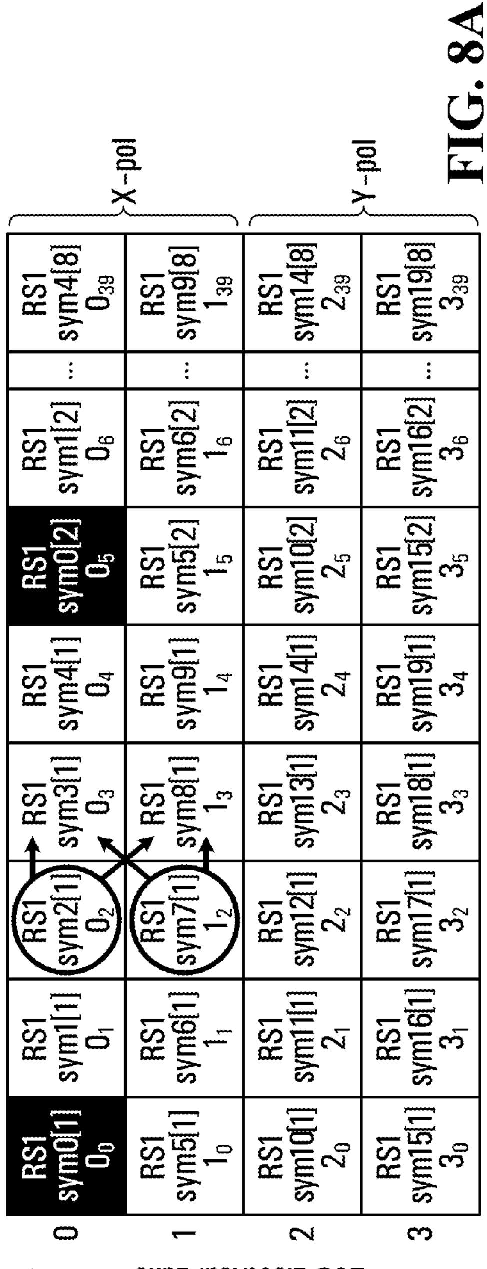
FIGS. 8A and 8B are schematics illustrating how the data depicted in FIG. 7 is mapped into I and Q components and how DP-QPSK (Dual Polarization Quadrature Phase-Shift Keying) correlated (double) errors are mapped into Reed Solomon codewords and symbols.
Figure 8B:
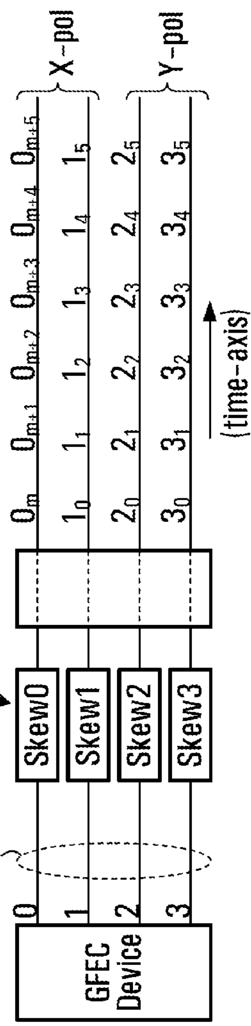

Modulation schemes often result in correlated errors. For example, DP-QPSK differential decoding leads to error pairs (and even quadruple errors with lower probability):

Error on I, followed by error on I
Error on I, followed by error on Q
Error on Q, followed by error on Q
Error on Q, followed by error on I Referring now to FIG. 8A, shown is a schematic 480 illustrating how the data depicted in FIG. 7 is mapped into I and Q components (of the X and Y polarizations) and how the DP-QPSK correlated (double) errors are mapped into Reed Solomon codewords and symbols, in case of zero skew among the different logical/electrical lanes. FIG. 8B is a schematic 481 showing the connection between the GFEC device (the OTN framer) and the optical module, and showing the detailed GFEC Reed Solomon codeword/symbol mapping in case of m bits of skew between electrical lane #0 and electrical lanes #1, #2 and #3.

As shown in FIG. 8A, a double error at the output of a differential decoder results in corruption of two symbols of the same Reed Solomon codeword:

Error on RS1/symbol_2[1], followed by error on RS1/symbol_3[1]

Error on RS1/symbol_2[1], followed by error on RS1/symbol_8[1]

Error on RS1/symbol_7[1], followed by error on RS1/symbol_8[1]

Error on RS1/symbol_7[1], followed by error on RS1/symbol_3[1]

This can be a serious corruption issue, as correlated (double) errors may affect several different symbols.

Note that the aforementioned corruption issue is not unique to the OTL4.4 described with reference to FIGS. 4 through 7. As noted above, other OTL4.L's are possible in which there may be a different number of physical lanes and/or the physical lanes may be rated to a speed other than 28 G. An example of an OTL4.10 and how the aforementioned corruption issue is similarly applicable will be described with reference to FIGS. 9 and 10.

Figure 9:
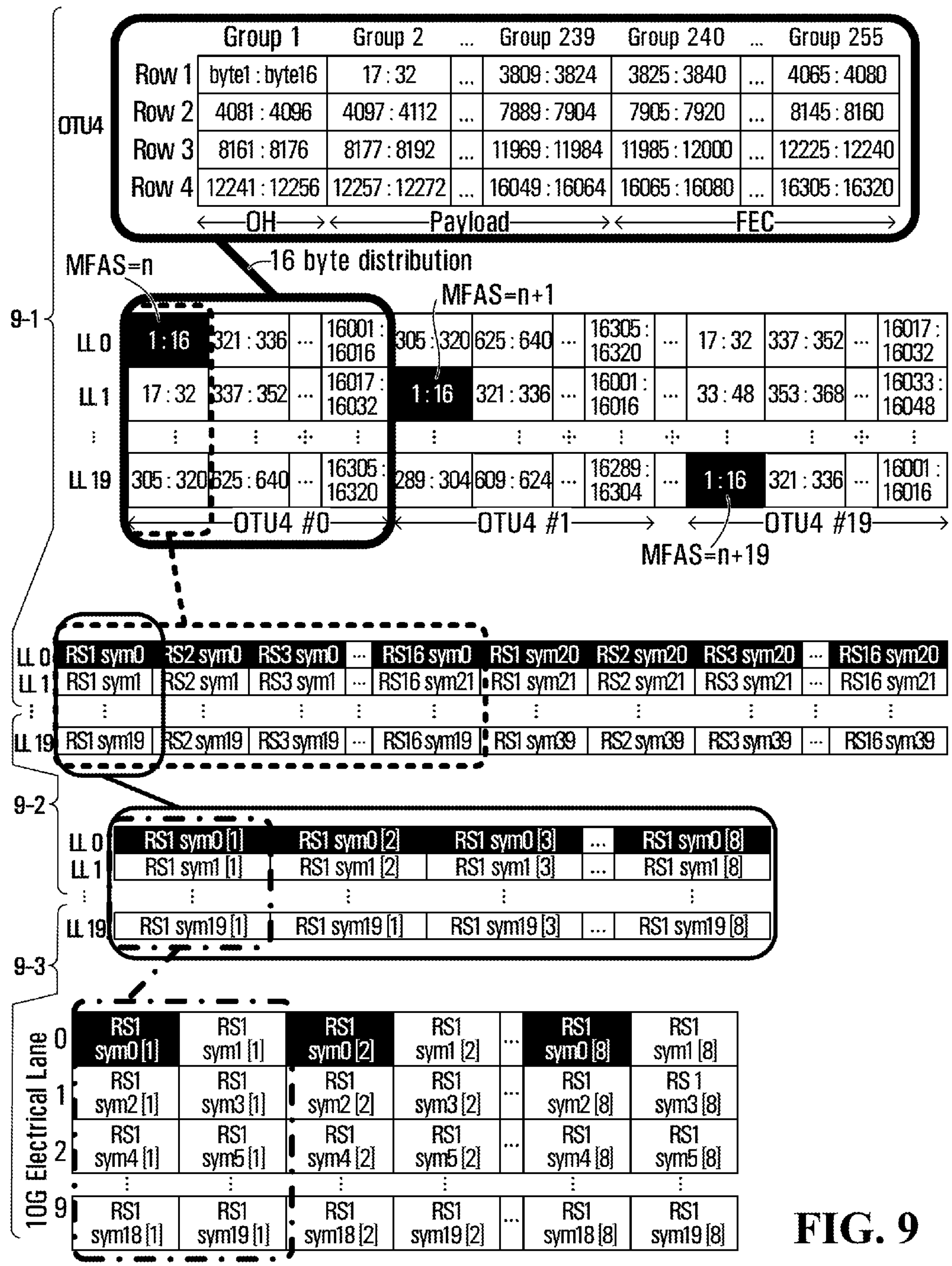
FIG. 9 is a schematic illustrating, for an OTL4.10 (not shown), resulting codeword (rs1-rs16) and symbol (s1[1:8]-s255[1:8]) allocation into ten 100 physical lanes.

Referring now to FIG. 9, shown is a schematic illustrating, for an OTL4.10 (not shown), resulting codeword (rs1-rs16) and symbol (s1[1:8]-s255[1:8]) allocation into ten 10 G physical lanes. This schematic differs from the schematic in FIG. 7 primarily in that the bit-interleaving is accomplished with ten multiplexers corresponding to ten 100 physical lanes. FIG. 9 shows distributing 9-1, allocating 9-2 and bit-interleaving 9-3 steps that generally correspond to the distributing 4-1, allocating 4-2 and bit-interleaving 4-3 steps previously described.

Figure 10A:
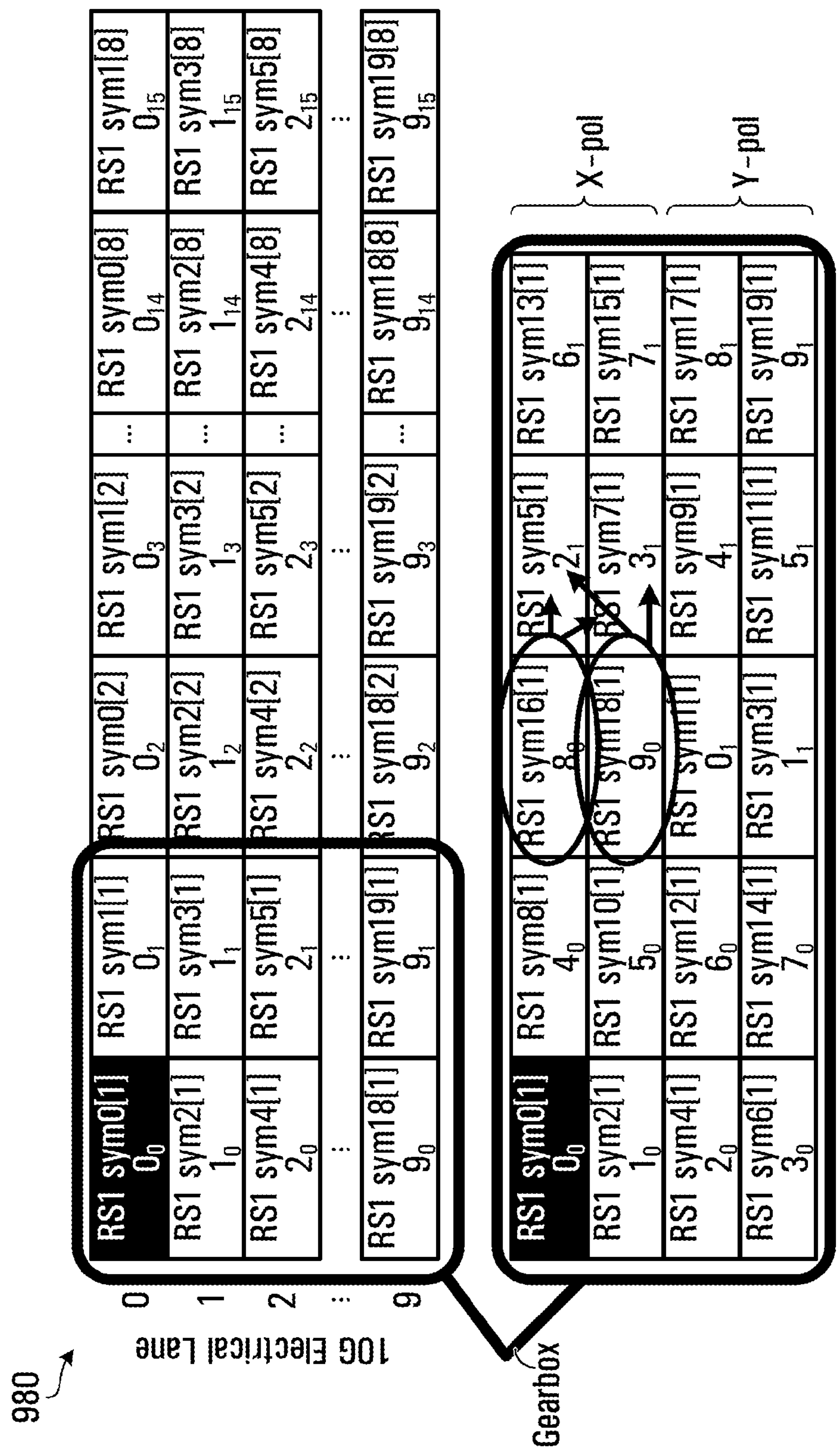
FIGS. 10A and 10B are schematics illustrating how the data depicted in FIG. 9 is mapped into I and Q components and how DP-QPSK correlated (double) errors are mapped into Reed Solomon codewords and symbols.
Figure 10B:
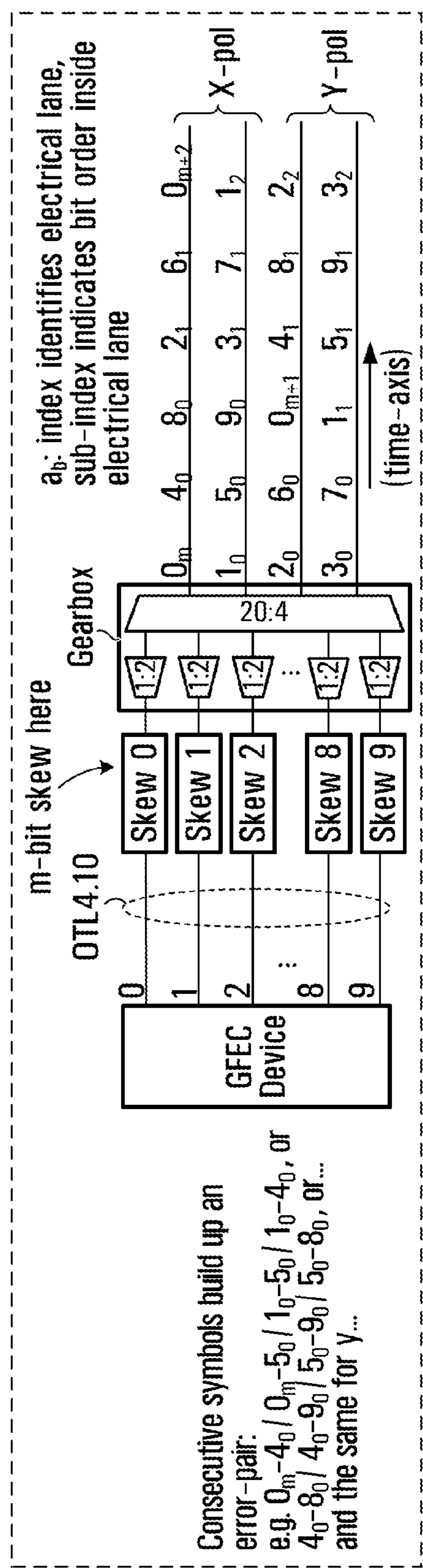

Referring now to FIG. 10A, shown is a schematic 980 illustrating, for the OTL4.10 depicted in FIG. 9, how data is mapped into I and Q components (of the X and Y polarizations) and how the DP-QPSK correlated (double) errors are mapped into Reed Solomon codewords and symbols, in case of zero skew among the different logical/electrical lanes. FIG. 10B is a schematic 981 showing the connection between the GFEC device (the OTN framer) and the optical module, and showing detailed GFEC Reed Solomon codeword/symbol mapping in case of a skew of m bits between electrical lane #0 and electrical lanes #1 through #9.

As shown in FIG. 10A, a double error at the output of a differential decoder results in corruption of two symbols of the same Reed Solomon codeword:

Error on RS1/symbol_16[1], followed by error on RS1/symbol_5[1]

Error on RS1/symbol_16[1], followed by error on RS1/symbol_7[1]

Error on RS1/symbol_18[1], followed by error on RS1/symbol_7[1]

Error on RS1/symbol_18[1], followed by error on RS1/symbol_5[1]

This can be a serious corruption issue, as correlated (double) errors may affect several different symbols.

The interaction between GFEC, the OTL4.4/OTL4.10 schemes (see FIGS. 7 and 9, respectively) and DP-QPSK impact NCG (Net Coding Gain) of GFEC is shown in Table 2. This result is for a worst case scenario of zero skew among the different logical/physical lanes.

TABLE 2

GFEC/OTL/DP-QPSK interaction, impact to NCG

| | Net coding gain |
|---|---|
| GFEC in absence of correlated errors | 6.19 dB (BERin = 8E−5 at BERout = 1E−15) |
| GFEC exposed to DP-QPSK double errors | 4.96 dB (BERin = 7E−6 at BERout = 1E−15) |

The combination of GFEC with the OTL4.4/OTL4.10 schemes also results in low tolerance to very small burst errors. This is an important problem because some hardware implementations of 100/280 electrical backplanes are based on a DFE (Decision Feedback Equalizer) for data recovery, and the DFE may generate small burst errors at its output.

FIGS. 7 and 9 show that, at zero skew, the combination of the ITU G.709 GFEC and OTL4.L schemes results in the following situations:

1. OTL4.4: a 28 G electrical lane is constructed via bit interleaving of five symbols of the same Reed Solomon codeword—a small burst error (five bits) at the output of the DFE will corrupt five symbols of the same Reed Solomon codeword.
2. OTL4.10: a 100 electrical lane is constructed via bit interleaving of two symbols of the same Reed Solomon codeword—a small burst error (two bits) at the output of the DFE will corrupt two symbols of the same Reed Solomon codeword.

The interaction between GFEC, OTL4.4/OTL4.10 and DFE impacts NGC (Net Coding Gain) of GFEC is shown in Table 3. These results are for a worst case scenario of zero skew among the different logical/electrical lanes.

TABLE 3

GFEC/OTL/DFE interaction, impact to NCG

| | Net coding gain |
|---|---|
| GFEC in absence of DFE burst errors | 6.19 dB (BERin = 8E−5 at BERout = 1E−15) |
| GFEC/OTL4.10 exposed to DFE burst errors | 4.79 dB (BERin = 4.8E−6 at BERout = 1E−15) |
| GFEC/OTL4.4 exposed to DFE burst errors | 2.39 dB (BERin = 2.7E−9 at BERout = 1E−15) |

Figure 12:
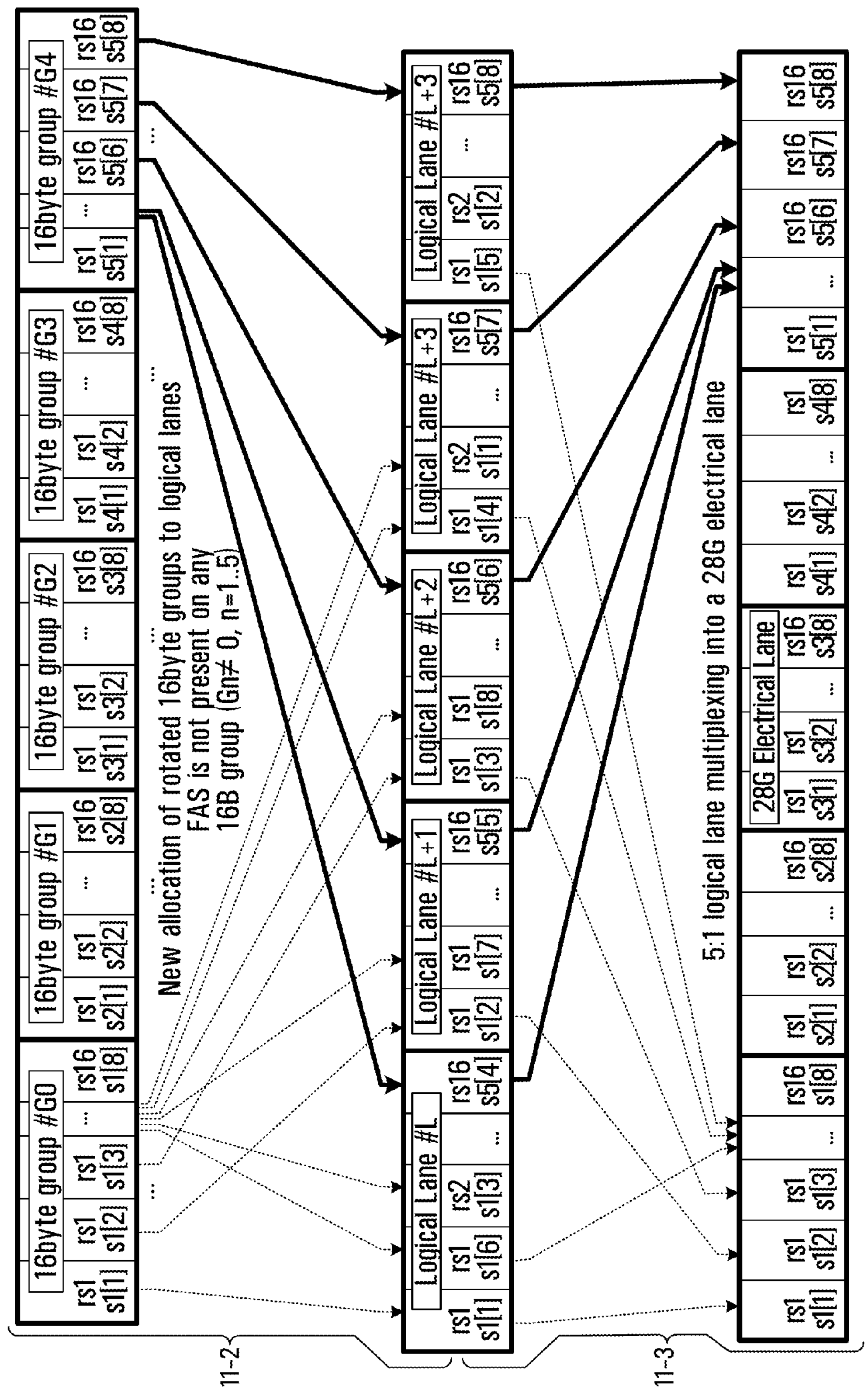
FIG. 12 is a schematic illustrating, for the OTL4.4 of FIG. 11, resulting codeword (rs1-rs16) and symbol (s1[1:8]-s255[1:8]) allocation into a 28 G lane when none of the five 16-byte groups carries FAS (Frame Alignment Signal) information.
Figure 13:
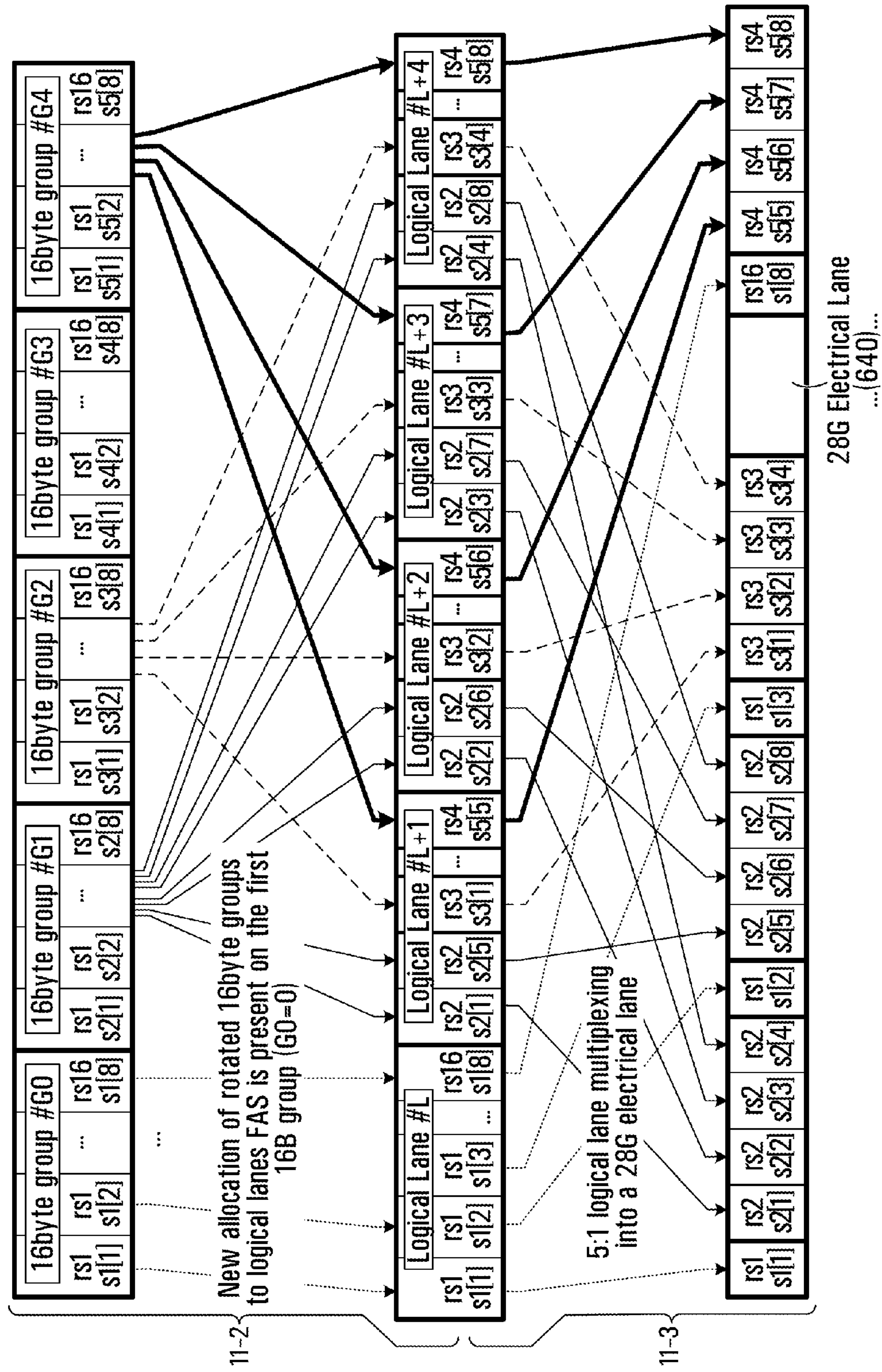
FIG. 13 is a schematic illustrating, for the OTL4.4 of FIG. 11, resulting codeword (rs1-rs16) and symbol (s1[1:8]-s255[1:8]) allocation into a 28 G lane when the 1st 16-byte group carries FAS information.

In view of the foregoing, it can be seen that the interaction between GFEC and OTL4.L can have a significant impact on performance when exposed to correlated errors from advanced modulation schemes, DFE, etc. The interaction between the GFEC and the OTL4.L scheme occur because both schemes process OTN frames in groups of 16 bytes. This issue can be difficult to analyze for complex (multi-dimensional) FEC schemes as it depends on many different variables:

a relative skews among logical/electrical lanes a interaction between correlated errors, OTL striping and FEC scheme An example OTL that mitigates some or all of the foregoing issues will be described below with reference to FIGS. 11 through 13. Another example OTL that mitigates some or all of the foregoing issues will be described below with reference to FIGS. 14 through 16.

Another OTL for Transmitting OTN Frames

Figure 11:
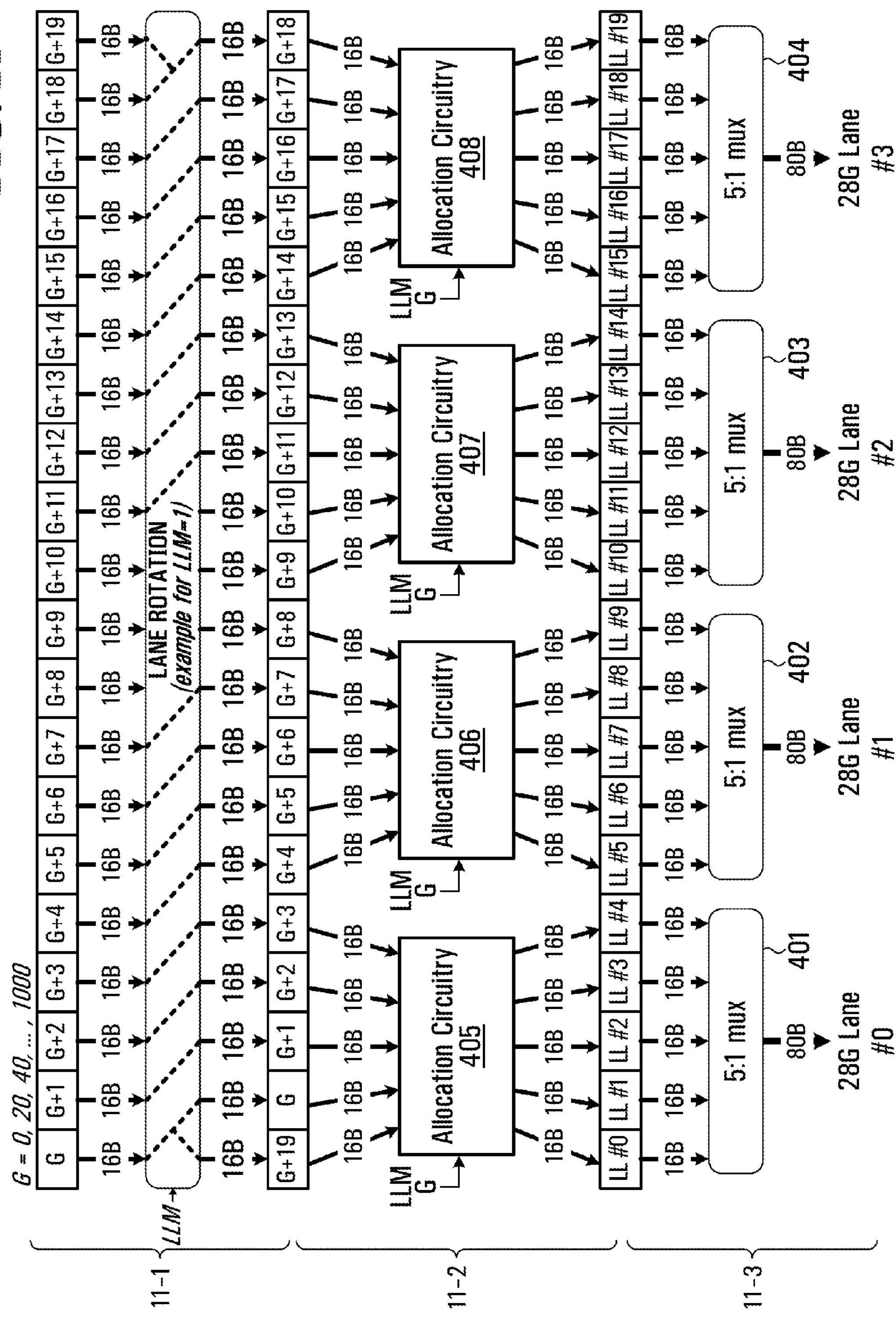
FIG. 11 is a functional diagram of another example OTL4.4 for transmitting OTN frames.

Referring now to FIG. 11, shown is a functional diagram of another OTL for transmitting OTN frames. Each OTN frame is subjected to various processing prior to being transmitted over 28 G physical lanes. By way of overview, this processing includes distributing 11-1 the 16-byte groups into logical lanes, allocating 11-2 the 16-byte groups to the logical lanes, and interleaving 11-3 the 16-byte groups from the logical lanes into the 28 G physical lanes. Such processing will be described in further detail below. Note that FIG. 11 is very specific and is provided for exemplary purposes only.

In some implementations, at step 11-1, each 16-byte group is distributed, round robin, to each of a plurality of logical lanes as similarly described above for FIG. 4. Also, in some implementations of step 11-1, logical lane assignments are rotated on each frame boundary as similarly described above for FIGS. 4 and 5. FIG. 11 shows how 20 consecutive 16-byte groups of an OTU4 frame are rotated as indicated by the value of LLM, as similarly described above for FIGS. 4 and 5. Other lane rotations are possible and are within the scope of this disclosure. In alternative implementations, step 11-1 does not include any lane rotation.

In contrast with the OTL shown in FIG. 4, the OTL shown in FIG. 11 includes circuitry 405,406,407,408 for allocating (beyond one to one) the 16-byte groups to the logical lanes at step 11-2. Such allocation is performed so that, after interleaving the logical lanes into the 28 G physical lanes at step 11-3, the data is at least partially clustered with sequential bits belonging to the same symbol. In the illustrated example, five rotated 16-byte groups are allocated to five consecutive logical lanes (LL#x through LL#x+4, x=0, 5, 10, 15) by interleaving or mixing the 5×128 bits=640 bits as described in further detail below. Each group of five consecutive logical lanes is bit-interleaved at step 11-3 into a 28 G lane, as similarly described above for FIG. 4. Since the data transmitted over the 28 G lane is at least partially clustered with sequential bits belonging to the same symbol, any correlated errors affecting sequential bits may affect fewer symbols.

The OTL of FIG. 11 (with modified allocation of 16 byte groups to logical lanes) addresses an interaction issue (hit to performance) that occurs for example when using the GFEC and OTL4.4/OTL4.10 schemes for optical transmission (in combination with a modulation scheme such as DP-QPSK) and for backplanes (in combination with a DFE). A DP-QPSK demodulator will typically generate double (or quadruple) errors. When using the OTL4.L scheme defined by ITU G.709, these double errors will corrupt systematically two symbols of the same codeword. This problem is addressed by using the modified OTL described in this disclosure. In particular, any correlated errors affecting sequential bits may affect fewer symbols because data is at least partially clustered with sequential bits belonging to the same symbol.

In some implementations, the modified allocation of five rotated 16-byte groups to five logical lanes shown in FIG. 11 operates as follows:

A. If none of the 16-byte groups carries the FAS information (i.e. none of the five 16-byte groups is group number zero) then the five 16-byte groups are allocated to the five logical lanes in accordance with the fourth column ("No FAS") of Tables 4 and 5. Note that this column conveys a bit sequence after the allocation and the bit-interleaving by the multiplexers. See also FIG. 12, which is a schematic illustrating resulting codeword (rs1-rs16) and symbol (s1[1:8]-s255[1:8]) allocation into a 28 G lane when none of the five 16-byte groups carries the FAS information (i.e. none of the five 16-byte groups is group number zero). FIG. 12 shows the allocating 11-2 and bit-interleaving 11-3 steps that have been previously described with respect to FIG. 11, but are shown in FIG. 12 for only one multiplexer. In this implementation, the data transmitted over the 28 G electrical lane has the same order as the rotated data before the allocation 11-2 step. Such order involves clusters of sequential bits of the same symbol. In particular, for each symbol, all bits of the symbol are transmitted sequentially. To achieve this, the allocating 11-2 step is an inverse to the bit-interleaving 11-3 step.

B. If one of the five 16-byte groups carries the FAS information (i.e. one of the five 16-byte groups is group number zero) then the five 16-byte groups are allocated to the five logical lanes in accordance with the $5^{th}$ column ("FAS on $1^{st}$ 16 B group"), $6^{th}$ column ("FAS on $2^{nd}$ 16 B group"), $7^{th}$ column ("FAS on $3^{rd}$ 16 B group"), $8^{th}$ column ("FAS on $4^{th}$ 16 B group") and $9^{th}$ column ("FAS on $5^{th}$ 16 B group") of Tables 4 and 5. Note that these columns convey bit sequences after the allocation and the bit-interleaving by the multiplexers. See also FIG. 13, which is a schematic illustrating resulting codeword (rs1-rs16) and symbol (s1[1:8]-s255[1:8]) allocation into a 28 G lane when the first 16-byte group carries the FAS information (i.e. the first 16-byte group is group number zero). FIG. 12 shows the allocating 11-2 and bit-interleaving 11-3 steps that have been previously described with respect to FIG. 11, but are shown in FIG. 12 for only one multiplexer. In this implementation, the data transmitted over the 28 G electrical lane does not have the same order as the rotated data before the allocation 11-2 step, as the allocation 11-2 step does not mix any data portion containing the FAS information (e.g. the first 16-byte group #G0 carrying the FAS information is not mixed by the allocation 11-2 step). Nonetheless, the data transmitted over the 28 G electrical lane involves clusters of sequential bits of the same symbol. To achieve this, the allocating 11-2 step is an inverse to the bit-interleaving 11-3 step except that the FAS information is not mixed by the allocating 11-2 step. Figures showing examples where the second, third, fourth and fifth 16-byte group is group number zero are not shown, but would be readily understood in view of Tables 4 and 5.

In some implementations, as described with reference to FIG. 13, the allocation is performed without mixing any data portion containing FAS information. In this manner, there is no manipulation of the order of any bits corresponding to the FAS information. This means that a receiver looking to find the FAS information in a data reception can find it in the same place that it would be expected had the allocation step not been executed. The allocating step may be performed in order to reduce occurrence of sequential bits of different symbols without manipulating the order of any bits corresponding to the FAS information. Tables 4 and 5 provide a specific example of this. Note that the bits corresponding to the FAS information identified with bold text are in the same position as if the allocating step was not performed. In some implementations, data portions are mixed as a function of where the FAS information is located. In particular, with reference to Tables 4 and 5, the $5^{th}$ column ("FAS on $1^{st}$ 16 B group"), $6^{th}$ column ("FAS on $2^{nd}$ 16 B group"), $7^{th}$ column ("FAS on $3^{rd}$ 16 B group"), $8^{th}$ column ("FAS on $4^{th}$ 16 B group") and $9^{th}$ column ("FAS on $5^{th}$ 16 B group") show different mixing of data portions.

TABLE 4

| 28G physical | | | OTL4.4 of FIG. 11 | | | | | | |
|---|---|---|---|---|---|---|---|---|---|
| | lane | OTL4.4 of | | FAS on $1^{st}$ | FAS on $2^{nd}$ | FAS on $3^{rd}$ | FAS on $4^{th}$ | FAS on $5^{th}$ | |
| bit | LL#[bit] | FIG. 4 | No FAS | 16B group | 16B group | 16B group | 16B group | 16B group |
| 1 | LL0[1] | G0[1] | G0[1] | **G0[1]** | G0[32] | G1[31] | G2[30] | G3[29] |
| 2 | LL1[1] | G1[1] | G0[2] | G1[9] | **G1[1]** | G1[32] | G2[31] | G3[30] |
| 3 | LL2[1] | G2[1] | G0[3] | G1[10] | G2[9] | **G2[1]** | G2[32] | G3[31] |
| 4 | LL3[1] | G3[1] | G0[4] | G1[11] | G2[10] | G3[9] | **G3[1]** | G3[32] |
| 5 | LL4[1] | G4[1] | G0[5] | G1[12] | G2[11] | G3[10] | G4[9] | **G4[1]** |
| 6 | LL0[2] | G0[2] | G0[6] | **G0[2]** | G2[12] | G3[11] | G4[10] | G0[9] |
| 7 | LL1[2] | G1[2] | G0[7] | G1[13] | **G1[2]** | G3[12] | G4[11] | G0[10] |
| 8 | LL2[2] | G2[2] | G0[8] | G1[14] | G2[13] | **G2[2]** | G4[12] | G0[11] |
| 9 | LL3[2] | G3[2] | G0[9] | G1[15] | G2[14] | G3[13] | **G3[2]** | G0[12] |
| 10 | LL4[2] | G4[2] | G0[10] | G1[16] | G2[15] | G3[14] | G4[13] | **G4[2]** |
| 11 | LL0[3] | G0[3] | G0[11] | **G0[3]** | G2[16] | G3[15] | G4[14] | G0[13] |
| 12 | LL1[3] | G1[3] | G0[12] | G2[17] | **G1[3]** | G3[16] | G4[15] | G0[14] |
| 13 | LL2[3] | G2[3] | G0[13] | G2[18] | G3[17] | **G2[3]** | G4[16] | G0[15] |
| 14 | LL3[3] | G3[3] | G0[14] | G2[19] | G3[18] | G4[17] | **G3[3]** | G0[16] |
| 15 | LL4[3] | G4[3] | G0[15] | G2[20] | G3[19] | G4[18] | G0[17] | **G4[3]** |
| 16 | LL0[4] | G0[4] | G0[16] | **G0[4]** | G3[20] | G4[19] | G0[18] | G1[17] |
| 17 | LL1[4] | G1[4] | G0[17] | G2[21] | **G1[4]** | G4[20] | G0[19] | G1[18] |
| 18 | LL2[4] | G2[4] | G0[18] | G2[22] | G3[21] | **G2[4]** | G0[20] | G1[19] |
| 19 | LL3[4] | G3[4] | G0[19] | G2[23] | G3[22] | G4[21] | **G3[4]** | G1[20] |
| 20 | LL4[4] | G4[4] | G0[20] | G2[24] | G3[23] | G4[22] | G0[21] | **G4[4]** |
| 21 | LL0[5] | G0[5] | G0[21] | **G0[5]** | G3[24] | G4[23] | G0[22] | G1[21] |
| 22 | LL1[5] | G1[5] | G0[22] | G3[25] | **G1[5]** | G4[24] | G0[23] | G1[22] |
| 23 | LL2[5] | G2[5] | G0[23] | G3[26] | G4[25] | **G2[5]** | G0[24] | G1[23] |
| 24 | LL3[5] | G3[5] | G0[24] | G3[27] | G4[26] | G0[25] | **G3[5]** | G1[24] |
| 25 | LL4[5] | G4[5] | G0[25] | G3[28] | G4[27] | G0[26] | G1[25] | **G4[5]** |
| 26 | LL0[6] | G0[6] | G0[26] | **G0[6]** | G4[28] | G0[27] | G1[26] | G2[25] |
| 27 | LL1[6] | G1[6] | G0[27] | G3[29] | **G1[29]** | G0[28] | G1[27] | G2[26] |
| 28 | LL2[6] | G2[6] | G0[28] | G3[30] | G4[29] | **G2[6]** | G1[28] | G2[27] |
| 29 | LL3[6] | G3[6] | G0[29] | G3[31] | G4[30] | G0[29] | **G3[6]** | G2[28] |
| 30 | LL4[6] | G4[6] | G0[30] | G3[32] | G4[31] | G0[30] | G1[29] | **G4[6]** |
| 31 | LL0[7] | G0[7] | G0[31] | **G0[7]** | G4[32] | G0[31] | G1[30] | G2[29] |
| 32 | LL1[7] | G1[7] | G0[32] | G4[33] | **G1[7]** | G0[32] | G1[31] | G2[30] |
| 33 | LL2[7] | G2[7] | G0[33] | G4[34] | G0[33] | **G2[7]** | G1[32] | G2[31] |
| 34 | LL3[7] | G3[7] | G0[34] | G4[35] | G0[34] | G1[33] | **G3[7]** | G2[32] |
| 35 | LL4[7] | G4[7] | G0[35] | G4[36] | G0[35] | G1[34] | G2[33] | **G4[7]** |
| 36 | LL0[8] | G0[8] | G0[36] | **G0[8]** | G0[36] | G1[35] | G2[34] | G3[33] |
| 37 | LL1[8] | G1[8] | G0[37] | G4[37] | **G1[8]** | G1[36] | G2[35] | G3[34] |
| 38 | LL2[8] | G2[8] | G0[38] | G4[38] | G0[37] | **G2[8]** | G2[36] | G3[35] |
| 39 | LL3[8] | G3[8] | G0[39] | G4[39] | G0[38] | G1[37] | **G3[8]** | G3[36] |
| 40 | LL4[8] | G4[8] | G0[40] | G4[40] | G0[39] | G1[38] | G2[37] | **G4[8]** |
| 41 | LL0[9] | G0[9] | G0[41] | **G0[9]** | G0[40] | G1[39] | G2[38] | G3[37] |
| 42 | LL1[9] | G1[9] | G0[42] | G1[17] | **G1[9]** | G1[40] | G2[39] | G3[38] |
| 43 | LL2[9] | G2[9] | G0[43] | G1[18] | G2[17] | **G2[9]** | G2[40] | G3[39] |
| 44 | LL3[9] | G3[9] | G0[44] | G1[19] | G2[18] | G3[17] | **G3[9]** | G3[40] |
| 45 | LL4[9] | G4[9] | G0[45] | G1[20] | G2[19] | G3[18] | G4[17] | **G4[9]** |
| 46 | LL0[10] | G0[10] | G0[46] | **G0[10]** | G2[20] | G3[19] | G4[18] | G0[17] |
| 47 | LL1[10] | G1[10] | G0[47] | G1[21] | **G1[10]** | G3[20] | G4[19] | G0[18] |
| 48 | LL2[10] | G2[10] | G0[48] | G1[22] | G2[21] | **G2[10]** | G4[20] | G0[19] |
| 49 | LL3[10] | G3[10] | G0[49] | G1[23] | G2[22] | G3[21] | **G3[10]** | G0[20] |
| 50 | LL4[10] | G4[10] | G0[50] | G1[24] | G2[23] | G3[22] | G4[21] | **G4[10]** |
| 51 | LL0[11] | G0[11] | G0[51] | **G0[11]** | G2[24] | G3[23] | G4[22] | G0[21] |
| 52 | LL1[11] | G1[11] | G0[52] | G2[25] | **G1[11]** | G3[24] | G4[23] | G0[22] |
| 53 | LL2[11] | G2[11] | G0[53] | G2[26] | G3[25] | **G2[11]** | G4[24] | G0[23] |
| 54 | LL3[11] | G3[11] | G0[54] | G2[27] | G3[26] | G4[25] | **G3[11]** | G0[24] |
| 55 | LL4[11] | G4[11] | G0[55] | G2[28] | G3[27] | G4[26] | G0[25] | **G4[11]** |
| 56 | LL0[12] | G0[12] | G0[56] | **G0[12]** | G3[28] | G4[27] | G0[26] | G1[25] |
| 57 | LL1[12] | G1[12] | G0[57] | G2[29] | **G1[12]** | G4[28] | G0[27] | G1[26] |
| 58 | LL2[12] | G2[12] | G0[58] | G2[30] | G3[29] | **G2[12]** | G0[28] | G1[27] |
| 59 | LL3[12] | G3[12] | G0[59] | G2[31] | G3[30] | G4[29] | **G3[12]** | G1[28] |
| 60 | LL4[12] | G4[12] | G0[60] | G2[32] | G3[31] | G4[30] | G0[29] | **G4[12]** |
| 61 | LL0[13] | G0[13] | G0[61] | **G0[13]** | G3[32] | G4[31] | G0[30] | G1[29] |
| 62 | LL1[13] | G1[13] | G0[62] | G3[33] | **G1[13]** | G4[32] | G0[31] | G1[30] |
| 63 | LL2[13] | G2[13] | G0[63] | G3[34] | G4[33] | **G2[13]** | G0[32] | G1[31] |
| 64 | LL3[13] | G3[13] | G0[64] | G3[35] | G4[34] | G0[33] | **G3[13]** | G1[32] |
| 65 | LL4[13] | G4[13] | G0[65] | G3[36] | G4[35] | G0[34] | G1[33] | **G4[13]** |
| 66 | LL0[14] | G0[14] | G0[66] | **G0[14]** | G4[36] | G0[35] | G1[34] | G2[33] |
| 67 | LL1[14] | G1[14] | G0[67] | G3[37] | **G1[14]** | G0[36] | G1[35] | G2[34] |
| 68 | LL2[14] | G2[14] | G0[68] | G3[38] | G4[37] | **G2[14]** | G1[36] | G2[35] |
| 69 | LL3[14] | G3[14] | G0[69] | G3[39] | G4[38] | G0[37] | **G3[14]** | G2[36] |
| 70 | LL4[14] | G4[14] | G0[70] | G3[40] | G4[39] | G0[38] | G1[37] | **G4[14]** |
| 71 | LL0[15] | G0[15] | G0[71] | **G0[15]** | G4[40] | G0[39] | G1[38] | G2[37] |
| 72 | LL1[15] | G1[15] | G0[72] | G4[41] | **G1[15]** | G0[40] | G1[39] | G2[38] |
| 73 | LL2[15] | G2[15] | G0[73] | G4[42] | G0[41] | **G2[15]** | G1[40] | G2[39] |
| 74 | LL3[15] | G3[15] | G0[74] | G4[43] | G0[42] | G1[41] | **G3[15]** | G2[40] |

TABLE 4-continued

| 28G physical lane | | OTL4.4 of | OTL4.4 of FIG. 11 | | | | | | |
|---|---|---|---|---|---|---|---|---|---|
| bit | LL#[bit] | FIG. 4 | No FAS | FAS on 1st 16B group | FAS on 2nd 16B group | FAS on 3rd 16B group | FAS on 4th 16B group | FAS on 5th 16B group |
| 75 | LL4[15] | G4[15] | G0[75] | G4[44] | G0[43] | G1[42] | G2[41] | **G4[15]** |
| 76 | LL0[16] | G0[16] | G0[76] | **G0[16]** | G0[44] | G1[43] | G2[42] | G3[41] |
| 77 | LL1[16] | G1[16] | G0[77] | G4[45] | **G1[16]** | G1[44] | G2[43] | G3[42] |
| 78 | LL2[16] | G2[16] | G0[78] | G4[46] | G0[45] | **G2[16]** | G2[44] | G3[43] |
| 79 | LL3[16] | G3[16] | G0[79] | G4[47] | G0[46] | G1[45] | **G3[16]** | G3[44] |
| 80 | LL4[16] | G4[16] | G0[80] | G4[48] | G0[47] | G1[46] | G2[45] | **G4[16]** |
| 81 | LL0[17] | G0[17] | G0[81] | **G0[17]** | G0[48] | G1[47] | G2[46] | G3[45] |
| 82 | LL1[17] | G1[17] | G0[82] | G1[25] | **G1[17]** | G1[48] | G2[47] | G3[46] |
| 83 | LL2[17] | G2[17] | G0[83] | G1[26] | G2[25] | **G2[17]** | G2[48] | G3[47] |
| 84 | LL3[17] | G3[17] | G0[84] | G1[27] | G2[26] | G3[25] | **G3[17]** | G3[48] |
| 85 | LL4[17] | G4[17] | G0[85] | G1[28] | G2[27] | G3[26] | G4[25] | **G4[17]** |
| 86 | LL0[18] | G0[18] | G0[86] | **G0[18]** | G2[28] | G3[27] | G4[26] | G0[25] |
| 87 | LL1[18] | G1[18] | G0[87] | G1[29] | **G1[18]** | G3[28] | G4[27] | G0[26] |
| 88 | LL2[18] | G2[18] | G0[88] | G1[30] | G2[29] | **G2[18]** | G4[28] | G0[27] |
| 89 | LL3[18] | G3[18] | G0[89] | G1[31] | G2[30] | G3[29] | **G3[18]** | G0[28] |
| 90 | LL4[18] | G4[18] | G0[90] | G1[32] | G2[31] | G3[30] | G4[29] | **G4[18]** |
| 91 | LL0[19] | G0[19] | G0[91] | **G0[19]** | G2[32] | G3[31] | G4[30] | G0[29] |
| 92 | LL1[19] | G1[19] | G0[92] | G2[33] | **G1[19]** | G3[32] | G4[31] | G0[30] |
| 93 | LL2[19] | G2[19] | G0[93] | G2[34] | G3[33] | **G2[19]** | G4[32] | G0[31] |
| 94 | LL3[19] | G3[19] | G0[94] | G2[35] | G3[34] | G4[33] | **G3[19]** | G0[32] |
| 95 | LL4[19] | G4[19] | G0[95] | G2[36] | G3[35] | G4[34] | G0[33] | **G4[19]** |
| 96 | LL0[20] | G0[20] | G0[96] | **G0[20]** | G3[36] | G4[35] | G0[34] | G1[33] |
| 97 | LL1[20] | G1[20] | G0[97] | G2[37] | **G1[20]** | G4[36] | G0[35] | G1[34] |
| 98 | LL2[20] | G2[20] | G0[98] | G2[38] | G3[37] | **G2[20]** | G0[36] | G1[35] |
| 99 | LL3[20] | G3[20] | G0[99] | G2[39] | G3[38] | G4[37] | **G3[20]** | G1[36] |
| 100 | LL4[20] | G4[20] | G0[100] | G2[40] | G3[39] | G4[38] | G0[37] | **G4[20]** |
| 101 | LL0[21] | G0[21] | G0[101] | **G0[21]** | G3[40] | G4[39] | G0[38] | G1[37] |
| 102 | LL1[21] | G1[21] | G0[102] | G3[41] | **G1[21]** | G4[40] | G0[39] | G1[38] |
| 103 | LL2[21] | G2[21] | G0[103] | G3[42] | G4[41] | **G2[21]** | G0[40] | G1[39] |
| 104 | LL3[21] | G3[21] | G0[104] | G3[43] | G4[42] | G0[41] | **G3[21]** | G1[40] |
| 105 | LL4[21] | G4[21] | G0[105] | G3[44] | G4[43] | G0[42] | G1[41] | **G4[21]** |
| 106 | LL0[22] | G0[22] | G0[106] | **G0[22]** | G4[44] | G0[43] | G1[42] | G2[41] |
| 107 | LL1[22] | G1[22] | G0[107] | G3[45] | **G1[22]** | G0[44] | G1[43] | G2[42] |
| 108 | LL2[22] | G2[22] | G0[108] | G3[46] | G4[45] | **G2[22]** | G1[44] | G2[43] |
| 109 | LL3[22] | G3[22] | G0[109] | G3[47] | G4[46] | G0[45] | **G3[22]** | G2[44] |
| 110 | LL4[22] | G4[22] | G0[110] | G3[48] | G4[47] | G0[46] | G1[45] | **G4[22]** |
| 111 | LL0[23] | G0[23] | G0[111] | **G0[23]** | G4[48] | G0[47] | G1[46] | G2[45] |
| 112 | LL1[23] | G1[23] | G0[112] | G4[49] | **G1[23]** | G0[48] | G1[47] | G2[46] |
| 113 | LL2[23] | G2[23] | G0[113] | G4[50] | G0[49] | **G2[23]** | G1[48] | G2[47] |
| 114 | LL3[23] | G3[23] | G0[114] | G4[51] | G0[50] | G1[49] | **G3[23]** | G2[48] |
| 115 | LL4[23] | G4[23] | G0[115] | G4[52] | G0[51] | G1[50] | G2[49] | **G4[23]** |
| 116 | LL0[24] | G0[24] | G0[116] | **G0[24]** | G0[52] | G1[51] | G2[50] | G3[49] |
| 117 | LL1[24] | G1[24] | G0[117] | G4[53] | **G1[24]** | G1[52] | G2[51] | G3[50] |
| 118 | LL2[24] | G2[24] | G0[118] | G4[54] | G0[53] | **G2[24]** | G2[52] | G3[51] |
| 119 | LL3[24] | G3[24] | G0[119] | G4[55] | G0[54] | G1[53] | **G3[24]** | G3[52] |
| 120 | LL4[24] | G4[24] | G0[120] | G4[56] | G0[55] | G1[54] | G2[53] | **G4[24]** |
| 121 | LL0[25] | G0[25] | G0[121] | **G0[25]** | G0[56] | G1[55] | G2[54] | G3[53] |
| 122 | LL1[25] | G1[25] | G0[122] | G1[33] | **G1[25]** | G1[56] | G2[55] | G3[54] |
| 123 | LL2[25] | G2[25] | G0[123] | G1[34] | G2[33] | **G2[25]** | G2[56] | G3[55] |
| 124 | LL3[25] | G3[25] | G0[124] | G1[35] | G2[34] | G3[33] | **G3[25]** | G3[56] |
| 125 | LL4[25] | G4[25] | G0[125] | G1[36] | G2[35] | G3[34] | G4[33] | **G4[25]** |
| 126 | LL0[26] | G0[26] | G0[126] | **G0[26]** | G2[36] | G3[35] | G4[34] | G0[33] |
| 127 | LL1[26] | G1[26] | G0[127] | G1[37] | **G1[26]** | G3[36] | G4[35] | G0[34] |
| 128 | LL2[26] | G2[26] | G0[128] | G1[38] | G2[37] | **G2[26]** | G4[36] | G0[35] |
| 129 | LL3[26] | G3[26] | G1[1] | G1[39] | G2[38] | G3[37] | **G3[26]** | G0[36] |
| 130 | LL4[26] | G4[26] | G1[2] | G1[40] | G2[39] | G3[38] | G4[37] | **G4[26]** |
| 131 | LL0[27] | G0[27] | G1[3] | **G0[27]** | G2[40] | G3[39] | G4[38] | G0[37] |
| 132 | LL1[27] | G1[27] | G1[4] | G2[41] | **G1[27]** | G3[40] | G4[39] | G0[38] |
| 133 | LL2[27] | G2[27] | G1[5] | G2[42] | G3[41] | **G2[27]** | G4[40] | G0[39] |
| 134 | LL3[27] | G3[27] | G1[6] | G2[43] | G3[42] | G4[41] | **G3[27]** | G0[40] |
| 135 | LL4[27] | G4[27] | G1[7] | G2[44] | G3[43] | G4[42] | G0[41] | **G4[27]** |
| . . . | . . . | . . . | . . . | . . . | . . . | . . . | . . . | . . . |
| . . . | . . . | . . . | . . . | . . . | . . . | . . . | . . . | . . . |
| . . . | . . . | . . . | . . . | . . . | . . . | . . . | . . . | . . . |
| 556 | LL0[112] | G0[112] | G4[44] | **G0[112]** | rs2-G0[12] | G1[11] | G2[10] | G3[9] |
| 557 | LL1[112] | G1[112] | G4[45] | G4[13] | **G1[112]** | G1[12] | G2[11] | G3[10] |
| 558 | LL2[112] | G2[112] | G4[46] | G4[14] | G0[13] | **G2[112]** | G2[12] | G3[11] |
| 559 | LL3[112] | G3[112] | G4[47] | G4[15] | G0[14] | G1[13] | **G3[112]** | G3[12] |
| 560 | LL4[112] | G4[112] | G4[48] | G4[16] | G0[15] | G1[14] | G2[13] | **G4[112]** |
| 561 | LL0[113] | G0[113] | G4[49] | **G0[113]** | G0[16] | G1[15] | G2[14] | G3[13] |
| 562 | LL1[113] | G1[113] | G4[50] | G1[121] | **G1[113]** | G1[16] | G2[15] | G3[14] |
| 563 | LL2[113] | G2[113] | G4[51] | G1[122] | G2[121] | **G2[113]** | G2[16] | G3[15] |
| 564 | LL3[113] | G3[113] | G4[52] | G1[123] | G2[122] | G3[121] | **G3[113]** | G3[16] |
| 565 | LL4[113] | G4[113] | G4[53] | G1[124] | G2[123] | G3[122] | G4[121] | **G4[113]** |

TABLE 4-continued

| 28G physical lane | | OTL4.4 of FIG. 4 | OTL4.4 of FIG. 11 | | | | | |
|---|---|---|---|---|---|---|---|---|
| bit | LL#[bit] | | No FAS | FAS on 1$^{st}$ 16B group | FAS on 2$^{nd}$ 16B group | FAS on 3$^{rd}$ 16B group | FAS on 4$^{th}$ 16B group | FAS on 5$^{th}$ 16B group |
| 566 | LL0[114] | G0[114] | G4[54] | **G0[114]** | G2[124] | G3[123] | G4[122] | G0[121] |
| 567 | LL1[114] | G1[114] | G4[55] | G1[125] | **G1[114]** | G3[124] | G4[123] | G0[122] |
| 568 | LL2[114] | G2[114] | G4[56] | G1[126] | G2[125] | **G2[114]** | G4[124] | G0[123] |
| 569 | LL3[114] | G3[114] | G4[57] | G1[127] | G2[126] | G3[125] | **G3[114]** | G0[124] |
| 560 | LL4[114] | G4[114] | G4[58] | G1[128] | G2[127] | G3[126] | G4[125] | **G4[114]** |
| 571 | LL0[115] | G0[115] | G4[59] | **G0[115]** | G2[128] | G3[127] | G4[126] | G0[125] |
| 572 | LL1[115] | G1[115] | G4[60] | G2[1] | **G1[115]** | G3[128] | G4[127] | G0[126] |
| 573 | LL2[115] | G2[115] | G4[61] | G2[2] | G3[1] | **G2[115]** | G4[128] | G0[127] |
| 574 | LL3[115] | G3[115] | G4[62] | G2[3] | G3[2] | G4[1] | **G3[115]** | G0[128] |
| 575 | LL4[115] | G4[115] | G4[63] | G2[4] | G3[3] | G4[2] | G0[1] | **G4[115]** |
| 576 | LL0[116] | G0[116] | G4[64] | **G0[116]** | G3[4] | G4[3] | G0[2] | G1[1] |
| 577 | LL1[116] | G1[116] | G4[65] | G2[5] | **G1[116]** | G4[4] | G0[3] | G1[2] |
| 578 | LL2[116] | G2[116] | G4[66] | G2[6] | G3[5] | **G2[116]** | G0[4] | G1[3] |
| 579 | LL3[116] | G3[116] | G4[67] | G2[7] | G3[6] | G4[5] | **G3[116]** | G1[4] |
| 580 | LL4[116] | G4[116] | G4[68] | G2[8] | G3[7] | G4[6] | G0[5] | **G4[116]** |
| 581 | LL0[117] | G0[117] | G4[69] | **G0[117]** | G3[8] | G4[7] | G0[6] | G1[5] |
| 582 | LL1[117] | G1[117] | G4[70] | G3[9] | **G1[117]** | G4[8] | G0[7] | G1[6] |
| 583 | LL2[117] | G2[117] | G4[71] | G3[10] | G4[9] | **G2[117]** | G0[8] | G1[7] |
| 584 | LL3[117] | G3[117] | G4[72] | G3[11] | G4[10] | G0[9] | **G3[117]** | G1[8] |
| 585 | LL4[117] | G4[117] | G4[73] | G3[12] | G4[11] | G0[10] | G1[9] | **G4[117]** |
| 586 | LL0[118] | G0[118] | G4[74] | **G0[118]** | G4[12] | G0[11] | G1[10] | G2[9] |
| 587 | LL0[119] | G0[119] | G4[75] | G3[13] | **G1[118]** | G0[12] | G1[11] | G2[10] |
| 588 | LL0[120] | G0[120] | G4[76] | G3[14] | G4[13] | **G2[118]** | G1[12] | G2[11] |
| 589 | LL0[121] | G0[121] | G4[77] | G3[15] | G4[14] | G0[13] | **G3[118]** | G2[12] |
| 590 | LL0[122] | G0[122] | G4[78] | G3[16] | G4[15] | G0[14] | G1[13] | **G4[118]** |
| 591 | LL0[119] | G0[119] | G4[79] | **G0[119]** | G4[16] | G0[15] | G1[14] | G2[13] |
| 592 | LL1[119] | G1[119] | G4[80] | G4[17] | **G1[119]** | G0[16] | G1[15] | G2[14] |
| 593 | LL2[119] | G2[119] | G4[81] | G4[18] | G0[17] | **G2[119]** | G1[16] | G2[15] |
| 594 | LL3[119] | G3[119] | G4[82] | G4[19] | G0[18] | G1[17] | **G3[119]** | G2[16] |
| 595 | LL4[119] | G4[119] | G4[83] | G4[20] | G0[19] | G1[18] | G2[17] | **G4[119]** |
| 596 | LL0[120] | G0[120] | G4[84] | **G0[120]** | G0[20] | G1[19] | G2[18] | G3[17] |
| 597 | LL1[120] | G1[120] | G4[85] | G4[21] | **G1[120]** | G1[20] | G2[19] | G3[18] |
| 598 | LL2[120] | G2[120] | G4[86] | G4[22] | G0[21] | **G2[120]** | G2[20] | G3[19] |
| 599 | LL3[120] | G3[120] | G4[87] | G4[23] | G0[22] | G1[21] | **G3[120]** | G3[20] |
| 600 | LL4[120] | G4[120] | G4[88] | G4[24] | G0[23] | G1[22] | G2[21] | **G4[120]** |
| 601 | LL0[121] | G0[121] | G4[89] | **G0[121]** | G0[24] | G1[23] | G2[22] | G3[21] |
| 602 | LL1[121] | G1[121] | G4[90] | G1[1] | **G1[121]** | G1[24] | G2[23] | G3[22] |
| 603 | LL2[121] | G2[121] | G4[91] | G1[2] | G2[1] | **G2[121]** | G2[24] | G3[23] |
| 604 | LL3[121] | G3[121] | G4[92] | G1[3] | G2[2] | G3[1] | **G3[121]** | G3[24] |
| 605 | LL4[121] | G4[121] | G4[93] | G1[4] | G2[3] | G3[2] | G4[1] | **G4[121]** |
| 606 | LL0[122] | G0[122] | G4[94] | **G0[122]** | G2[4] | G3[3] | G4[2] | G0[1] |
| 607 | LL1[122] | G1[122] | G4[95] | G1[5] | **G1[122]** | G3[4] | G4[3] | G0[2] |
| 608 | LL2[122] | G2[122] | G4[96] | G1[6] | G2[5] | **G2[122]** | G4[4] | G0[3] |
| 609 | LL3[122] | G3[122] | G4[97] | G1[7] | G2[6] | G3[5] | **G3[122]** | G0[4] |
| 610 | LL4[122] | G4[122] | G4[98] | G1[8] | G2[7] | G3[6] | G4[5] | **G4[122]** |
| 611 | LL0[123] | G0[123] | G4[99] | **G0[123]** | G2[8] | G3[7] | G4[6] | G0[5] |
| 612 | LL1[123] | G1[123] | G4[100] | G2[9] | **G1[123]** | G3[8] | G4[7] | G0[6] |
| 613 | LL2[123] | G2[123] | G4[101] | G2[10] | G3[9] | **G2[123]** | G4[8] | G0[7] |
| 614 | LL3[123] | G3[123] | G4[102] | G2[11] | G3[10] | G4[9] | **G3[123]** | G0[8] |
| 615 | LL4[123] | G4[123] | G4[103] | G2[12] | G3[11] | G4[10] | G0[9] | **G4[123]** |
| 616 | LL0[124] | G0[124] | G4[104] | **G0[124]** | G3[12] | G4[11] | G0[10] | G1[9] |
| 617 | LL1[124] | G1[124] | G4[105] | G2[13] | **G1[124]** | G4[12] | G0[11] | G1[10] |
| 618 | LL2[124] | G2[124] | G4[106] | G2[14] | G3[13] | **G2[124]** | G0[12] | G1[11] |
| 619 | LL3[124] | G3[124] | G4[107] | G2[15] | G3[14] | G4[13] | **G3[124]** | G1[12] |
| 620 | LL4[124] | G4[124] | G4[108] | G2[16] | G3[15] | G4[14] | G0[13] | **G4[124]** |
| 621 | LL0[125] | G0[125] | G4[109] | **G0[125]** | G3[16] | G4[15] | G0[14] | G1[13] |
| 622 | LL1[125] | G1[125] | G4[110] | G3[17] | **G1[125]** | G4[16] | G0[15] | G1[14] |
| 623 | LL2[125] | G2[125] | G4[111] | G3[18] | G4[17] | **G2[125]** | G0[16] | G1[15] |
| 624 | LL3[125] | G3[125] | G4[112] | G3[19] | G4[18] | G0[17] | **G3[125]** | G1[16] |
| 625 | LL4[125] | G4[125] | G4[113] | G3[20] | G4[19] | G0[18] | G1[17] | **G4[125]** |
| 626 | LL0[126] | G0[126] | G4[114] | **G0[126]** | G4[20] | G0[19] | G1[18] | G2[17] |
| 627 | LL1[126] | G1[126] | G4[115] | G3[21] | **G1[126]** | G0[20] | G1[19] | G2[18] |
| 628 | LL2[126] | G2[126] | G4[116] | G3[22] | G4[21] | **G2[126]** | G1[20] | G2[19] |
| 629 | LL3[126] | G3[126] | G4[117] | G3[23] | G4[22] | G0[21] | **G3[126]** | G2[20] |
| 630 | LL4[126] | G4[126] | G4[118] | G3[24] | G4[23] | G0[22] | G1[21] | **G4[126]** |
| 631 | LL0[127] | G0[127] | G4[119] | **G0[127]** | G4[24] | G0[23] | G1[22] | G2[21] |
| 632 | LL1[127] | G1[127] | G4[120] | G4[25] | **G1[127]** | G0[24] | G1[23] | G2[22] |
| 633 | LL2[127] | G2[127] | G4[121] | G4[26] | G0[25] | **G2[127]** | G1[24] | G2[23] |
| 634 | LL3[127] | G3[127] | G4[122] | G4[27] | G0[26] | G1[25] | **G3[127]** | G2[24] |
| 635 | LL4[127] | G4[127] | G4[123] | G4[28] | G0[27] | G1[26] | G2[25] | **G4[127]** |
| 636 | LL0[128] | G0[128] | G4[124] | **G0[128]** | G0[28] | G1[27] | G2[26] | G3[25] |
| 637 | LL1[128] | G1[128] | G4[125] | G4[29] | **G1[128]** | G1[28] | G2[27] | G3[26] |
| 638 | LL2[128] | G2[128] | G4[126] | G4[30] | G0[29] | **G2[128]** | G2[28] | G3[27] |

TABLE 4-continued

| 28G physical lane | | OTL4.4 of | OTL4.4 of FIG. 11 | | | | | |
|---|---|---|---|---|---|---|---|---|
| bit | LL#[bit] | FIG. 4 | No FAS | FAS on 1$^{st}$ 16B group | FAS on 2$^{nd}$ 16B group | FAS on 3$^{rd}$ 16B group | FAS on 4$^{th}$ 16B group | FAS on 5$^{th}$ 16B group |
| 639 | LL3[128] | G3[128] | G4[127] | G4[31] | G0[30] | G1[29] | **G3[128]** | G3[28] |
| 640 | LL4[128] | G4[128] | G4[128] | G4[32] | G0[31] | G1[30] | G2[29] | **G4[128]** |

TABLE 5

| 28G physical lane | | OTL4.4 of | OTL4.4 of FIG. 11 | | | | | |
|---|---|---|---|---|---|---|---|---|
| bit | LL#[bit] | FIG. 4 | No FAS | FAS on 1$^{st}$ 16B group | FAS on 2$^{nd}$ 16B group | FAS on 3$^{rd}$ 16B group | FAS on 4$^{th}$ 16B group | FAS on 5$^{th}$ 16B group |
| 1 | LL0[1] | rs1-s1[1] | rs1-s1[1] | **rs1-s1[1]** | rs4-s1[8] | rs4-s2[7] | rs4-s3[6] | rs4-s4[5] |
| 2 | LL1[1] | rs1-s2[1] | rs1-s1[2] | rs2-s2[1] | **rs1-s2[1]** | rs4-s2[8] | rs4-s3[7] | rs4-s4[6] |
| 3 | LL2[1] | rs1-s3[1] | rs1-s1[3] | rs2-s2[2] | rs2-s3[1] | **rs1-s3[1]** | rs4-s3[8] | rs4-s4[7] |
| 4 | LL3[1] | rs1-s4[1] | rs1-s1[4] | rs2-s2[3] | rs2-s3[2] | rs2-s4[1] | **rs1-s4[1]** | rs4-s4[8] |
| 5 | LL4[1] | rs1-s5[1] | rs1-s1[5] | rs2-s2[4] | rs2-s3[3] | rs2-s4[2] | rs2-s5[1] | **rs1-s5[1]** |
| 6 | LL0[2] | rs1-s1[2] | rs1-s1[6] | **rs1-s1[2]** | rs2-s3[4] | rs2-s4[3] | rs2-s5[2] | rs2-s1[1] |
| 7 | LL1[2] | rs1-s2[2] | rs1-s1[7] | rs2-s2[5] | **rs1-s2[2]** | rs2-s4[4] | rs2-s5[3] | rs2-s1[2] |
| 8 | LL2[2] | rs1-s3[2] | rs1-s1[8] | rs2-s2[6] | rs2-s3[5] | **rs1-s3[2]** | rs2-s5[4] | rs2-s1[3] |
| 9 | LL3[2] | rs1-s4[2] | rs2-s1[1] | rs2-s2[7] | rs2-s3[6] | rs2-s4[5] | **rs1-s4[2]** | rs2-s1[4] |
| 10 | LL4[2] | rs1-s5[2] | rs2-s1[2] | rs2-s2[8] | rs2-s3[7] | rs2-s4[6] | rs2-s5[5] | **rs1-s5[2]** |
| 11 | LL0[3] | rs1-s1[3] | rs2-s1[3] | **rs1-s1[3]** | rs2-s3[8] | rs2-s4[7] | rs2-s5[6] | rs2-s1[5] |
| 12 | LL1[3] | rs1-s2[3] | rs2-s1[4] | rs3-s3[1] | **rs1-s2[3]** | rs2-s4[8] | rs2-s5[7] | rs2-s1[6] |
| 13 | LL2[3] | rs1-s3[3] | rs2-s1[5] | rs3-s3[2] | rs3-s4[1] | **rs1-s3[3]** | rs2-s5[8] | rs2-s1[7] |
| 14 | LL3[3] | rs1-s4[3] | rs2-s1[6] | rs3-s3[3] | rs3-s4[2] | rs3-s5[1] | **rs1-s4[3]** | rs2-s1[8] |
| 15 | LL4[3] | rs1-s5[3] | rs2-s1[7] | rs3-s3[4] | rs3-s4[3] | rs3-s5[2] | rs3-s1[1] | **rs1-s5[3]** |
| 16 | LL0[4] | rs1-s1[4] | rs2-s1[8] | **rs1-s1[4]** | rs3-s4[4] | rs3-s5[3] | rs3-s1[2] | rs3-s2[1] |
| 17 | LL1[4] | rs1-s2[4] | rs3-s1[1] | rs3-s3[5] | **rs1-s2[4]** | rs3-s5[4] | rs3-s1[3] | rs3-s2[2] |
| 18 | LL2[4] | rs1-s3[4] | rs3-s1[2] | rs3-s3[6] | rs3-s4[5] | **rs1-s3[4]** | rs3-s1[4] | rs3-s2[3] |
| 19 | LL3[4] | rs1-s4[4] | rs3-s1[3] | rs3-s3[7] | rs3-s4[6] | rs3-s5[5] | **rs1-s4[4]** | rs3-s2[4] |
| 20 | LL4[4] | rs1-s5[4] | rs3-s1[4] | rs3-s3[8] | rs3-s4[7] | rs3-s5[6] | rs3-s1[5] | **rs1-s5[4]** |
| 21 | LL0[5] | rs1-s1[5] | rs3-s1[5] | **rs1-s1[5]** | rs3-s4[8] | rs3-s5[7] | rs3-s1[6] | rs3-s2[5] |
| 22 | LL1[5] | rs1-s2[5] | rs3-s1[6] | rs4-s4[1] | **rs1-s2[5]** | rs3-s5[8] | rs3-s1[7] | rs3-s2[6] |
| 23 | LL2[5] | rs1-s3[5] | rs3-s1[7] | rs4-s4[2] | rs4-s5[1] | **rs1-s3[5]** | rs3-s1[8] | rs3-s2[7] |
| 24 | LL3[5] | rs1-s4[5] | rs3-s1[8] | rs4-s4[3] | rs4-s5[2] | rs4-s1[1] | **rs1-s4[5]** | rs3-s2[8] |
| 25 | LL4[5] | rs1-s5[5] | rs4-s1[1] | rs4-s4[4] | rs4-s5[3] | rs4-s1[2] | rs4-s2[1] | **rs1-s5[5]** |
| 26 | LL0[6] | rs1-s1[6] | rs4-s1[2] | **rs1-s1[6]** | rs4-s5[4] | rs4-s1[3] | rs4-s2[2] | rs4-s3[1] |
| 27 | LL1[6] | rs1-s2[6] | rs4-s1[3] | rs4-s4[5] | **rs1-s2[6]** | rs4-s1[4] | rs4-s2[3] | rs4-s3[2] |
| 28 | LL2[6] | rs1-s3[6] | rs4-s1[4] | rs4-s4[6] | rs4-s5[5] | **rs1-s3[6]** | rs4-s2[4] | rs4-s3[3] |
| 29 | LL3[6] | rs1-s4[6] | rs4-s1[5] | rs4-s4[7] | rs4-s5[6] | rs4-s1[5] | **rs1-s4[6]** | rs4-s3[4] |
| 30 | LL4[6] | rs1-s5[6] | rs4-s1[6] | rs4-s4[8] | rs4-s5[7] | rs4-s1[6] | rs4-s2[5] | **rs1-s5[6]** |
| 31 | LL0[7] | rs1-s1[7] | rs4-s1[7] | **rs1-s1[7]** | rs4-s5[8] | rs4-s1[7] | rs4-s2[6] | rs4-s3[5] |
| 32 | LL1[7] | rs1-s2[7] | rs4-s1[8] | rs5-s5[1] | **rs1-s2[7]** | rs4-s1[8] | rs4-s2[7] | rs4-s3[6] |
| 33 | LL2[7] | rs1-s3[7] | rs5-s1[1] | rs5-s5[2] | rs5-s1[1] | **rs1-s3[7]** | rs4-s2[8] | rs4-s3[7] |
| 34 | LL3[7] | rs1-s4[7] | rs5-s1[2] | rs5-s5[3] | rs5-s1[2] | rs5-s2[1] | **rs1-s4[7]** | rs4-s3[8] |
| 35 | LL4[7] | rs1-s5[7] | rs5-s1[3] | rs5-s5[4] | rs5-s1[3] | rs5-s2[2] | rs5-s3[1] | **rs1-s5[7]** |
| 36 | LL0[8] | rs1-s1[8] | rs5-s1[4] | **rs1-s1[8]** | rs5-s1[4] | rs5-s2[3] | rs5-s3[2] | rs5-s4[1] |
| 37 | LL1[8] | rs1-s2[8] | rs5-s1[5] | rs5-s5[5] | **rs1-s2[8]** | rs5-s2[4] | rs5-s3[3] | rs5-s4[2] |
| 38 | LL2[8] | rs1-s3[8] | rs5-s1[6] | rs5-s5[6] | rs5-s1[5] | **rs1-s3[8]** | rs5-s3[4] | rs5-s4[3] |
| 39 | LL3[8] | rs1-s4[8] | rs5-s1[7] | rs5-s5[7] | rs5-s1[6] | rs5-s2[5] | **rs1-s4[8]** | rs5-s4[4] |
| 40 | LL4[8] | rs1-s5[8] | rs5-s1[8] | rs5-s5[8] | rs5-s1[7] | rs5-s2[6] | rs5-s3[5] | **rs1-s5[8]** |
| 41 | LL0[9] | rs2-s1[1] | rs6-s1[1] | **rs2-s1[1]** | rs5-s1[8] | rs5-s2[7] | rs5-s3[6] | rs5-s4[5] |
| 42 | LL1[9] | rs2-s2[1] | rs6-s1[2] | rs3-s2[1] | **rs2-s2[1]** | rs5-s2[8] | rs5-s3[7] | rs5-s4[6] |
| 43 | LL2[9] | rs2-s3[1] | rs6-s1[3] | rs3-s2[2] | rs3-s3[1] | **rs2-s3[1]** | rs5-s3[8] | rs5-s4[7] |
| 44 | LL3[9] | rs2-s4[1] | rs6-s1[4] | rs3-s2[3] | rs3-s3[2] | rs3-s4[1] | **rs2-s4[1]** | rs5-s4[8] |
| 45 | LL4[9] | rs2-s5[1] | rs6-s1[5] | rs3-s2[4] | rs3-s3[3] | rs3-s4[2] | rs3-s5[1] | **rs2-s5[1]** |
| 46 | LL0[10] | rs2-s1[2] | rs6-s1[6] | **rs2-s1[2]** | rs3-s3[4] | rs3-s4[3] | rs3-s5[2] | rs3-s1[1] |
| 47 | LL1[10] | rs2-s2[2] | rs6-s1[7] | rs3-s2[5] | **rs2-s2[2]** | rs3-s4[4] | rs3-s5[3] | rs3-s1[2] |
| 48 | LL2[10] | rs2-s3[2] | rs6-s1[8] | rs3-s2[6] | rs3-s3[5] | **rs2-s3[2]** | rs3-s5[4] | rs3-s1[3] |
| 49 | LL3[10] | rs2-s4[2] | rs7-s1[1] | rs3-s2[7] | rs3-s3[6] | rs3-s4[5] | **rs2-s4[2]** | rs3-s1[4] |
| 50 | LL4[10] | rs2-s5[2] | rs7-s1[2] | rs3-s2[8] | rs3-s3[7] | rs3-s4[6] | rs3-s5[5] | **rs2-s5[2]** |
| 51 | LL0[11] | rs2-s1[3] | rs7-s1[3] | **rs2-s1[3]** | rs3-s3[8] | rs3-s4[7] | rs3-s5[6] | rs3-s1[5] |
| 52 | LL1[11] | rs2-s2[3] | rs7-s1[4] | rs4-s3[1] | **rs2-s2[3]** | rs3-s4[8] | rs3-s5[7] | rs3-s1[6] |
| 53 | LL2[11] | rs2-s3[3] | rs7-s1[5] | rs4-s3[2] | rs4-s4[1] | **rs2-s3[3]** | rs3-s5[8] | rs3-s1[7] |
| 54 | LL3[11] | rs2-s4[3] | rs7-s1[6] | rs4-s3[3] | rs4-s4[2] | rs4-s5[1] | **rs2-s4[3]** | rs3-s1[8] |
| 55 | LL4[11] | rs2-s5[3] | rs7-s1[7] | rs4-s3[4] | rs4-s4[3] | rs4-s5[2] | rs4-s1[1] | **rs2-s5[3]** |
| 56 | LL0[12] | rs2-s1[4] | rs7-s1[8] | **rs2-s1[4]** | rs4-s4[4] | rs4-s5[3] | rs4-s1[2] | rs4-s2[1] |
| 57 | LL1[12] | rs2-s2[4] | rs8-s1[1] | rs4-s3[5] | **rs2-s2[4]** | rs4-s5[4] | rs4-s1[3] | rs4-s2[2] |
| 58 | LL2[12] | rs2-s3[4] | rs8-s1[2] | rs4-s3[6] | rs4-s4[5] | **rs2-s3[4]** | rs4-s1[4] | rs4-s2[3] |
| 59 | LL3[12] | rs2-s4[4] | rs8-s1[3] | rs4-s3[7] | rs4-s4[6] | rs4-s5[5] | **rs2-s4[4]** | rs4-s2[4] |
| 60 | LL4[12] | rs2-s5[4] | rs8-s1[4] | rs4-s3[8] | rs4-s4[7] | rs4-s5[6] | rs4-s1[5] | **rs2-s5[4]** |

TABLE 5-continued

| 28G physical lane | | OTL4.4 of | OTL4.4 of FIG. 11 | | | | | | |
|---|---|---|---|---|---|---|---|---|---|
| | | | | FAS on 1$^{st}$ | FAS on 2$^{nd}$ | FAS on 3$^{rd}$ | FAS on 4$^{th}$ | FAS on 5$^{th}$ |
| bit | LL#[bit] | FIG. 4 | No FAS | 16B group | 16B group | 16B group | 16B group | 16B group |
| 61 | LL0[13] | rs2-s1[5] | rs8-s1[5] | **rs2-s1[5]** | rs4-s4[8] | rs4-s5[7] | rs4-s1[6] | rs4-s2[5] |
| 62 | LL1[13] | rs2-s2[5] | rs8-s1[6] | rs5-s4[1] | **rs2-s2[5]** | rs4-s5[8] | rs4-s1[7] | rs4-s2[6] |
| 63 | LL2[13] | rs2-s3[5] | rs8-s1[7] | rs5-s4[2] | rs5-s5[1] | **rs2-s3[5]** | rs4-s1[8] | rs4-s2[7] |
| 64 | LL3[13] | rs2-s4[5] | rs8-s1[8] | rs5-s4[3] | rs5-s5[2] | rs5-s1[1] | **rs2-s4[5]** | rs4-s2[8] |
| 65 | LL4[13] | rs2-s5[5] | rs9-s1[1] | rs5-s4[4] | rs5-s5[3] | rs5-s1[2] | rs5-s2[1] | **rs2-s5[5]** |
| 66 | LL0[14] | rs2-s1[6] | rs9-s1[2] | **rs2-s1[6]** | rs5-s5[4] | rs5-s1[3] | rs5-s2[2] | rs5-s3[1] |
| 67 | LL1[14] | rs2-s2[6] | rs9-s1[3] | rs5-s4[5] | **rs2-s2[6]** | rs5-s1[4] | rs5-s2[3] | rs5-s3[2] |
| 68 | LL2[14] | rs2-s3[6] | rs9-s1[4] | rs5-s4[6] | rs5-s5[5] | **rs2-s3[6]** | rs5-s2[4] | rs5-s3[3] |
| 69 | LL3[14] | rs2-s4[6] | rs9-s1[5] | rs5-s4[7] | rs5-s5[6] | rs5-s1[5] | **rs2-s4[6]** | rs5-s3[4] |
| 70 | LL4[14] | rs2-s5[6] | rs9-s1[6] | rs5-s4[8] | rs5-s5[7] | rs5-s1[6] | rs5-s2[5] | **rs2-s5[6]** |
| 71 | LL0[15] | rs2-s1[7] | rs9-s1[7] | **rs2-s1[7]** | rs5-s5[8] | rs5-s1[7] | rs5-s2[6] | rs5-s3[5] |
| 72 | LL1[15] | rs2-s2[7] | rs9-s1[8] | rs6-s5[1] | **rs2-s2[7]** | rs5-s1[8] | rs5-s2[7] | rs5-s3[6] |
| 73 | LL2[15] | rs2-s3[7] | rs10-s1[1] | rs6-s5[2] | rs6-s1[1] | **rs2-s3[7]** | rs5-s2[8] | rs5-s3[7] |
| 74 | LL3[15] | rs2-s4[7] | rs10-s1[2] | rs6-s5[3] | rs6-s1[2] | rs6-s2[1] | **rs2-s4[7]** | rs5-s3[8] |
| 75 | LL4[15] | rs2-s5[7] | rs10-s1[3] | rs6-s5[4] | rs6-s1[3] | rs6-s2[2] | rs6-s3[1] | **rs2-s5[7]** |
| 76 | LL0[16] | rs2-s1[8] | rs10-s1[4] | **rs2-s1[8]** | rs6-s1[4] | rs6-s2[3] | rs6-s3[2] | rs6-s4[1] |
| 77 | LL1[16] | rs2-s2[8] | rs10-s1[5] | rs6-s5[5] | **rs2-s2[8]** | rs6-s2[4] | rs6-s3[3] | rs6-s4[2] |
| 78 | LL2[16] | rs2-s3[8] | rs10-s1[6] | rs6-s5[6] | rs6-s1[5] | **rs2-s3[8]** | rs6-s3[4] | rs6-s4[3] |
| 79 | LL3[16] | rs2-s4[8] | rs10-s1[7] | rs6-s5[7] | rs6-s1[6] | rs6-s2[5] | **rs2-s4[8]** | rs6-s4[4] |
| 80 | LL4[16] | rs2-s5[8] | rs10-s1[8] | rs6-s5[8] | rs6-s1[7] | rs6-s2[6] | rs6-s3[5] | **rs2-s5[8]** |
| 81 | LL0[17] | rs3-s1[1] | rs11-s1[1] | **rs3-s1[1]** | rs6-s1[8] | rs6-s2[7] | rs6-s3[6] | rs6-s4[5] |
| 82 | LL1[17] | rs3-s2[1] | rs11-s1[2] | rs4-s2[1] | **rs3-s2[1]** | rs6-s2[8] | rs6-s3[7] | rs6-s4[6] |
| 83 | LL2[17] | rs3-s3[1] | rs11-s1[3] | rs4-s2[2] | rs4-s3[1] | **rs3-s3[1]** | rs6-s3[8] | rs6-s4[7] |
| 84 | LL3[17] | rs3-s4[1] | rs11-s1[4] | rs4-s2[3] | rs4-s3[2] | rs4-s4[1] | **rs3-s4[1]** | rs6-s4[8] |
| 85 | LL4[17] | rs3-s5[1] | rs11-s1[5] | rs4-s2[4] | rs4-s3[3] | rs4-s4[2] | rs4-s5[1] | **rs3-s5[1]** |
| 86 | LL0[18] | rs3-s1[2] | rs11-s1[6] | **rs3-s1[2]** | rs4-s3[4] | rs4-s4[3] | rs4-s5[2] | rs4-s1[1] |
| 87 | LL1[18] | rs3-s2[2] | rs11-s1[7] | rs4-s2[5] | **rs3-s2[2]** | rs4-s4[4] | rs4-s5[3] | rs4-s1[2] |
| 88 | LL2[18] | rs3-s3[2] | rs11-s1[8] | rs4-s2[6] | rs4-s3[5] | **rs3-s3[2]** | rs4-s5[4] | rs4-s1[3] |
| 89 | LL3[18] | rs3-s4[2] | rs12-s1[1] | rs4-s2[7] | rs4-s3[6] | rs4-s4[5] | **rs3-s4[2]** | rs4-s1[4] |
| 90 | LL4[18] | rs3-s5[2] | rs12-s1[2] | rs4-s2[8] | rs4-s3[7] | rs4-s4[6] | rs4-s5[5] | **rs3-s5[2]** |
| 91 | LL0[19] | rs3-s1[3] | rs12-s1[3] | **rs3-s1[3]** | rs4-s3[8] | rs4-s4[7] | rs4-s5[6] | rs4-s1[5] |
| 92 | LL1[19] | rs3-s2[3] | rs12-s1[4] | rs5-s3[1] | **rs3-s2[3]** | rs4-s4[8] | rs4-s5[7] | rs4-s1[6] |
| 93 | LL2[19] | rs3-s3[3] | rs12-s1[5] | rs5-s3[2] | rs5-s4[1] | **rs3-s3[3]** | rs4-s5[8] | rs4-s1[7] |
| 94 | LL3[19] | rs3-s4[3] | rs12-s1[6] | rs5-s3[3] | rs5-s4[2] | rs5-s5[1] | **rs3-s4[3]** | rs4-s1[8] |
| 95 | LL4[19] | rs3-s5[3] | rs12-s1[7] | rs5-s3[4] | rs5-s4[3] | rs5-s5[2] | rs5-s1[1] | **rs3-s5[3]** |
| 96 | LL0[20] | rs3-s1[4] | rs12-s1[8] | **rs3-s1[4]** | rs5-s4[4] | rs5-s5[3] | rs5-s1[2] | rs5-s2[1] |
| 97 | LL1[20] | rs3-s2[4] | rs13-s1[1] | rs5-s3[5] | **rs3-s2[4]** | rs5-s5[4] | rs5-s1[3] | rs5-s2[2] |
| 98 | LL2[20] | rs3-s3[4] | rs13-s1[2] | rs5-s3[6] | rs5-s4[5] | **rs3-s3[4]** | rs5-s1[4] | rs5-s2[3] |
| 99 | LL3[20] | rs3-s4[4] | rs13-s1[3] | rs5-s3[7] | rs5-s4[6] | rs5-s5[5] | **rs3-s4[4]** | rs5-s2[4] |
| 100 | LL4[20] | rs3-s5[4] | rs13-s1[4] | rs5-s3[8] | rs5-s4[7] | rs5-s5[6] | rs5-s1[5] | **rs3-s5[4]** |
| 101 | LL0[21] | rs3-s1[5] | rs13-s1[5] | **rs3-s1[5]** | rs5-s4[8] | rs5-s5[7] | rs5-s1[6] | rs5-s2[5] |
| 102 | LL1[21] | rs3-s2[5] | rs13-s1[6] | rs6-s4[1] | **rs3-s2[5]** | rs5-s5[8] | rs5-s1[7] | rs5-s2[6] |
| 103 | LL2[21] | rs3-s3[5] | rs13-s1[7] | rs6-s4[2] | rs6-s5[1] | **rs3-s3[5]** | rs5-s1[8] | rs5-s2[7] |
| 104 | LL3[21] | rs3-s4[5] | rs13-s1[8] | rs6-s4[3] | rs6-s5[2] | rs6-s1[1] | **rs3-s4[5]** | rs5-s2[8] |
| 105 | LL4[21] | rs3-s5[5] | rs14-s1[1] | rs6-s4[4] | rs6-s5[3] | rs6-s1[2] | rs6-s2[1] | **rs3-s5[5]** |
| 106 | LL0[22] | rs3-s1[6] | rs14-s1[2] | **rs3-s1[6]** | rs6-s5[4] | rs6-s1[3] | rs6-s2[2] | rs6-s3[1] |
| 107 | LL1[22] | rs3-s2[6] | rs14-s1[3] | rs6-s4[5] | **rs3-s2[6]** | rs6-s1[4] | rs6-s2[3] | rs6-s3[2] |
| 108 | LL2[22] | rs3-s3[6] | rs14-s1[4] | rs6-s4[6] | rs6-s5[5] | **rs3-s3[6]** | rs6-s2[4] | rs6-s3[3] |
| 109 | LL3[22] | rs3-s4[6] | rs14-s1[5] | rs6-s4[7] | rs6-s5[6] | rs6-s1[5] | **rs3-s4[6]** | rs6-s3[4] |
| 110 | LL4[22] | rs3-s5[6] | rs14-s1[6] | rs6-s4[8] | rs6-s5[7] | rs6-s1[6] | rs6-s2[5] | **rs3-s5[6]** |
| 111 | LL0[23] | rs3-s1[7] | rs14-s1[7] | **rs3-s1[7]** | rs6-s5[8] | rs6-s1[7] | rs6-s2[6] | rs6-s3[5] |
| 112 | LL1[23] | rs3-s2[7] | rs14-s1[8] | rs7-s5[1] | **rs3-s2[7]** | rs6-s1[8] | rs6-s2[7] | rs6-s3[6] |
| 113 | LL2[23] | rs3-s3[7] | rs15-s1[1] | rs7-s5[2] | rs7-s1[1] | **rs3-s3[7]** | rs6-s2[8] | rs6-s3[7] |
| 114 | LL3[23] | rs3-s4[7] | rs15-s1[2] | rs7-s5[3] | rs7-s1[2] | rs7-s2[1] | **rs3-s4[7]** | rs6-s3[8] |
| 115 | LL4[23] | rs3-s5[7] | rs15-s1[3] | rs7-s5[4] | rs7-s1[3] | rs7-s2[2] | rs7-s3[1] | **rs3-s5[7]** |
| 116 | LL0[24] | rs3-s1[8] | rs15-s1[4] | **rs3-s1[8]** | rs7-s1[4] | rs7-s2[3] | rs7-s3[2] | rs7-s4[1] |
| 117 | LL1[24] | rs3-s2[8] | rs15-s1[5] | rs7-s5[5] | **rs3-s2[8]** | rs7-s2[4] | rs7-s3[3] | rs7-s4[2] |
| 118 | LL2[24] | rs3-s3[8] | rs15-s1[6] | rs7-s5[6] | rs7-s1[5] | **rs3-s3[8]** | rs7-s3[4] | rs7-s4[3] |
| 119 | LL3[24] | rs3-s4[8] | rs15-s1[7] | rs7-s5[7] | rs7-s1[6] | rs7-s2[5] | **rs3-s4[8]** | rs7-s4[4] |
| 120 | LL4[24] | rs3-s5[8] | rs15-s1[8] | rs7-s5[8] | rs7-s1[7] | rs7-s2[6] | rs7-s3[5] | **rs3-s5[8]** |
| 121 | LL0[25] | rs4-s1[1] | rs16-s1[1] | **rs4-s1[1]** | rs7-s1[8] | rs7-s2[7] | rs7-s3[6] | rs7-s4[5] |
| 122 | LL1[25] | rs4-s2[1] | rs16-s1[2] | rs5-s2[1] | **rs4-s2[1]** | rs7-s2[8] | rs7-s3[7] | rs7-s4[6] |
| 123 | LL2[25] | rs4-s3[1] | rs16-s1[3] | rs5-s2[2] | rs5-s3[1] | **rs4-s3[1]** | rs7-s3[8] | rs7-s4[7] |
| 124 | LL3[25] | rs4-s4[1] | rs16-s1[4] | rs5-s2[3] | rs5-s3[2] | rs5-s4[1] | **rs4-s4[1]** | rs7-s4[8] |
| 125 | LL4[25] | rs4-s5[1] | rs16-s1[5] | rs5-s2[4] | rs5-s3[3] | rs5-s4[2] | rs5-s5[1] | **rs4-s5[1]** |
| 126 | LL0[26] | rs4-s1[2] | rs16-s1[6] | **rs4-s1[2]** | rs5-s3[4] | rs5-s4[3] | rs5-s5[2] | rs5-s1[1] |
| 127 | LL1[26] | rs4-s2[2] | rs16-s1[7] | rs5-s2[5] | **rs4-s2[2]** | rs5-s4[4] | rs5-s5[3] | rs5-s1[2] |
| 128 | LL2[26] | rs4-s3[2] | rs16-s1[8] | rs5-s2[6] | rs5-s3[5] | **rs4-s3[2]** | rs5-s5[4] | rs5-s1[3] |
| 129 | LL3[26] | rs4-s4[2] | rs1-s2[1] | rs5-s2[7] | rs5-s3[6] | rs5-s4[5] | **rs4-s4[2]** | rs5-s1[4] |
| 130 | LL4[26] | rs4-s5[2] | rs1-s2[2] | rs5-s2[8] | rs5-s3[7] | rs5-s4[6] | rs5-s5[5] | **rs4-s5[2]** |
| 131 | LL0[27] | rs4-s1[3] | rs1-s2[3] | **rs4-s1[3]** | rs5-s3[8] | rs5-s4[7] | rs5-s5[6] | rs5-s1[5] |
| 132 | LL1[27] | rs4-s2[3] | rs1-s2[4] | rs6-s3[1] | **rs4-s2[3]** | rs5-s4[8] | rs5-s5[7] | rs5-s1[6] |
| 133 | LL2[27] | rs4-s3[3] | rs1-s2[5] | rs6-s3[2] | rs6-s4[1] | **rs4-s3[3]** | rs5-s5[8] | rs5-s1[7] |
| 134 | LL3[27] | rs4-s4[3] | rs1-s2[6] | rs6-s3[3] | rs6-s4[2] | rs6-s5[1] | **rs4-s4[3]** | rs5-s1[8] |

TABLE 5-continued

| 28G physical lane | | OTL4.4 of | OTL4.4 of FIG. 11 | | | | | |
|---|---|---|---|---|---|---|---|---|
| bit | LL#[bit] | FIG. 4 | No FAS | FAS on 1$^{st}$ 16B group | FAS on 2$^{nd}$ 16B group | FAS on 3$^{rd}$ 16B group | FAS on 4$^{th}$ 16B group | FAS on 5$^{th}$ 16B group |
| 135 | LL4[27] | rs4-s5[3] | rs1-s2[7] | rs6-s3[4] | rs6-s4[3] | rs6-s5[2] | rs6-s1[1] | **rs4-s5[3]** |
| . . . | . . . | . . . | . . . | . . . | . . . | . . . | . . . | . . . |
| . . . | . . . | . . . | . . . | . . . | . . . | . . . | . . . | . . . |
| . . . | . . . | . . . | . . . | . . . | . . . | . . . | . . . | . . . |
| 556 | LL0[112] | rs14-s1[8] | rs6-s5[4] | **rs14-s1[8]** | rs2-s1[4] | rs2-s2[3] | rs2-s3[2] | rs2-s4[1] |
| 557 | LL1[112] | rs14-s2[8] | rs6-s5[5] | rs2-s5[5] | **rs14-s2[8]** | rs2-s2[4] | rs2-s3[3] | rs2-s4[2] |
| 558 | LL2[112] | rs14-s3[8] | rs6-s5[6] | rs2-s5[6] | rs2-s1[5] | **rs14-s3[8]** | rs2-s3[4] | rs2-s4[3] |
| 559 | LL3[112] | rs14-s4[8] | rs6-s5[7] | rs2-s5[7] | rs2-s1[6] | rs2-s2[5] | **rs14-s4[8]** | rs2-s4[4] |
| 560 | LL4[112] | rs14-s5[8] | rs6-s5[8] | rs2-s5[8] | rs2-s1[7] | rs2-s2[6] | rs2-s3[5] | **rs14-s5[8]** |
| 561 | LL0[113] | rs15-s1[1] | rs7-s5[1] | **rs15-s1[1]** | rs2-s1[8] | rs2-s2[7] | rs2-s3[6] | rs2-s4[5] |
| 562 | LL1[113] | rs15-s2[1] | rs7-s5[2] | rs16-s2[1] | **rs15-s2[1]** | rs2-s2[8] | rs2-s3[7] | rs2-s4[6] |
| 563 | LL2[113] | rs15-s3[1] | rs7-s5[3] | rs16-s2[2] | rs16-s3[1] | **rs15-s3[1]** | rs2-s3[8] | rs2-s4[7] |
| 564 | LL3[113] | rs15-s4[1] | rs7-s5[4] | rs16-s2[3] | rs16-s3[2] | rs16-s4[1] | **rs15-s4[1]** | rs2-s4[8] |
| 565 | LL4[113] | rs15-s5[1] | rs7-s5[5] | rs16-s2[4] | rs16-s3[3] | rs16-s4[2] | rs16-s5[1] | **rs15-s5[1]** |
| 566 | LL0[114] | rs15-s1[2] | rs7-s5[6] | **rs15-s1[2]** | rs16-s3[4] | rs16-s4[3] | rs16-s5[2] | rs16-s1[1] |
| 567 | LL1[114] | rs15-s2[2] | rs7-s5[7] | rs16-s2[5] | **rs15-s2[2]** | rs16-s4[4] | rs16-s5[3] | rs16-s1[2] |
| 568 | LL2[114] | rs15-s3[2] | rs7-s5[8] | rs16-s2[6] | rs16-s3[5] | **rs15-s3[2]** | rs16-s5[4] | rs16-s1[3] |
| 569 | LL3[114] | rs15-s4[2] | rs8-s5[1] | rs16-s2[7] | rs16-s3[6] | rs16-s4[5] | **rs15-s4[2]** | rs16-s1[4] |
| 560 | LL4[114] | rs15-s5[2] | rs8-s5[2] | rs16-s2[8] | rs16-s3[7] | rs16-s4[6] | rs16-s5[5] | **rs15-s5[2]** |
| 571 | LL0[115] | rs15-s1[3] | rs8-s5[3] | **rs15-s1[3]** | rs16-s3[8] | rs16-s4[7] | rs16-s5[6] | rs16-s1[5] |
| 572 | LL1[115] | rs15-s2[3] | rs8-s5[4] | rs1-s3[1] | **rs15-s2[3]** | rs16-s4[8] | rs16-s5[7] | rs16-s1[6] |
| 573 | LL2[115] | rs15-s3[3] | rs8-s5[5] | rs1-s3[2] | rs1-s4[1] | **rs15-s3[3]** | rs16-s5[8] | rs16-s1[7] |
| 574 | LL3[115] | rs15-s4[3] | rs8-s5[6] | rs1-s3[3] | rs1-s4[2] | rs1-s5[1] | **rs15-s4[3]** | rs16-s1[8] |
| 575 | LL4[115] | rs15-s5[3] | rs8-s5[7] | rs1-s3[4] | rs1-s4[3] | rs1-s5[2] | rs1-s1[1] | **rs15-s5[3]** |
| 576 | LL0[116] | rs15-s1[4] | rs8-s5[8] | **rs15-s1[4]** | rs1-s4[4] | rs1-s5[3] | rs1-s1[2] | rs1-s2[1] |
| 577 | LL1[116] | rs15-s2[4] | rs9-s5[1] | rs1-s3[5] | **rs15-s2[4]** | rs1-s5[4] | rs1-s1[3] | rs1-s2[2] |
| 578 | LL2[116] | rs15-s3[4] | rs9-s5[2] | rs1-s3[6] | rs1-s4[5] | **rs15-s3[4]** | rs1-s1[4] | rs1-s2[3] |
| 579 | LL3[116] | rs15-s4[4] | rs9-s5[3] | rs1-s3[7] | rs1-s4[6] | rs1-s5[5] | **rs15-s4[4]** | rs1-s2[4] |
| 580 | LL4[116] | rs15-s5[4] | rs9-s5[4] | rs1-s3[8] | rs1-s4[7] | rs1-s5[6] | rs1-s1[5] | **rs15-s5[4]** |
| 581 | LL0[117] | rs15-s1[5] | rs9-s5[5] | **rs15-s1[5]** | rs1-s4[8] | rs1-s5[7] | rs1-s1[6] | rs1-s2[5] |
| 582 | LL1[117] | rs15-s2[5] | rs9-s5[6] | rs2-s4[1] | **rs15-s2[5]** | rs1-s5[8] | rs1-s1[7] | rs1-s2[6] |
| 583 | LL2[117] | rs15-s3[5] | rs9-s5[7] | rs2-s4[2] | rs2-s5[1] | **rs15-s3[5]** | rs1-s1[8] | rs1-s2[7] |
| 584 | LL3[117] | rs15-s4[5] | rs9-s5[8] | rs2-s4[3] | rs2-s5[2] | rs2-s1[1] | **rs15-s4[5]** | rs1-s2[8] |
| 585 | LL4[117] | rs15-s5[5] | rs10-s5[1] | rs2-s4[4] | rs2-s5[3] | rs2-s1[2] | rs2-s2[1] | **rs15-s5[5]** |
| 586 | LL0[118] | rs15-s1[6] | rs10-s5[2] | **rs15-s1[6]** | rs2-s5[4] | rs2-s1[3] | rs2-s2[2] | rs2-s3[1] |
| 587 | LL0[119] | rs15-s2[6] | rs10-s5[3] | rs2-s4[5] | **rs15-s2[6]** | rs2-s1[4] | rs2-s2[3] | rs2-s3[2] |
| 588 | LL0[120] | rs15-s3[6] | rs10-s5[4] | rs2-s4[6] | rs2-s5[5] | **rs15-s3[6]** | rs2-s2[4] | rs2-s3[3] |
| 589 | LL0[121] | rs15-s4[6] | rs10-s5[5] | rs2-s4[7] | rs2-s5[6] | rs2-s1[5] | **rs15-s4[6]** | rs2-s3[4] |
| 590 | LL0[122] | rs15-s5[6] | rs10-s5[6] | rs2-s4[8] | rs2-s5[7] | rs2-s1[6] | rs2-s2[5] | **rs15-s5[6]** |
| 591 | LL0[119] | rs15-s1[7] | rs10-s5[7] | **rs15-s1[7]** | rs2-s5[8] | rs2-s1[7] | rs2-s2[6] | rs2-s3[5] |
| 592 | LL1[119] | rs15-s2[7] | rs10-s5[8] | rs3-s5[1] | **rs15-s2[7]** | rs2-s1[8] | rs2-s2[7] | rs2-s3[6] |
| 593 | LL2[119] | rs15-s3[7] | rs11-s5[1] | rs3-s5[2] | rs3-s1[1] | **rs15-s3[7]** | rs2-s2[8] | rs2-s3[7] |
| 594 | LL3[119] | rs15-s4[7] | rs11-s5[2] | rs3-s5[3] | rs3-s1[2] | rs3-s2[1] | **rs15-s4[7]** | rs2-s3[8] |
| 595 | LL4[119] | rs15-s5[7] | rs11-s5[3] | rs3-s5[4] | rs3-s1[3] | rs3-s2[2] | rs3-s3[1] | **rs15-s5[7]** |
| 596 | LL0[120] | rs15-s1[8] | rs11-s5[4] | **rs15-s1[8]** | rs3-s1[4] | rs3-s2[3] | rs3-s3[2] | rs3-s4[1] |
| 597 | LL1[120] | rs15-s2[8] | rs11-s5[5] | rs3-s5[5] | **rs15-s2[8]** | rs3-s2[4] | rs3-s3[3] | rs3-s4[2] |
| 598 | LL2[120] | rs15-s3[8] | rs11-s5[6] | rs3-s5[6] | rs3-s1[5] | **rs15-s3[8]** | rs3-s3[4] | rs3-s4[3] |
| 599 | LL3[120] | rs15-s4[8] | rs11-s5[7] | rs3-s5[7] | rs3-s1[6] | rs3-s2[5] | **rs15-s4[8]** | rs3-s4[4] |
| 600 | LL4[120] | rs15-s5[8] | rs11-s5[8] | rs3-s5[8] | rs3-s1[7] | rs3-s2[6] | rs3-s3[5] | **rs15-s5[8]** |
| 601 | LL0[121] | rs16-s1[1] | rs12-s5[1] | **rs16-s1[1]** | rs3-s1[8] | rs3-s2[7] | rs3-s3[6] | rs3-s4[5] |
| 602 | LL1[121] | rs16-s2[1] | rs12-s5[2] | rs1-s2[1] | **rs16-s2[1]** | rs3-s2[8] | rs3-s3[7] | rs3-s4[6] |
| 603 | LL2[121] | rs16-s3[1] | rs12-s5[3] | rs1-s2[2] | rs1-s3[1] | **rs16-s3[1]** | rs3-s3[8] | rs3-s4[7] |
| 604 | LL3[121] | rs16-s4[1] | rs12-s5[4] | rs1-s2[3] | rs1-s3[2] | rs1-s4[1] | **rs16-s4[1]** | rs3-s4[8] |
| 605 | LL4[121] | rs16-s5[1] | rs12-s5[5] | rs1-s2[4] | rs1-s3[3] | rs1-s4[2] | rs1-s5[1] | **rs16-s5[1]** |
| 606 | LL0[122] | rs16-s1[2] | rs12-s5[6] | **rs16-s1[2]** | rs1-s3[4] | rs1-s4[3] | rs1-s5[2] | rs1-s1[1] |
| 607 | LL1[122] | rs16-s2[2] | rs12-s5[7] | rs1-s2[5] | **rs16-s2[2]** | rs1-s4[4] | rs1-s5[3] | rs1-s1[2] |
| 608 | LL2[122] | rs16-s3[2] | rs12-s5[8] | rs1-s2[6] | rs1-s3[5] | **rs16-s3[2]** | rs1-s5[4] | rs1-s1[3] |
| 609 | LL3[122] | rs16-s4[2] | rs13-s5[1] | rs1-s2[7] | rs1-s3[6] | rs1-s4[5] | **rs16-s4[2]** | rs1-s1[4] |
| 610 | LL4[122] | rs16-s5[2] | rs13-s5[2] | rs1-s2[8] | rs1-s3[7] | rs1-s4[6] | rs1-s5[5] | **rs16-s5[2]** |
| 611 | LL0[123] | rs16-s1[3] | rs13-s5[3] | **rs16-s1[3]** | rs1-s3[8] | rs1-s4[7] | rs1-s5[6] | rs1-s1[5] |
| 612 | LL1[123] | rs16-s2[3] | rs13-s5[4] | rs2-s3[1] | **rs16-s2[3]** | rs1-s4[8] | rs1-s5[7] | rs1-s1[6] |
| 613 | LL2[123] | rs16-s3[3] | rs13-s5[5] | rs2-s3[2] | rs2-s4[1] | **rs16-s3[3]** | rs1-s5[8] | rs1-s1[7] |
| 614 | LL3[123] | rs16-s4[3] | rs13-s5[6] | rs2-s3[3] | rs2-s4[2] | rs2-s5[1] | **rs16-s4[3]** | rs1-s1[8] |
| 615 | LL4[123] | rs16-s5[3] | rs13-s5[7] | rs2-s3[4] | rs2-s4[3] | rs2-s5[2] | rs2-s1[1] | **rs16-s5[3]** |
| 616 | LL0[124] | rs16-s1[4] | rs13-s5[8] | **rs16-s1[4]** | rs2-s4[4] | rs2-s5[3] | rs2-s1[2] | rs2-s2[1] |
| 617 | LL1[124] | rs16-s2[4] | rs14-s5[1] | rs2-s3[5] | **rs16-s2[4]** | rs2-s5[4] | rs2-s1[3] | rs2-s2[2] |
| 618 | LL2[124] | rs16-s3[4] | rs14-s5[2] | rs2-s3[6] | rs2-s4[5] | **rs16-s3[4]** | rs2-s1[4] | rs2-s2[3] |
| 619 | LL3[124] | rs16-s4[4] | rs14-s5[3] | rs2-s3[7] | rs2-s4[6] | rs2-s5[5] | **rs16-s4[4]** | rs2-s2[4] |
| 620 | LL4[124] | rs16-s5[4] | rs14-s5[4] | rs2-s3[8] | rs2-s4[7] | rs2-s5[6] | rs2-s1[5] | **rs16-s5[4]** |
| 621 | LL0[125] | rs16-s1[5] | rs14-s5[5] | **rs16-s1[5]** | rs2-s4[8] | rs2-s5[7] | rs2-s1[6] | rs2-s2[5] |
| 622 | LL1[125] | rs16-s2[5] | rs14-s5[6] | rs3-s4[1] | **rs16-s2[5]** | rs2-s5[8] | rs2-s1[7] | rs2-s2[6] |
| 623 | LL2[125] | rs16-s3[5] | rs14-s5[7] | rs3-s4[2] | rs3-s5[1] | **rs16-s3[5]** | rs2-s1[8] | rs2-s2[7] |
| 624 | LL3[125] | rs16-s4[5] | rs14-s5[8] | rs3-s4[3] | rs3-s5[2] | rs3-s1[1] | **rs16-s4[5]** | rs2-s2[8] |
| 625 | LL4[125] | rs16-s5[5] | rs15-s5[1] | rs3-s4[4] | rs3-s5[3] | rs3-s1[2] | rs3-s2[1] | **rs16-s5[5]** |

TABLE 5-continued

| 28G physical lane | | OTL4.4 of | OTL4.4 of FIG. 11 | | | | | |
|---|---|---|---|---|---|---|---|---|
| | | | | FAS on 1$^{st}$ | FAS on 2$^{nd}$ | FAS on 3$^{rd}$ | FAS on 4$^{th}$ | FAS on 5$^{th}$ |
| bit | LL#[bit] | FIG. 4 | No FAS | 16B group | 16B group | 16B group | 16B group | 16B group |
| 626 | LL0[126] | rs16-s1[6] | rs15-s5[2] | **rs16-s1[6]** | rs3-s5[4] | rs3-s1[3] | rs3-s2[2] | rs3-s3[1] |
| 627 | LL1[126] | rs16-s2[6] | rs15-s5[3] | rs3-s4[5] | **rs16-s2[6]** | rs3-s1[4] | rs3-s2[3] | rs3-s3[2] |
| 628 | LL2[126] | rs16-s3[6] | rs15-s5[4] | rs3-s4[6] | rs3-s5[5] | **rs16-s3[6]** | rs3-s2[4] | rs3-s3[3] |
| 629 | LL3[126] | rs16-s4[6] | rs15-s5[5] | rs3-s4[7] | rs3-s5[6] | rs3-s1[5] | **rs16-s4[6]** | rs3-s3[4] |
| 630 | LL4[126] | rs16-s5[6] | rs15-s5[6] | rs3-s4[8] | rs3-s5[7] | rs3-s1[6] | rs3-s2[5] | **rs16-s5[6]** |
| 631 | LL0[127] | rs16-s1[7] | rs15-s5[7] | **rs16-s1[7]** | rs3-s5[8] | rs3-s1[7] | rs3-s2[6] | rs3-s3[5] |
| 632 | LL1[127] | rs16-s2[7] | rs15-s5[8] | rs4-s5[1] | **rs16-s2[7]** | rs3-s1[8] | rs3-s2[7] | rs3-s3[6] |
| 633 | LL2[127] | rs16-s3[7] | rs16-s5[1] | rs4-s5[2] | rs4-s1[1] | **rs16-s3[7]** | rs3-s2[8] | rs3-s3[7] |
| 634 | LL3[127] | rs16-s4[7] | rs16-s5[2] | rs4-s5[3] | rs4-s1[2] | rs4-s2[1] | **rs16-s4[7]** | rs3-s3[8] |
| 635 | LL4[127] | rs16-s5[7] | rs16-s5[3] | rs4-s5[4] | rs4-s1[3] | rs4-s2[2] | rs4-s3[1] | **rs16-s5[7]** |
| 636 | LL0[128] | rs16-s1[8] | rs16-s5[4] | **rs16-s1[8]** | rs4-s1[4] | rs4-s2[3] | rs4-s3[2] | rs4-s4[1] |
| 637 | LL1[128] | rs16-s2[8] | rs16-s5[5] | rs4-s5[5] | **rs16-s2[8]** | rs4-s2[4] | rs4-s3[3] | rs4-s4[2] |
| 638 | LL2[128] | rs16-s3[8] | rs16-s5[6] | rs4-s5[6] | rs4-s1[5] | **rs16-s3[8]** | rs4-s3[4] | rs4-s4[3] |
| 639 | LL3[128] | rs16-s4[8] | rs16-s5[7] | rs4-s5[7] | rs4-s1[6] | rs4-s2[5] | **rs16-s4[8]** | rs4-s4[4] |
| 640 | LL4[128] | rs16-s5[8] | rs16-s5[8] | rs4-s5[8] | rs4-s1[7] | rs4-s2[6] | rs4-s3[5] | **rs16-s5[8]** |

Note that the modified allocation described above with reference to FIGS. 11 through 13 and Tables 4 and 5 is very specific for exemplary purposes only. Other implementations are possible and are within the scope of the present disclosure. Another implementation will be described below with reference to FIGS. 14 through 16 and Tables 6 and 7.

Another OTL for Transmitting OTN Frames

Figure 14:
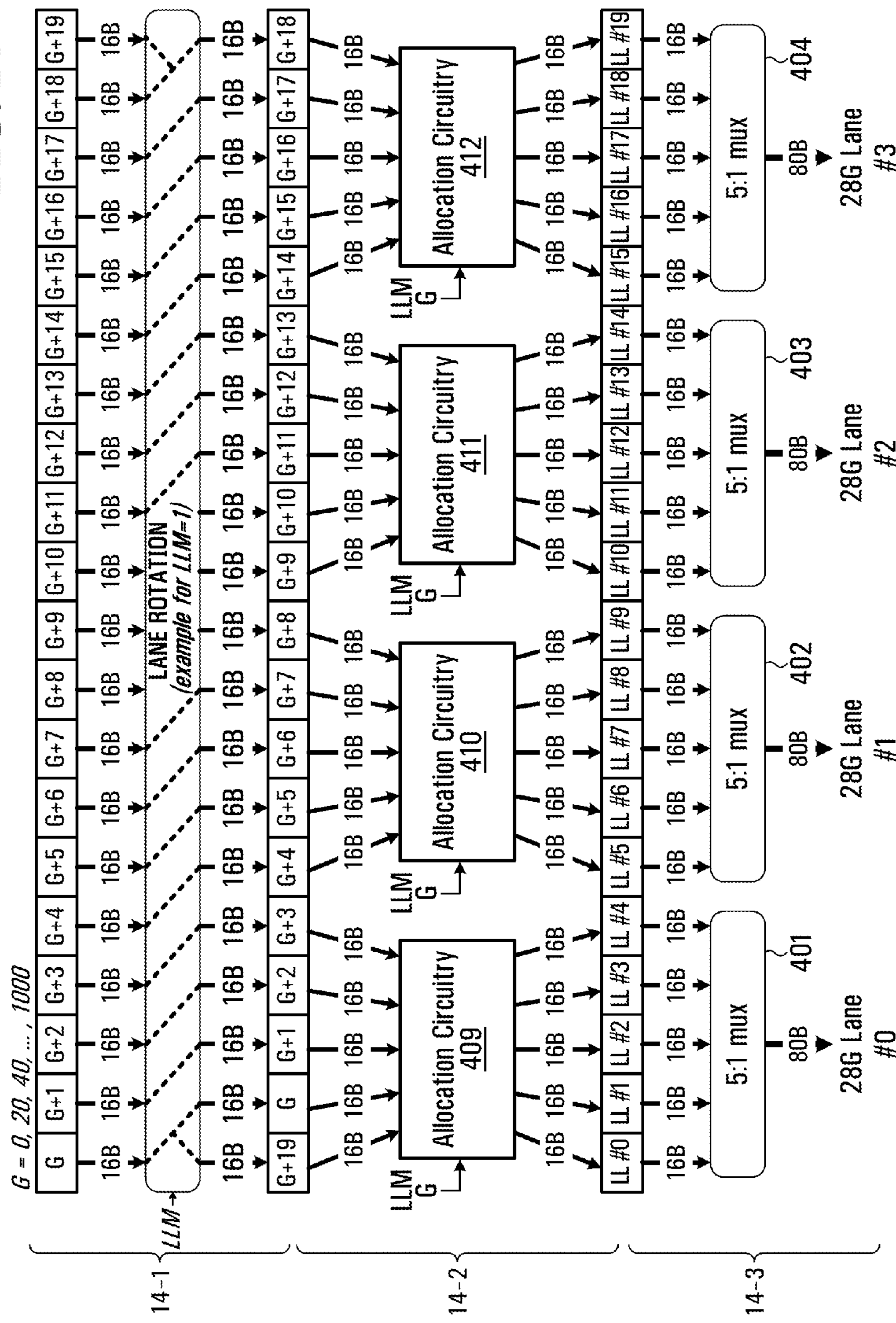
FIG. 14 is a functional diagram of another example OTL4.4 for transmitting OTN frames.

Referring now to FIG. 14, shown is a functional diagram of another OTL for transmitting OTN frames. Each OTN frame is subjected to various processing prior to being transmitted over 28 G physical lanes. By way of overview, this processing includes distributing 14-1 the 16-byte groups into logical lanes, allocating 14-2 the 16-byte groups to the logical lanes, and interleaving 14-3 the 16-byte groups from the logical lanes into the 28 G physical lanes. Such processing will be described in further detail below. Note that FIG. 14 is very specific and is provided for exemplary purposes only.

In some implementations, at step 14-1, each 16-byte group is distributed, round robin, to each of a plurality of logical lanes as similarly described above for FIG. 4. Also, in some implementations of step 14-1, logical lane assignments are rotated on each frame boundary as similarly described above for FIGS. 4 and 5. FIG. 14 shows how 20 consecutive 16-byte groups of an OTU4 frame are rotated as indicated by the value of LLM, as similarly described above for FIGS. 4 and 5. Other lane rotations are possible and are within the scope of this disclosure. In alternative implementations, step 14-1 does not include any lane rotation.

In contrast with the OTL shown in FIG. 4, the OTL shown in FIG. 14 includes circuitry 409,410,411,412 for allocating (beyond one to one) the 16-byte groups to the logical lanes at step 14-2. Such allocation is performed so that, after interleaving the logical lanes into the 28 G physical lanes at step 14-3, the data is at least partially clustered with sequential bits belonging to the same symbol. In the illustrated example, five rotated 16-byte groups are allocated to five consecutive logical lanes (LL#x through LL#x+4, x=0, 5, 10, 15) by interleaving or mixing the 5×128 bits=640 bits as described in further detail below. Each group of five consecutive logical lanes is bit-interleaved at step 14-3 into a 28 G lane, as similarly described above for FIG. 4. Since the data transmitted over the 28 G lane is at least partially clustered with sequential bits belonging to the same symbol, any correlated errors affecting sequential bits may affect fewer symbols.

The OTL of FIG. 14 (with modified allocation of 16 byte groups to logical lanes) addresses an interaction issue (hit to performance) that occurs for example when using the GFEC and OTL4.4/OTL4.10 schemes for optical transmission (in combination with a modulation scheme such as DP-QPSK) and for backplanes (in combination with a DFE). A DP-QPSK demodulator will typically generate double (or quadruple) errors. When using the OTL4.L scheme defined by ITU G.709, these double errors will corrupt systematically two symbols of the same codeword. This problem is addressed by using the modified OTL described in this disclosure. In particular, any correlated errors affecting sequential bits may affect fewer symbols because data is at least partially clustered with sequential bits belonging to the same symbol.

Figure 15:
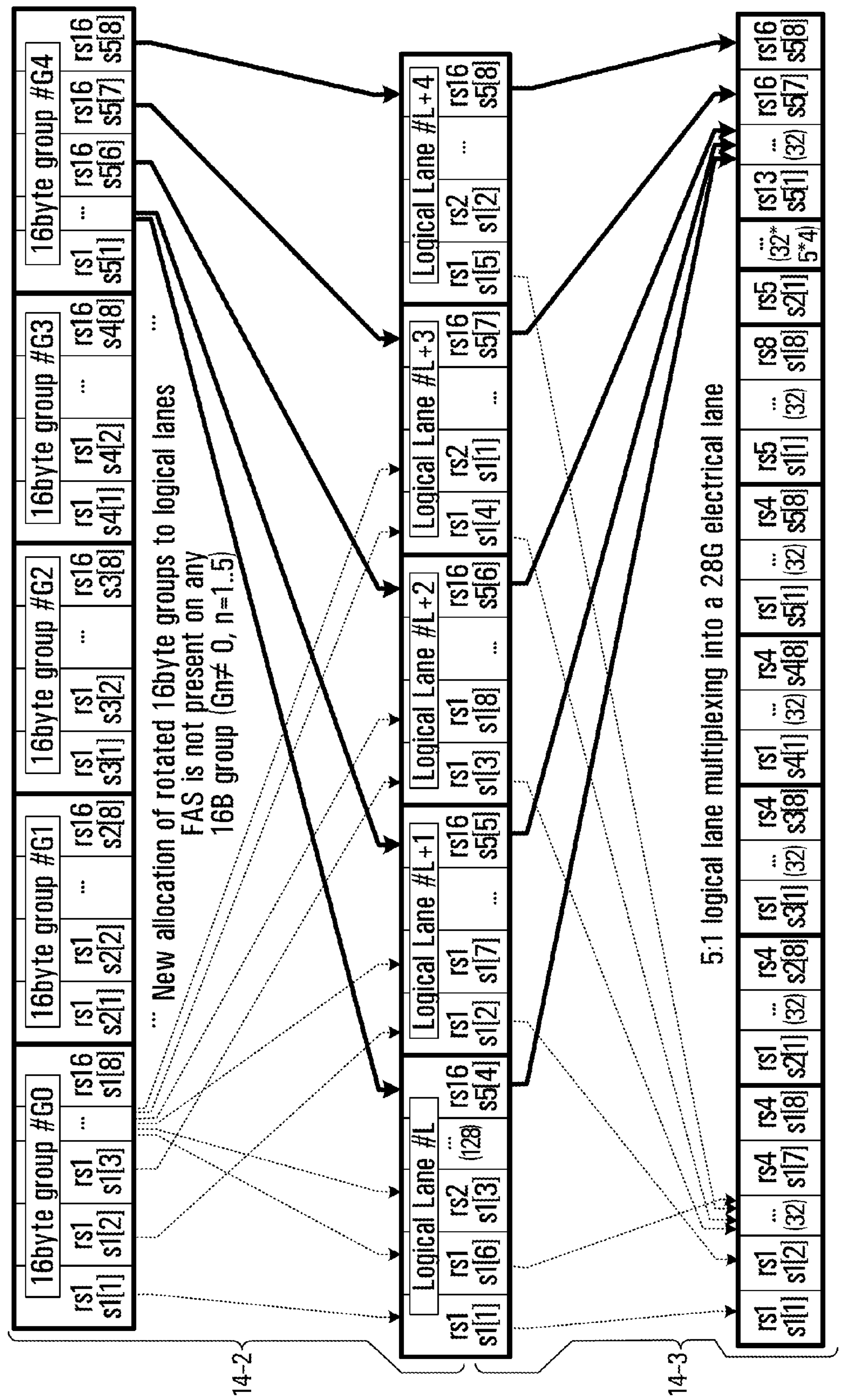
FIG. 15 is a schematic illustrating, for the OTL4.4 of FIG. 14, resulting codeword (rs1-rs16) and symbol (s1[1:8]-s255[1:8]) allocation into a 28 G lane when none of the five 16-byte groups carries FAS information.

In some implementations, the modified allocation of five rotated 16-byte groups to five logical lanes shown in FIG. 14 operates as follows:

A. If none of the 16-byte groups carries the FAS information (i.e. none of the five 16-byte groups is group number zero) then the five 16-byte groups are allocated to the five logical lanes in accordance with the fourth column ("No FAS") of Tables 6 and 7. Note that this column conveys a bit sequence after the allocation and the bit-interleaving by the multiplexers. See also FIG. 15, which is a schematic illustrating resulting codeword (rs1-rs16) and symbol (s1[1:8]-s255[1:8]) allocation into a 28 G lane when none of the five 16-byte groups carries the FAS information (i.e. none of the five 16-byte groups is group number zero). FIG. 15 shows the allocating 14-2 and bit-interleaving 14-3 steps that have been previously described with respect to FIG. 14, but are shown in FIG. 15 for only one multiplexer. In this implementation, the data transmitted over the 28 G electrical lane involves clusters of sequential bits of the same symbol despite not having the same order as the rotated data before the allocation 14-2 step.

B. If one of the five 16-byte groups carries the FAS information (i.e. one of the five 16-byte groups is group number zero) then the five 16-byte groups are allocated to the five logical lanes in accordance with the 5$^{th}$ column ("FAS on 1$^{st}$ 16 B group"), 6$^{th}$ column ("FAS on 2$^{nd}$ 16 B group"), 7$^{th}$ column ("FAS on 3$^{rd}$ 16 B group"), 8$^{th}$ column ("FAS on 4$^{th}$ 16 B group") and 9$^{th}$ column ("FAS on 5$^{th}$ 16 B group") of Tables 6 and 7.

Figure 16:
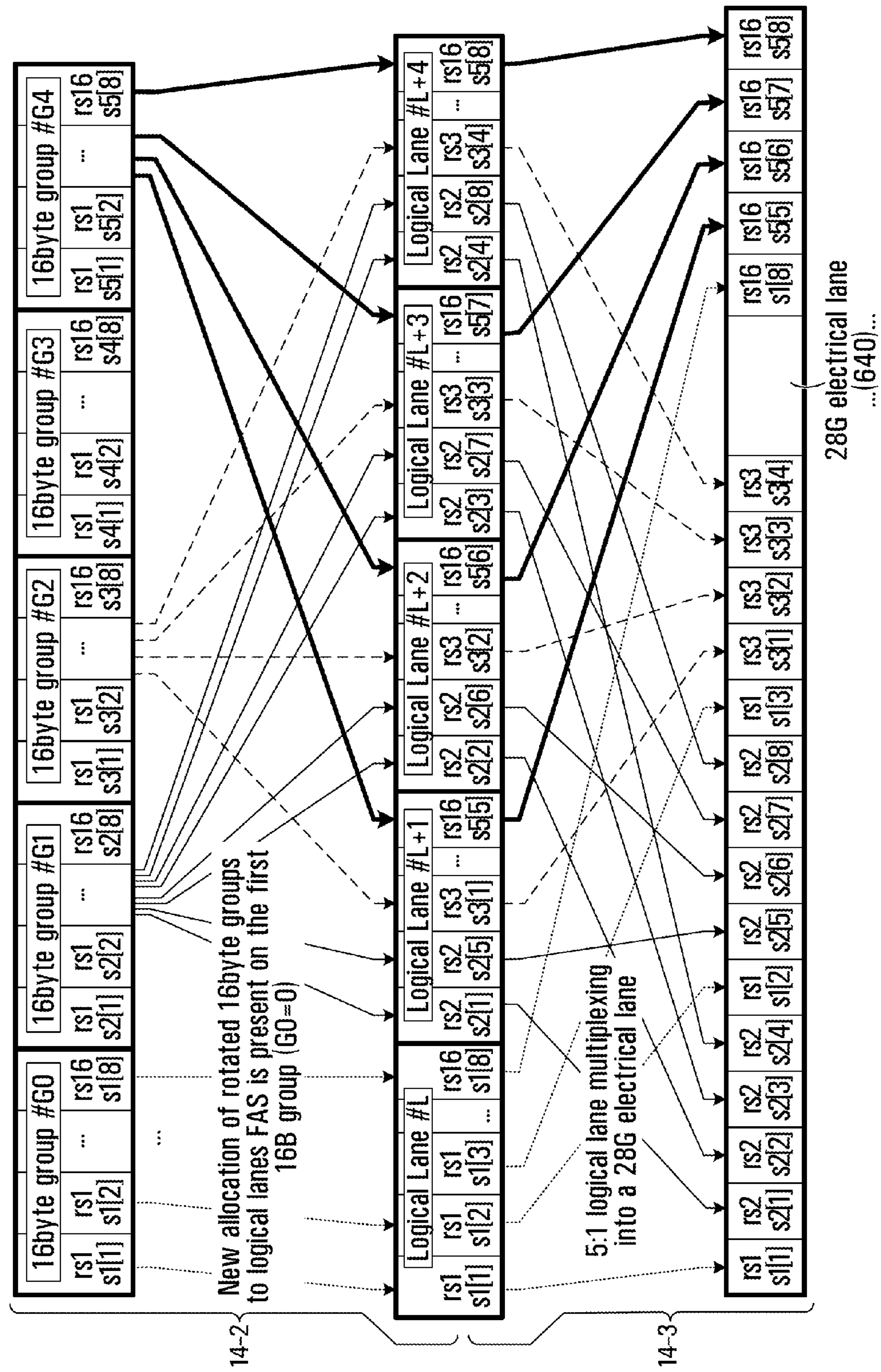
FIG. 16 is a schematic illustrating, for the OTL4.4 of FIG. 14, resulting codeword (rs1-rs16) and symbol (s1[1:8]-s255[1:8]) allocation into a 28 G lane when the 1st 16-byte group carries FAS information.

Note that these columns convey bit sequences after the allocation and the bit-interleaving by the multiplexers. See also FIG. 16, which is a schematic illustrating resulting codeword (rs1-rs16) and symbol (s1[1:8]-s255[1:8]) allocation into a 28 G lane when the first 16-byte group carries the FAS information (i.e. the first 16-byte group is group number zero). FIG. 16 shows the allocating 14-2 and bit-interleaving 14-3 steps that have been previously described with respect to FIG. 14, but are shown in FIG. 16 for only one multiplexer. Note that the data transmitted over the 28 G electrical lane involves clusters of sequential bits of the same symbol. Also note that the allocation 14-2 step does not mix any data portion containing the FAS information (e.g. the first 16-byte group #G0 carrying the FAS information is not mixed by the allocation 14-2 step). Figures showing examples where the second, third, fourth and fifth 16-byte group is group number zero are not shown, but would be readily understood in view of Tables 6 and 7.

In some implementations, as described with reference to FIG. 16, the allocation is performed without mixing any data portion containing FAS information. In this manner, there is no manipulation of the order of any bits corresponding to the FAS information. This means that a receiver looking to find the FAS information in a data reception can find it in the same place that it would be expected had the allocation step not been executed. The allocating step may be performed in order to reduce occurrence of sequential bits of different symbols without manipulating the order of any bits corresponding to the FAS information. Tables 6 and 7 provide a specific example of this. Note that the bits corresponding to the FAS information identified with bold text are in the same position as if the allocating step was not performed. In some implementations, data portions are mixed as a function of where the FAS information is located. In particular, with reference to Tables 6 and 7, the 5$^{th}$ column ("FAS on 1$^{st}$ 16 B group"), 6$^{th}$ column ("FAS on 2$^{nd}$ 16 B group"), 7$^{th}$ column ("FAS on 3$^{rd}$ 16 B group"), 8$^{th}$ column ("FAS on 4$^{th}$ 16 B group") and 9$^{th}$ column ("FAS on 5$^{th}$ 16 B group") show different mixing of data portions.

TABLE 6

| 28G physical | | | OTL4.4 of FIG. 14 | | | | | | |
|---|---|---|---|---|---|---|---|---|---|
| lane | | OTL4.4 of | | FAS on 1$^{st}$ | FAS on 2$^{nd}$ | FAS on 3$^{rd}$ | FAS on 4$^{th}$ | FAS on 5$^{th}$ | |
| bit | LL#[bit] | FIG. 4 | No FAS | 16B group | 16B group | 16B group | 16B group | 16B group | |
| 1 | LL0[1] | G0[1] | G0[1] | **G0[1]** | G0[32] | G1[31] | G2[30] | G3[29] | |
| 2 | LL1[1] | G1[1] | G0[2] | G1[9] | **G1[1]** | G1[32] | G2[31] | G3[30] | |
| 3 | LL2[1] | G2[1] | G0[3] | G1[10] | G2[9] | **G2[1]** | G2[32] | G3[31] | |
| 4 | LL3[1] | G3[1] | G0[4] | G1[11] | G2[10] | G3[9] | **G3[1]** | G3[32] | |
| 5 | LL4[1] | G4[1] | G0[5] | G1[12] | G2[11] | G3[10] | G4[9] | **G4[1]** | |
| 6 | LL0[2] | G0[2] | G0[6] | **G0[2]** | G2[12] | G3[11] | G4[10] | G0[9] | |
| 7 | LL1[2] | G1[2] | G0[7] | G1[13] | **G1[2]** | G3[12] | G4[11] | G0[10] | |
| 8 | LL2[2] | G2[2] | G0[8] | G1[14] | G2[13] | **G2[2]** | G4[12] | G0[11] | |
| 9 | LL3[2] | G3[2] | G0[9] | G1[15] | G2[14] | G3[13] | **G3[2]** | G0[12] | |
| 10 | LL4[2] | G4[2] | G0[10] | G1[16] | G2[15] | G3[14] | G4[13] | **G4[2]** | |
| 11 | LL0[3] | G0[3] | G0[11] | **G0[3]** | G2[16] | G3[15] | G4[14] | G0[13] | |
| 12 | LL1[3] | G1[3] | G0[12] | G2[17] | **G1[3]** | G3[16] | G4[15] | G0[14] | |
| 13 | LL2[3] | G2[3] | G0[13] | G2[18] | G3[17] | **G2[3]** | G4[16] | G0[15] | |
| 14 | LL3[3] | G3[3] | G0[14] | G2[19] | G3[18] | G4[17] | **G3[3]** | G0[16] | |
| 15 | LL4[3] | G4[3] | G0[15] | G2[20] | G3[19] | G4[18] | G0[17] | **G4[3]** | |
| 16 | LL0[4] | G0[4] | G0[16] | **G0[4]** | G3[20] | G4[19] | G0[18] | G1[17] | |
| 17 | LL1[4] | G1[4] | G0[17] | G2[21] | **G1[4]** | G4[20] | G0[19] | G1[18] | |
| 18 | LL2[4] | G2[4] | G0[18] | G2[22] | G3[21] | **G2[4]** | G0[20] | G1[19] | |
| 19 | LL3[4] | G3[4] | G0[19] | G2[23] | G3[22] | G4[21] | **G3[4]** | G1[20] | |
| 20 | LL4[4] | G4[4] | G0[20] | G2[24] | G3[23] | G4[22] | G0[21] | **G4[4]** | |
| 21 | LL0[5] | G0[5] | G0[21] | **G0[5]** | G3[24] | G4[23] | G0[22] | G1[21] | |
| 22 | LL1[5] | G1[5] | G0[22] | G3[25] | **G1[5]** | G4[24] | G0[23] | G1[22] | |
| 23 | LL2[5] | G2[5] | G0[23] | G3[26] | G4[25] | **G2[5]** | G0[24] | G1[23] | |
| 24 | LL3[5] | G3[5] | G0[24] | G3[27] | G4[26] | G0[25] | **G3[5]** | G1[24] | |
| 25 | LL4[5] | G4[5] | G0[25] | G3[28] | G4[27] | G0[26] | G1[25] | **G4[5]** | |
| 26 | LL0[6] | G0[6] | G0[26] | **G0[6]** | G4[28] | G0[27] | G1[26] | G2[25] | |
| 27 | LL1[6] | G1[6] | G0[27] | G3[29] | **G1[6]** | G0[28] | G1[27] | G2[26] | |
| 28 | LL2[6] | G2[6] | G0[28] | G3[30] | G4[29] | **G2[6]** | G1[28] | G2[27] | |
| 29 | LL3[6] | G3[6] | G0[29] | G3[31] | G4[30] | G0[29] | **G3[6]** | G2[28] | |
| 30 | LL4[6] | G4[6] | G0[30] | G3[32] | G4[31] | G0[30] | G1[29] | **G4[6]** | |
| 31 | LL0[7] | G0[7] | G0[31] | **G0[7]** | G4[32] | G0[31] | G1[30] | G2[29] | |
| 32 | LL1[7] | G1[7] | G0[32] | G4[1] | **G1[7]** | G0[32] | G1[31] | G2[30] | |
| 33 | LL2[7] | G2[7] | G1[1] | G4[2] | G0[1] | **G2[7]** | G1[32] | G2[31] | |
| 34 | LL3[7] | G3[7] | G1[2] | G4[3] | G0[2] | G1[1] | **G3[7]** | G2[32] | |
| 35 | LL4[7] | G4[7] | G1[3] | G4[4] | G0[3] | G1[2] | G2[1] | **G4[7]** | |
| 36 | LL0[8] | G0[8] | G1[4] | **G0[8]** | G0[4] | G1[3] | G2[2] | G3[1] | |
| 37 | LL1[8] | G1[8] | G1[5] | G4[5] | **G1[8]** | G1[4] | G2[3] | G3[2] | |
| 38 | LL2[8] | G2[8] | G1[6] | G4[6] | G0[5] | **G2[8]** | G2[4] | G3[3] | |
| 39 | LL3[8] | G3[8] | G1[7] | G4[7] | G0[6] | G1[5] | **G3[8]** | G3[4] | |
| 40 | LL4[8] | G4[8] | G1[8] | G4[8] | G0[7] | G1[6] | G2[5] | **G4[8]** | |
| 41 | LL0[9] | G0[9] | G1[9] | **G0[9]** | G0[8] | G1[7] | G2[6] | G3[5] | |
| 42 | LL1[9] | G1[9] | G1[10] | G1[17] | **G1[9]** | G1[8] | G2[7] | G3[6] | |
| 43 | LL2[9] | G2[9] | G1[11] | G1[18] | G2[17] | **G2[9]** | G2[8] | G3[7] | |
| 44 | LL3[9] | G3[9] | G1[12] | G1[19] | G2[18] | G3[17] | **G3[9]** | G3[40] | |
| 45 | LL4[9] | G4[9] | G1[13] | G1[20] | G2[19] | G3[18] | G4[17] | **G4[9]** | |
| 46 | LL0[10] | G0[10] | G1[14] | **G0[10]** | G2[20] | G3[19] | G4[18] | G0[17] | |
| 47 | LL1[10] | G1[10] | G1[15] | G1[21] | **G1[10]** | G3[20] | G4[19] | G0[18] | |

TABLE 6-continued

| 28G physical | | | OTL4.4 of FIG. 14 | | | | | |
|---|---|---|---|---|---|---|---|---|
| lane | | OTL4.4 of | | FAS on 1st | FAS on 2nd | FAS on 3rd | FAS on 4th | FAS on 5th |
| bit | LL#[bit] | FIG. 4 | No FAS | 16B group | 16B group | 16B group | 16B group | 16B group |
| 48 | LL2[10] | G2[10] | G1[16] | G1[22] | G2[21] | **G2[10]** | G4[20] | G0[19] |
| 49 | LL3[10] | G3[10] | G1[17] | G1[23] | G2[22] | G3[21] | **G3[10]** | G0[20] |
| 50 | LL4[10] | G4[10] | G1[18] | G1[24] | G2[23] | G3[22] | G4[21] | **G4[10]** |
| 51 | LL0[11] | G0[11] | G1[19] | **G0[11]** | G2[24] | G3[23] | G4[22] | G0[21] |
| 52 | LL1[11] | G1[11] | G1[20] | G2[25] | **G1[11]** | G3[24] | G4[23] | G0[22] |
| 53 | LL2[11] | G2[11] | G1[21] | G2[26] | G3[25] | **G2[11]** | G4[24] | G0[23] |
| 54 | LL3[11] | G3[11] | G1[22] | G2[27] | G3[26] | G4[25] | **G3[11]** | G0[24] |
| 55 | LL4[11] | G4[11] | G1[23] | G2[28] | G3[27] | G4[26] | G0[25] | **G4[11]** |
| 56 | LL0[12] | G0[12] | G1[24] | **G0[12]** | G3[28] | G4[27] | G0[26] | G1[25] |
| 57 | LL1[12] | G1[12] | G1[25] | G2[29] | **G1[12]** | G4[28] | G0[27] | G1[26] |
| 58 | LL2[12] | G2[12] | G1[26] | G2[30] | G3[29] | **G2[12]** | G0[28] | G1[27] |
| 59 | LL3[12] | G3[12] | G1[27] | G2[31] | G3[30] | G4[29] | **G3[12]** | G1[28] |
| 60 | LL4[12] | G4[12] | G1[28] | G2[32] | G3[31] | G4[30] | G0[29] | **G4[12]** |
| 61 | LL0[13] | G0[13] | G1[29] | **G0[13]** | G3[32] | G4[31] | G0[30] | G1[29] |
| 62 | LL1[13] | G1[13] | G1[30] | G3[1] | **G1[13]** | G4[32] | G0[31] | G1[30] |
| 63 | LL2[13] | G2[13] | G1[31] | G3[2] | G4[1] | **G2[13]** | G0[32] | G1[31] |
| 64 | LL3[13] | G3[13] | G1[32] | G3[3] | G4[2] | G0[1] | **G3[13]** | G1[32] |
| 65 | LL4[13] | G4[13] | G2[1] | G3[4] | G4[3] | G0[2] | G1[1] | **G4[13]** |
| 66 | LL0[14] | G0[14] | G2[2] | **G0[14]** | G4[4] | G0[3] | G1[2] | G2[1] |
| 67 | LL1[14] | G1[14] | G2[3] | G3[5] | **G1[14]** | G0[4] | G1[3] | G2[2] |
| 68 | LL2[14] | G2[14] | G2[4] | G3[6] | G4[5] | **G2[14]** | G1[4] | G2[3] |
| 69 | LL3[14] | G3[14] | G2[5] | G3[7] | G4[6] | G0[5] | **G3[14]** | G2[4] |
| 70 | LL4[14] | G4[14] | G2[6] | G3[8] | G4[7] | G0[6] | G1[5] | **G4[14]** |
| 71 | LL0[15] | G0[15] | G2[7] | **G0[15]** | G4[8] | G0[7] | G1[6] | G2[5] |
| 72 | LL1[15] | G1[15] | G2[8] | G4[9] | **G1[15]** | G0[8] | G1[7] | G2[6] |
| 73 | LL2[15] | G2[15] | G2[9] | G4[10] | G0[9] | **G2[15]** | G1[8] | G2[7] |
| 74 | LL3[15] | G3[15] | G2[10] | G4[11] | G0[10] | G1[9] | **G3[15]** | G2[8] |
| 75 | LL4[15] | G4[15] | G2[11] | G4[12] | G0[11] | G1[10] | G2[9] | **G4[15]** |
| 76 | LL0[16] | G0[16] | G2[12] | **G0[16]** | G0[12] | G1[11] | G2[10] | G3[9] |
| 77 | LL1[16] | G1[16] | G2[13] | G4[13] | **G1[16]** | G1[12] | G2[11] | G3[10] |
| 78 | LL2[16] | G2[16] | G2[14] | G4[14] | G0[13] | **G2[16]** | G2[12] | G3[11] |
| 79 | LL3[16] | G3[16] | G2[15] | G4[15] | G0[14] | G1[13] | **G3[16]** | G3[12] |
| 80 | LL4[16] | G4[16] | G2[16] | G4[16] | G0[15] | G1[14] | G2[13] | **G4[16]** |
| 81 | LL0[17] | G0[17] | G2[17] | **G0[17]** | G0[16] | G1[15] | G2[14] | G3[13] |
| 82 | LL1[17] | G1[17] | G2[18] | G1[25] | **G1[17]** | G1[16] | G2[15] | G3[14] |
| 83 | LL2[17] | G2[17] | G2[19] | G1[26] | G2[25] | **G2[17]** | G2[16] | G3[15] |
| 84 | LL3[17] | G3[17] | G2[20] | G1[27] | G2[26] | G3[25] | **G3[17]** | G3[16] |
| 85 | LL4[17] | G4[17] | G2[21] | G1[28] | G2[27] | G3[26] | G4[25] | **G4[17]** |
| 86 | LL0[18] | G0[18] | G2[22] | **G0[18]** | G2[28] | G3[27] | G4[26] | G0[25] |
| 87 | LL1[18] | G1[18] | G2[23] | G1[29] | **G1[18]** | G3[28] | G4[27] | G0[26] |
| 88 | LL2[18] | G2[18] | G2[24] | G1[30] | G2[29] | **G2[18]** | G4[28] | G0[27] |
| 89 | LL3[18] | G3[18] | G2[25] | G1[31] | G2[30] | G3[29] | **G3[18]** | G0[28] |
| 90 | LL4[18] | G4[18] | G2[26] | G1[32] | G2[31] | G3[30] | G4[29] | **G4[18]** |
| 91 | LL0[19] | G0[19] | G2[27] | **G0[19]** | G2[32] | G3[31] | G4[30] | G0[29] |
| 92 | LL1[19] | G1[19] | G2[28] | G2[1] | **G1[19]** | G3[32] | G4[31] | G0[30] |
| 93 | LL2[19] | G2[19] | G2[29] | G2[2] | G3[1] | **G2[19]** | G4[32] | G0[31] |
| 94 | LL3[19] | G3[19] | G2[30] | G2[3] | G3[2] | G4[1] | **G3[19]** | G0[32] |
| 95 | LL4[19] | G4[19] | G2[31] | G2[4] | G3[3] | G4[2] | G0[1] | **G4[19]** |
| 96 | LL0[20] | G0[20] | G2[32] | **G0[20]** | G3[4] | G4[3] | G0[2] | G1[1] |
| 97 | LL1[20] | G1[20] | G3[1] | G2[5] | **G1[20]** | G4[4] | G0[3] | G1[2] |
| 98 | LL2[20] | G2[20] | G3[2] | G2[6] | G3[5] | **G2[20]** | G0[4] | G1[3] |
| 99 | LL3[20] | G3[20] | G3[3] | G2[7] | G3[6] | G4[5] | **G3[20]** | G1[4] |
| 100 | LL4[20] | G4[20] | G3[4] | G2[8] | G3[7] | G4[6] | G0[5] | **G4[20]** |
| 101 | LL0[21] | G0[21] | G3[5] | **G0[21]** | G3[8] | G4[7] | G0[6] | G1[5] |
| 102 | LL1[21] | G1[21] | G3[6] | G3[9] | **G1[21]** | G4[8] | G0[7] | G1[6] |
| 103 | LL2[21] | G2[21] | G3[7] | G3[10] | G4[9] | **G2[21]** | G0[8] | G1[7] |
| 104 | LL3[21] | G3[21] | G3[8] | G3[11] | G4[10] | G0[9] | **G3[21]** | G1[8] |
| 105 | LL4[21] | G4[21] | G3[9] | G3[12] | G4[11] | G0[10] | G1[9] | **G4[21]** |
| 106 | LL0[22] | G0[22] | G3[10] | **G0[22]** | G4[12] | G0[11] | G1[10] | G2[9] |
| 107 | LL1[22] | G1[22] | G3[11] | G3[13] | **G1[22]** | G0[12] | G1[11] | G2[10] |
| 108 | LL2[22] | G2[22] | G3[12] | G3[14] | G4[13] | **G2[22]** | G1[12] | G2[11] |
| 109 | LL3[22] | G3[22] | G3[13] | G3[15] | G4[14] | G0[13] | **G3[22]** | G2[12] |
| 110 | LL4[22] | G4[22] | G3[14] | G3[16] | G4[15] | G0[14] | G1[13] | **G4[22]** |
| 111 | LL0[23] | G0[23] | G3[15] | **G0[23]** | G4[16] | G0[15] | G1[14] | G2[13] |
| 112 | LL1[23] | G1[23] | G3[16] | G4[17] | **G1[23]** | G0[16] | G1[15] | G2[14] |
| 113 | LL2[23] | G2[23] | G3[17] | G4[18] | G0[17] | **G2[23]** | G1[16] | G2[15] |
| 114 | LL3[23] | G3[23] | G3[18] | G4[19] | G0[18] | G1[17] | **G3[23]** | G2[16] |
| 115 | LL4[23] | G4[23] | G3[19] | G4[20] | G0[19] | G1[18] | G2[17] | **G4[23]** |
| 116 | LL0[24] | G0[24] | G3[20] | **G0[24]** | G0[20] | G1[19] | G2[18] | G3[17] |
| 117 | LL1[24] | G1[24] | G3[21] | G4[21] | **G1[24]** | G1[20] | G2[19] | G3[18] |
| 118 | LL2[24] | G2[24] | G3[22] | G4[22] | G0[21] | **G2[24]** | G2[20] | G3[19] |
| 119 | LL3[24] | G3[24] | G3[23] | G4[23] | G0[22] | G1[21] | **G3[24]** | G3[20] |
| 120 | LL4[24] | G4[24] | G3[24] | G4[24] | G0[23] | G1[22] | G2[21] | **G4[24]** |
| 121 | LL0[25] | G0[25] | G3[25] | **G0[25]** | G0[24] | G1[23] | G2[22] | G3[21] |

TABLE 6-continued

| 28G physical lane | | OTL4.4 of FIG. 4 | OTL4.4 of FIG. 14 | | | | | | |
|---|---|---|---|---|---|---|---|---|---|
| bit | LL#[bit] | | No FAS | FAS on 1$^{st}$ 16B group | FAS on 2$^{nd}$ 16B group | FAS on 3$^{rd}$ 16B group | FAS on 4$^{th}$ 16B group | FAS on 5$^{th}$ 16B group |
| 122 | LL1[25] | G1[25] | G3[26] | G1[1] | **G1[25]** | G1[24] | G2[23] | G3[22] |
| 123 | LL2[25] | G2[25] | G3[27] | G1[2] | G2[1] | **G2[25]** | G2[24] | G3[23] |
| 124 | LL3[25] | G3[25] | G3[28] | G1[3] | G2[2] | G3[1] | **G3[25]** | G3[24] |
| 125 | LL4[25] | G4[25] | G3[29] | G1[4] | G2[3] | G3[2] | G4[1] | **G4[25]** |
| 126 | LL0[26] | G0[26] | G3[30] | **G0[26]** | G2[4] | G3[3] | G4[2] | G0[1] |
| 127 | LL1[26] | G1[26] | G3[31] | G1[5] | **G1[26]** | G3[4] | G4[3] | G0[2] |
| 128 | LL2[26] | G2[26] | G3[32] | G1[6] | G2[5] | **G2[26]** | G4[4] | G0[3] |
| 129 | LL3[26] | G3[26] | G4[1] | G1[7] | G2[6] | G3[5] | **G3[26]** | G0[4] |
| 130 | LL4[26] | G4[26] | G4[2] | G1[8] | G2[7] | G3[6] | G4[5] | **G4[26]** |
| 131 | LL0[27] | G0[27] | G4[3] | **G0[27]** | G2[8] | G3[7] | G4[6] | G0[5] |
| 132 | LL1[27] | G1[27] | G4[4] | G2[9] | **G1[27]** | G3[8] | G4[7] | G0[6] |
| 133 | LL2[27] | G2[27] | G4[5] | G2[10] | G3[9] | **G2[27]** | G4[8] | G0[7] |
| 134 | LL3[27] | G3[27] | G4[6] | G2[11] | G3[10] | G4[9] | **G3[27]** | G0[8] |
| 135 | LL4[27] | G4[27] | G4[7] | G2[12] | G3[11] | G4[10] | G0[9] | **G4[27]** |
| . . . | . . . | . . . | . . . | . . . | . . . | . . . | . . . | . . . |
| . . . | . . . | . . . | . . . | . . . | . . . | . . . | . . . | . . . |
| . . . | . . . | . . . | . . . | . . . | . . . | . . . | . . . | . . . |
| 151 | LL0[31] | G0[31] | G4[23] | **G0[31]** | G4[24] | G0[23] | G1[22] | G2[21] |
| 152 | LL1[31] | G1[31] | G4[24] | G4[25] | **G1[31]** | G0[24] | G1[23] | G2[22] |
| 153 | LL2[31] | G2[31] | G4[25] | G4[26] | G0[25] | **G2[31]** | G1[24] | G2[23] |
| 154 | LL3[31] | G3[31] | G4[26] | G4[27] | G0[26] | G1[25] | **G3[31]** | G2[24] |
| 155 | LL4[31] | G4[31] | G4[27] | G4[28] | G0[27] | G1[26] | G4[25] | **G4[31]** |
| 156 | LL0[32] | G0[32] | G4[28] | **G0[32]** | G0[28] | G1[27] | G2[26] | G3[25] |
| 157 | LL1[32] | G1[32] | G4[29] | G4[29] | **G1[32]** | G1[28] | G2[27] | G3[26] |
| 158 | LL2[32] | G2[32] | G4[30] | G4[30] | G0[29] | **G2[32]** | G2[28] | G3[27] |
| 159 | LL3[32] | G3[32] | G4[31] | G4[31] | G0[30] | G1[29] | **G3[32]** | G3[28] |
| 160 | LL4[32] | G4[32] | G4[32] | G4[32] | G0[31] | G1[30] | G2[29] | **G4[32]** |
| 161 | LL0[33] | G0[33] | G0[33] | **G0[33]** | G0[64] | G1[63] | G2[62] | G3[61] |
| 162 | LL1[33] | G1[33] | G0[34] | G1[41] | **G1[33]** | G1[64] | G2[63] | G3[62] |
| 163 | LL2[33] | G2[33] | G0[35] | G1[42] | G2[41] | **G2[33]** | G2[64] | G3[63] |
| 164 | LL3[33] | G3[33] | G0[36] | G1[43] | G2[42] | G3[41] | **G3[33]** | G3[64] |
| 165 | LL4[33] | G4[33] | G0[37] | G1[44] | G2[43] | G3[42] | G2[41] | **G4[33]** |
| . . . | . . . | . . . | . . . | . . . | . . . | . . . | . . . | . . . |
| . . . | . . . | . . . | . . . | . . . | . . . | . . . | . . . | . . . |
| . . . | . . . | . . . | . . . | . . . | . . . | . . . | . . . | . . . |
| 556 | LL0[112] | G0[112] | G2[108] | **G0[112]** | G0[108] | G1[107] | G2[106] | G3[105] |
| 557 | LL1[112] | G1[112] | G2[109] | G4[109] | **G1[112]** | G1[108] | G2[107] | G3[106] |
| 558 | LL2[112] | G2[112] | G2[110] | G4[110] | G0[109] | **G2[112]** | G2[108] | G3[107] |
| 559 | LL3[112] | G3[112] | G2[111] | G4[111] | G0[110] | G1[109] | **G3[112]** | G3[108] |
| 560 | LL4[112] | G4[112] | G2[112] | G4[112] | G0[111] | G1[110] | G2[109] | **G4[112]** |
| 561 | LL0[113] | G0[113] | G2[113] | **G0[113]** | G0[112] | G1[111] | G2[110] | G3[109] |
| 562 | LL1[113] | G1[113] | G2[114] | G1[121] | **G1[113]** | G1[112] | G2[111] | G3[110] |
| 563 | LL2[113] | G2[113] | G2[115] | G1[122] | G2[121] | **G2[113]** | G2[112] | G3[111] |
| 564 | LL3[113] | G3[113] | G2[116] | G1[123] | G2[122] | G3[121] | **G3[113]** | G3[112] |
| 565 | LL4[113] | G4[113] | G2[117] | G1[124] | G2[123] | G3[122] | G4[121] | **G4[113]** |
| 566 | LL0[114] | G0[114] | G2[118] | **G0[114]** | G2[124] | G3[123] | G4[122] | G0[121] |
| 567 | LL1[114] | G1[114] | G2[119] | G1[125] | **G1[114]** | G3[124] | G4[123] | G0[122] |
| 568 | LL2[114] | G2[114] | G2[120] | G1[126] | G2[125] | **G2[114]** | G4[124] | G0[123] |
| 569 | LL3[114] | G3[114] | G2[121] | G1[127] | G2[126] | G3[125] | **G3[114]** | G0[124] |
| 560 | LL4[114] | G4[114] | G2[122] | G1[128] | G2[127] | G3[126] | G4[125] | **G4[114]** |
| 571 | LL0[115] | G0[115] | G2[123] | **G0[115]** | G2[128] | G3[127] | G4[126] | G0[125] |
| 572 | LL1[115] | G1[115] | G2[124] | G2[97] | **G1[115]** | G3[128] | G4[127] | G0[126] |
| 573 | LL2[115] | G2[115] | G2[125] | G2[98] | G3[97] | **G2[115]** | G4[128] | G0[127] |
| 574 | LL3[115] | G3[115] | G2[126] | G2[99] | G3[98] | G4[97] | **G3[115]** | G0[128] |
| 575 | LL4[115] | G4[115] | G2[127] | G2[100] | G3[99] | G4[98] | G0[97] | **G4[115]** |
| 576 | LL0[116] | G0[116] | G2[128] | **G0[116]** | G3[100] | G4[99] | G0[98] | G1[97] |
| 577 | LL1[116] | G1[116] | G3[97] | G2[101] | **G1[116]** | G4[100] | G0[99] | G1[98] |
| 578 | LL2[116] | G2[116] | G3[98] | G2[102] | G3[101] | **G2[116]** | G0[100] | G1[99] |
| 579 | LL3[116] | G3[116] | G3[99] | G2[103] | G3[102] | G4[101] | **G3[116]** | G1[100] |
| 580 | LL4[116] | G4[116] | G3[100] | G2[104] | G3[103] | G4[102] | G0[101] | **G4[116]** |
| 581 | LL0[117] | G0[117] | G3[101] | **G0[117]** | G3[104] | G4[103] | G0[102] | G1[101] |
| 582 | LL1[117] | G1[117] | G3[102] | G3[105] | **G1[117]** | G4[104] | G0[103] | G1[102] |
| 583 | LL2[117] | G2[117] | G3[103] | G3[106] | G4[105] | **G2[117]** | G0[104] | G1[103] |
| 584 | LL3[117] | G3[117] | G3[104] | G3[107] | G4[106] | G0[105] | **G3[117]** | G1[104] |
| 585 | LL4[117] | G4[117] | G3[105] | G3[108] | G4[107] | G0[106] | G1[105] | **G4[117]** |
| 586 | LL0[118] | G0[118] | G3[106] | **G0[118]** | G4[108] | G0[107] | G1[106] | G2[105] |
| 587 | LL0[119] | G0[119] | G3[107] | G3[109] | **G1[118]** | G0[108] | G1[107] | G2[106] |
| 588 | LL0[120] | G0[120] | G3[108] | G3[110] | G4[109] | **G2[118]** | G1[108] | G2[107] |
| 589 | LL0[121] | G0[121] | G3[109] | G3[111] | G4[110] | G0[109] | **G3[118]** | G2[108] |
| 590 | LL0[122] | G0[122] | G3[110] | G3[112] | G4[111] | G0[110] | G1[109] | **G4[118]** |
| 591 | LL0[119] | G0[119] | G3[111] | **G0[119]** | G4[112] | G0[111] | G1[110] | G2[109] |
| 592 | LL1[119] | G1[119] | G3[112] | G4[113] | **G1[119]** | G0[112] | G1[111] | G2[110] |
| 593 | LL2[119] | G2[119] | G3[113] | G4[114] | G0[113] | **G2[119]** | G1[112] | G2[111] |
| 594 | LL3[119] | G3[119] | G3[114] | G4[115] | G0[114] | G1[113] | **G3[119]** | G2[112] |

TABLE 6-continued

| 28G physical lane | | OTL4.4 of | OTL4.4 of FIG. 14 | | | | | |
|---|---|---|---|---|---|---|---|---|
| bit | LL#[bit] | FIG. 4 | No FAS | FAS on $1^{st}$ 16B group | FAS on $2^{nd}$ 16B group | FAS on $3^{rd}$ 16B group | FAS on $4^{th}$ 16B group | FAS on $5^{th}$ 16B group |
| 595 | LL4[119] | G4[119] | G3[115] | G4[116] | G0[115] | G1[114] | G2[113] | **G4[119]** |
| 596 | LL0[120] | G0[120] | G3[116] | **G0[120]** | G0[116] | G1[115] | G2[114] | G3[113] |
| 597 | LL1[120] | G1[120] | G3[117] | G4[117] | **G1[120]** | G1[116] | G2[115] | G3[114] |
| 598 | LL2[120] | G2[120] | G3[118] | G4[118] | G0[117] | **G2[120]** | G2[116] | G3[115] |
| 599 | LL3[120] | G3[120] | G3[119] | G4[119] | G0[118] | G1[117] | **G3[120]** | G3[116] |
| 600 | LL4[120] | G4[120] | G3[120] | G4[120] | G0[119] | G1[118] | G2[117] | **G4[120]** |
| 601 | LL0[121] | G0[121] | G3[121] | **G0[121]** | G0[120] | G1[119] | G2[118] | G3[117] |
| 602 | LL1[121] | G1[121] | G3[122] | G1[97] | **G1[121]** | G1[120] | G2[119] | G3[118] |
| 603 | LL2[121] | G2[121] | G3[123] | G1[98] | G2[97] | **G2[121]** | G2[120] | G3[119] |
| 604 | LL3[121] | G3[121] | G3[124] | G1[99] | G2[98] | G3[97] | **G3[121]** | G3[120] |
| 605 | LL4[121] | G4[121] | G3[125] | G1[100] | G2[99] | G3[98] | G4[97] | **G4[121]** |
| 606 | LL0[122] | G0[122] | G3[126] | **G0[122]** | G2[100] | G3[99] | G4[98] | G0[97] |
| 607 | LL1[122] | G1[122] | G3[127] | G1[101] | **G1[122]** | G3[100] | G4[99] | G0[98] |
| 608 | LL2[122] | G2[122] | G3[128] | G1[102] | G2[101] | **G2[122]** | G4[100] | G0[99] |
| 609 | LL3[122] | G3[122] | G4[97] | G1[103] | G2[102] | G3[101] | **G3[122]** | G0[100] |
| 610 | LL4[122] | G4[122] | G4[98] | G1[104] | G2[103] | G3[102] | G4[101] | **G4[122]** |
| 611 | LL0[123] | G0[123] | G4[99] | **G0[123]** | G2[104] | G3[103] | G4[102] | G0[101] |
| 612 | LL1[123] | G1[123] | G4[100] | G2[105] | **G1[123]** | G3[104] | G4[103] | G0[102] |
| 613 | LL2[123] | G2[123] | G4[101] | G2[106] | G3[105] | **G2[123]** | G4[104] | G0[103] |
| 614 | LL3[123] | G3[123] | G4[102] | G2[107] | G3[106] | G4[105] | **G3[123]** | G0[104] |
| 615 | LL4[123] | G4[123] | G4[103] | G2[108] | G3[107] | G4[106] | G0[105] | **G4[123]** |
| 616 | LL0[124] | G0[124] | G4[104] | **G0[124]** | G3[108] | G4[107] | G0[106] | G1[105] |
| 617 | LL1[124] | G1[124] | G4[105] | G2[109] | **G1[124]** | G4[108] | G0[107] | G1[106] |
| 618 | LL2[124] | G2[124] | G4[106] | G2[110] | G3[109] | **G2[124]** | G0[108] | G1[107] |
| 619 | LL3[124] | G3[124] | G4[107] | G2[111] | G3[110] | G4[109] | **G3[124]** | G1[108] |
| 620 | LL4[124] | G4[124] | G4[108] | G2[112] | G3[111] | G4[110] | G0[109] | **G4[124]** |
| 621 | LL0[125] | G0[125] | G4[109] | **G0[125]** | G3[112] | G4[111] | G0[110] | G1[109] |
| 622 | LL1[125] | G1[125] | G4[110] | G3[113] | **G1[125]** | G4[112] | G0[111] | G1[110] |
| 623 | LL2[125] | G2[125] | G4[111] | G3[114] | G4[113] | **G2[125]** | G0[112] | G1[111] |
| 624 | LL3[125] | G3[125] | G4[112] | G3[115] | G4[114] | G0[113] | **G3[125]** | G1[112] |
| 625 | LL4[125] | G4[125] | G4[113] | G3[116] | G4[115] | G0[114] | G1[113] | **G4[125]** |
| 626 | LL0[126] | G0[126] | G4[114] | **G0[126]** | G4[116] | G0[115] | G1[114] | G2[113] |
| 627 | LL1[126] | G1[126] | G4[115] | G3[117] | **G1[126]** | G0[116] | G1[115] | G2[114] |
| 628 | LL2[126] | G2[126] | G4[116] | G3[118] | G4[117] | **G2[126]** | G1[116] | G2[115] |
| 629 | LL3[126] | G3[126] | G4[117] | G3[119] | G4[118] | G0[117] | **G3[126]** | G2[116] |
| 630 | LL4[126] | G4[126] | G4[118] | G3[120] | G4[119] | G0[118] | G1[117] | **G4[126]** |
| 631 | LL0[127] | G0[127] | G4[119] | **G0[127]** | G4[120] | G0[119] | G1[118] | G2[117] |
| 632 | LL1[127] | G1[127] | G4[120] | G4[121] | **G1[127]** | G0[120] | G1[119] | G2[118] |
| 633 | LL2[127] | G2[127] | G4[121] | G4[122] | G0[121] | **G2[127]** | G1[120] | G2[119] |
| 634 | LL3[127] | G3[127] | G4[122] | G4[123] | G0[122] | G1[121] | **G3[127]** | G2[120] |
| 635 | LL4[127] | G4[127] | G4[123] | G4[124] | G0[123] | G1[122] | G2[121] | **G4[127]** |
| 636 | LL0[128] | G0[128] | G4[124] | **G0[128]** | G0[124] | G1[123] | G2[122] | G3[121] |
| 637 | LL1[128] | G1[128] | G4[125] | G4[125] | **G1[128]** | G1[124] | G2[123] | G3[122] |
| 638 | LL2[128] | G2[128] | G4[126] | G4[126] | G0[125] | **G2[128]** | G2[124] | G3[123] |
| 639 | LL3[128] | G3[128] | G4[127] | G4[127] | G0[126] | G1[125] | **G3[128]** | G3[124] |
| 640 | LL4[128] | G4[128] | G4[128] | G4[128] | G0[127] | G1[126] | G2[125] | **G4[128]** |

TABLE 7

| 28G physical lane | | OTL4.4 of | OTL4.4 of FIG. 14 | | | | | |
|---|---|---|---|---|---|---|---|---|
| bit | LL#[bit] | FIG. 4 | No FAS | FAS on $1^{st}$ 16B group | FAS on $2^{nd}$ 16B group | FAS on $3^{rd}$ 16B group | FAS on $4^{th}$ 16B group | FAS on $5^{th}$ 16B group |
| 1 | LL0[1] | rs1-s1[1] | rs1-s1[1] | **rs1-s1[1]** | rs4-s1[8] | rs4-s2[7] | rs4-s3[6] | rs4-s4[5] |
| 2 | LL1[1] | rs1-s2[1] | rs1-s1[2] | rs2-s2[1] | **rs1-s2[1]** | rs4-s2[8] | rs4-s3[7] | rs4-s4[6] |
| 3 | LL2[1] | rs1-s3[1] | rs1-s1[3] | rs2-s2[2] | rs2-s3[1] | **rs1-s3[1]** | rs4-s3[8] | rs4-s4[7] |
| 4 | LL3[1] | rs1-s4[1] | rs1-s1[4] | rs2-s2[3] | rs2-s3[2] | rs2-s4[1] | **rs1-s4[1]** | rs4-s4[8] |
| 5 | LL4[1] | rs1-s5[1] | rs1-s1[5] | rs2-s2[4] | rs2-s3[3] | rs2-s4[2] | rs2-s5[1] | **rs1-s5[1]** |
| 6 | LL0[2] | rs1-s1[2] | rs1-s1[6] | **rs1-s1[2]** | rs2-s3[4] | rs2-s4[3] | rs2-s5[2] | rs2-s1[1] |
| 7 | LL1[2] | rs1-s2[2] | rs1-s1[7] | rs2-s2[5] | **rs1-s2[2]** | rs2-s4[4] | rs2-s5[3] | rs2-s1[2] |
| 8 | LL2[2] | rs1-s3[2] | rs1-s1[8] | rs2-s2[6] | rs2-s3[5] | **rs1-s3[2]** | rs2-s5[4] | rs2-s1[3] |
| 9 | LL3[2] | rs1-s4[2] | rs2-s1[1] | rs2-s2[7] | rs2-s3[6] | rs2-s4[5] | **rs1-s4[2]** | rs2-s1[4] |
| 10 | LL4[2] | rs1-s5[2] | rs2-s1[2] | rs2-s2[8] | rs2-s3[7] | rs2-s4[6] | rs2-s5[5] | **rs1-s5[2]** |
| 11 | LL0[3] | rs1-s1[3] | rs2-s1[3] | **rs1-s1[3]** | rs2-s3[8] | rs2-s4[7] | rs2-s5[6] | rs2-s1[5] |
| 12 | LL1[3] | rs1-s2[3] | rs2-s1[4] | rs3-s3[1] | **rs1-s2[3]** | rs2-s4[8] | rs2-s5[7] | rs2-s1[6] |
| 13 | LL2[3] | rs1-s3[3] | rs2-s1[5] | rs3-s3[2] | rs3-s4[1] | **rs1-s3[3]** | rs2-s5[8] | rs2-s1[7] |
| 14 | LL3[3] | rs1-s4[3] | rs2-s1[6] | rs3-s3[3] | rs3-s4[2] | rs3-s5[1] | **rs1-s4[3]** | rs2-s1[8] |
| 15 | LL4[3] | rs1-s5[3] | rs2-s1[7] | rs3-s3[4] | rs3-s4[3] | rs3-s5[2] | rs3-s1[1] | **rs1-s5[3]** |
| 16 | LL0[4] | rs1-s1[4] | rs2-s1[8] | **rs1-s1[4]** | rs3-s4[4] | rs3-s5[3] | rs3-s1[2] | rs3-s2[1] |

TABLE 7-continued

| 28G physical lane | | OTL4.4 of FIG. 4 | OTL4.4 of FIG. 14 | | | | | |
|---|---|---|---|---|---|---|---|---|
| bit | LL#[bit] | | No FAS | FAS on 1$^{st}$ 16B group | FAS on 2$^{nd}$ 16B group | FAS on 3$^{rd}$ 16B group | FAS on 4$^{th}$ 16B group | FAS on 5$^{th}$ 16B group |
| 17 | LL1[4] | rs1-s2[4] | rs3-s1[1] | rs3-s3[5] | **rs1-s2[4]** | rs3-s5[4] | rs3-s1[3] | rs3-s2[2] |
| 18 | LL2[4] | rs1-s3[4] | rs3-s1[2] | rs3-s3[6] | rs3-s4[5] | **rs1-s3[4]** | rs3-s1[4] | rs3-s2[3] |
| 19 | LL3[4] | rs1-s4[4] | rs3-s1[3] | rs3-s3[7] | rs3-s4[6] | rs3-s5[5] | **rs1-s4[4]** | rs3-s2[4] |
| 20 | LL4[4] | rs1-s5[4] | rs3-s1[4] | rs3-s3[8] | rs3-s4[7] | rs3-s5[6] | rs3-s1[5] | **rs1-s5[4]** |
| 21 | LL0[5] | rs1-s1[5] | rs3-s1[5] | **rs1-s1[5]** | rs3-s4[8] | rs3-s5[7] | rs3-s1[6] | rs3-s2[5] |
| 22 | LL1[5] | rs1-s2[5] | rs3-s1[6] | rs4-s4[1] | **rs1-s2[5]** | rs3-s5[8] | rs3-s1[7] | rs3-s2[6] |
| 23 | LL2[5] | rs1-s3[5] | rs3-s1[7] | rs4-s4[2] | rs4-s5[1] | **rs1-s3[5]** | rs3-s1[8] | rs3-s2[7] |
| 24 | LL3[5] | rs1-s4[5] | rs3-s1[8] | rs4-s4[3] | rs4-s5[2] | rs4-s1[1] | **rs1-s4[5]** | rs3-s2[8] |
| 25 | LL4[5] | rs1-s5[5] | rs4-s1[1] | rs4-s4[4] | rs4-s5[3] | rs4-s1[2] | rs4-s2[1] | **rs1-s5[5]** |
| 26 | LL0[6] | rs1-s1[6] | rs4-s1[2] | **rs1-s1[6]** | rs4-s5[4] | rs4-s1[3] | rs4-s2[2] | rs4-s3[1] |
| 27 | LL1[6] | rs1-s2[6] | rs4-s1[3] | rs4-s4[5] | **rs1-s2[6]** | rs4-s1[4] | rs4-s2[3] | rs4-s3[2] |
| 28 | LL2[6] | rs1-s3[6] | rs4-s1[4] | rs4-s4[6] | rs4-s5[5] | **rs1-s3[6]** | rs4-s2[4] | rs4-s3[3] |
| 29 | LL3[6] | rs1-s4[6] | rs4-s1[5] | rs4-s4[7] | rs4-s5[6] | rs4-s1[5] | **rs1-s4[6]** | rs4-s3[4] |
| 30 | LL4[6] | rs1-s5[6] | rs4-s1[6] | rs4-s4[8] | rs4-s5[7] | rs4-s1[6] | rs4-s2[5] | **rs1-s5[6]** |
| 31 | LL0[7] | rs1-s1[7] | rs4-s1[7] | **rs1-s1[7]** | rs4-s5[8] | rs4-s1[7] | rs4-s2[6] | rs4-s3[5] |
| 32 | LL1[7] | rs1-s2[7] | rs4-s1[8] | rs1-s5[1] | **rs1-s2[7]** | rs4-s1[8] | rs4-s2[7] | rs4-s3[6] |
| 33 | LL2[7] | rs1-s3[7] | rs1-s2[1] | rs1-s5[2] | rs1-s1[1] | **rs1-s3[7]** | rs4-s2[8] | rs4-s3[7] |
| 34 | LL3[7] | rs1-s4[7] | rs1-s2[2] | rs1-s5[3] | rs1-s1[2] | rs1-s2[1] | **rs1-s4[7]** | rs4-s3[8] |
| 35 | LL4[7] | rs1-s5[7] | rs1-s2[3] | rs1-s5[4] | rs1-s1[3] | rs1-s2[2] | rs1-s3[1] | **rs1-s5[7]** |
| 36 | LL0[8] | rs1-s1[8] | rs1-s2[4] | **rs1-s1[8]** | rs1-s1[4] | rs1-s2[3] | rs1-s3[2] | rs1-s4[1] |
| 37 | LL1[8] | rs1-s2[8] | rs1-s2[5] | rs1-s5[5] | **rs1-s2[8]** | rs1-s2[4] | rs1-s3[3] | rs1-s4[2] |
| 38 | LL2[8] | rs1-s3[8] | rs1-s2[6] | rs1-s5[6] | rs1-s1[5] | **rs1-s3[8]** | rs1-s3[4] | rs1-s4[3] |
| 39 | LL3[8] | rs1-s4[8] | rs1-s2[7] | rs1-s5[7] | rs1-s1[6] | rs1-s2[5] | **rs1-s4[8]** | rs1-s4[4] |
| 40 | LL4[8] | rs1-s5[8] | rs1-s2[8] | rs1-s5[8] | rs1-s1[7] | rs1-s2[6] | rs1-s3[5] | **rs1-s5[8]** |
| 41 | LL0[9] | rs2-s1[1] | rs2-s2[1] | **rs2-s1[1]** | rs1-s1[8] | rs1-s2[7] | rs1-s3[6] | rs1-s4[5] |
| 42 | LL1[9] | rs2-s2[1] | rs2-s2[2] | rs3-s2[1] | **rs2-s2[1]** | rs1-s2[8] | rs1-s3[7] | rs1-s4[6] |
| 43 | LL2[9] | rs2-s3[1] | rs2-s2[3] | rs3-s2[2] | rs3-s3[1] | **rs2-s3[1]** | rs1-s3[8] | rs1-s4[7] |
| 44 | LL3[9] | rs2-s4[1] | rs2-s2[4] | rs3-s2[3] | rs3-s3[2] | rs3-s4[1] | **rs2-s4[1]** | rs1-s4[8] |
| 45 | LL4[9] | rs2-s5[1] | rs2-s2[5] | rs3-s2[4] | rs3-s3[3] | rs3-s4[2] | rs3-s5[1] | **rs2-s5[1]** |
| 46 | LL0[10] | rs2-s1[2] | rs2-s2[6] | **rs2-s1[2]** | rs3-s3[4] | rs3-s4[3] | rs3-s5[2] | rs3-s1[1] |
| 47 | LL1[10] | rs2-s2[2] | rs2-s2[7] | rs3-s2[5] | **rs2-s2[2]** | rs3-s4[4] | rs3-s5[3] | rs3-s1[2] |
| 48 | LL2[10] | rs2-s3[2] | rs2-s2[8] | rs3-s2[6] | rs3-s3[5] | **rs2-s3[2]** | rs3-s5[4] | rs3-s1[3] |
| 49 | LL3[10] | rs2-s4[2] | rs3-s2[1] | rs3-s2[7] | rs3-s3[6] | rs3-s4[5] | **rs2-s4[2]** | rs3-s1[4] |
| 50 | LL4[10] | rs2-s5[2] | rs3-s2[2] | rs3-s2[8] | rs3-s3[7] | rs3-s4[6] | rs3-s5[5] | **rs2-s5[2]** |
| 51 | LL0[11] | rs2-s1[3] | rs3-s2[3] | **rs2-s1[3]** | rs3-s3[8] | rs3-s4[7] | rs3-s5[6] | rs3-s1[5] |
| 52 | LL1[11] | rs2-s2[3] | rs3-s2[4] | rs4-s3[1] | **rs2-s2[3]** | rs3-s4[8] | rs3-s5[7] | rs3-s1[6] |
| 53 | LL2[11] | rs2-s3[3] | rs3-s2[5] | rs4-s3[2] | rs4-s4[1] | **rs2-s3[3]** | rs3-s5[8] | rs3-s1[7] |
| 54 | LL3[11] | rs2-s4[3] | rs3-s2[6] | rs4-s3[3] | rs4-s4[2] | rs4-s5[1] | **rs2-s4[3]** | rs3-s1[8] |
| 55 | LL4[11] | rs2-s5[3] | rs3-s2[7] | rs4-s3[4] | rs4-s4[3] | rs4-s5[2] | rs4-s1[1] | **rs2-s5[3]** |
| 56 | LL0[12] | rs2-s1[4] | rs3-s2[8] | **rs2-s1[4]** | rs4-s4[4] | rs4-s5[3] | rs4-s1[2] | rs4-s2[1] |
| 57 | LL1[12] | rs2-s2[4] | rs4-s2[1] | rs4-s3[5] | **rs2-s2[4]** | rs4-s5[4] | rs4-s1[3] | rs4-s2[2] |
| 58 | LL2[12] | rs2-s3[4] | rs4-s2[2] | rs4-s3[6] | rs4-s4[5] | **rs2-s3[4]** | rs4-s1[4] | rs4-s2[3] |
| 59 | LL3[12] | rs2-s4[4] | rs4-s2[3] | rs4-s3[7] | rs4-s4[6] | rs4-s5[5] | **rs2-s4[4]** | rs4-s2[4] |
| 60 | LL4[12] | rs2-s5[4] | rs4-s2[4] | rs4-s3[8] | rs4-s4[7] | rs4-s5[6] | rs4-s1[5] | **rs2-s5[4]** |
| 61 | LL0[13] | rs2-s1[5] | rs4-s2[5] | **rs2-s1[5]** | rs4-s4[8] | rs4-s5[7] | rs4-s1[6] | rs4-s2[5] |
| 62 | LL1[13] | rs2-s2[5] | rs4-s2[6] | rs1-s4[1] | **rs2-s2[5]** | rs4-s5[8] | rs4-s1[7] | rs4-s2[6] |
| 63 | LL2[13] | rs2-s3[5] | rs4-s2[7] | rs1-s4[2] | rs1-s5[1] | **rs2-s3[5]** | rs4-s1[8] | rs4-s2[7] |
| 64 | LL3[13] | rs2-s4[5] | rs4-s2[8] | rs1-s4[3] | rs1-s5[2] | rs1-s1[1] | **rs2-s4[5]** | rs4-s2[8] |
| 65 | LL4[13] | rs2-s5[5] | rs1-s3[1] | rs1-s4[4] | rs1-s5[3] | rs1-s1[2] | rs1-s2[1] | **rs2-s5[5]** |
| 66 | LL0[14] | rs2-s1[6] | rs1-s3[2] | **rs2-s1[6]** | rs1-s5[4] | rs1-s1[3] | rs1-s2[2] | rs1-s3[1] |
| 67 | LL1[14] | rs2-s2[6] | rs1-s3[3] | rs1-s4[5] | **rs2-s2[6]** | rs1-s1[4] | rs1-s2[3] | rs1-s3[2] |
| 68 | LL2[14] | rs2-s3[6] | rs1-s3[4] | rs1-s4[6] | rs1-s5[5] | **rs2-s3[6]** | rs1-s2[4] | rs1-s3[3] |
| 69 | LL3[14] | rs2-s4[6] | rs1-s3[5] | rs1-s4[7] | rs1-s5[6] | rs1-s1[5] | **rs2-s4[6]** | rs1-s3[4] |
| 70 | LL4[14] | rs2-s5[6] | rs1-s3[6] | rs1-s4[8] | rs1-s5[7] | rs1-s1[6] | rs1-s2[5] | **rs2-s5[6]** |
| 71 | LL0[15] | rs2-s1[7] | rs1-s3[7] | **rs2-s1[7]** | rs1-s5[8] | rs1-s1[7] | rs1-s2[6] | rs1-s3[5] |
| 72 | LL1[15] | rs2-s2[7] | rs1-s3[8] | rs2-s5[1] | **rs2-s2[7]** | rs1-s1[8] | rs1-s2[7] | rs1-s3[6] |
| 73 | LL2[15] | rs2-s3[7] | rs2-s3[1] | rs2-s5[2] | rs2-s1[1] | **rs2-s3[7]** | rs1-s2[8] | rs1-s3[7] |
| 74 | LL3[15] | rs2-s4[7] | rs2-s3[2] | rs2-s5[3] | rs2-s1[2] | rs2-s2[1] | **rs2-s4[7]** | rs1-s3[8] |
| 75 | LL4[15] | rs2-s5[7] | rs2-s3[3] | rs2-s5[4] | rs2-s1[3] | rs2-s2[2] | rs2-s3[1] | **rs2-s5[7]** |
| 76 | LL0[16] | rs2-s1[8] | rs2-s3[4] | **rs2-s1[8]** | rs2-s1[4] | rs2-s2[3] | rs2-s3[2] | rs2-s4[1] |
| 77 | LL1[16] | rs2-s2[8] | rs2-s3[5] | rs2-s5[5] | **rs2-s2[8]** | rs2-s2[4] | rs2-s3[3] | rs2-s4[2] |
| 78 | LL2[16] | rs2-s3[8] | rs2-s3[6] | rs2-s5[6] | rs2-s1[5] | **rs2-s3[8]** | rs2-s3[4] | rs2-s4[3] |
| 79 | LL3[16] | rs2-s4[8] | rs2-s3[7] | rs2-s5[7] | rs2-s1[6] | rs2-s2[5] | **rs2-s4[8]** | rs2-s4[4] |
| 80 | LL4[16] | rs2-s5[8] | rs2-s3[8] | rs2-s5[8] | rs2-s1[7] | rs2-s2[6] | rs2-s3[5] | **rs2-s5[8]** |
| 81 | LL0[17] | rs3-s1[1] | rs3-s3[1] | **rs3-s1[1]** | rs2-s1[8] | rs2-s2[7] | rs2-s3[6] | rs2-s4[5] |
| 82 | LL1[17] | rs3-s2[1] | rs3-s3[2] | rs4-s2[1] | **rs3-s2[1]** | rs2-s2[8] | rs2-s3[7] | rs2-s4[6] |
| 83 | LL2[17] | rs3-s3[1] | rs3-s3[3] | rs4-s2[2] | rs4-s3[1] | **rs3-s3[1]** | rs2-s3[8] | rs2-s4[7] |
| 84 | LL3[17] | rs3-s4[1] | rs3-s3[4] | rs4-s2[3] | rs4-s3[2] | rs4-s4[1] | **rs3-s4[1]** | rs2-s4[8] |
| 85 | LL4[17] | rs3-s5[1] | rs3-s3[5] | rs4-s2[4] | rs4-s3[3] | rs4-s4[2] | rs4-s5[1] | **rs3-s5[1]** |
| 86 | LL0[18] | rs3-s1[2] | rs3-s3[6] | **rs3-s1[2]** | rs4-s3[4] | rs4-s4[3] | rs4-s5[2] | rs4-s1[1] |
| 87 | LL1[18] | rs3-s2[2] | rs3-s3[7] | rs4-s2[5] | **rs3-s2[2]** | rs4-s4[4] | rs4-s5[3] | rs4-s1[2] |
| 88 | LL2[18] | rs3-s3[2] | rs3-s3[8] | rs4-s2[6] | rs4-s3[5] | **rs3-s3[2]** | rs4-s5[4] | rs4-s1[3] |
| 89 | LL3[18] | rs3-s4[2] | rs4-s3[1] | rs4-s2[7] | rs4-s3[6] | rs4-s4[5] | **rs3-s4[2]** | rs4-s1[4] |
| 90 | LL4[18] | rs3-s5[2] | rs4-s3[2] | rs4-s2[8] | rs4-s3[7] | rs4-s4[6] | rs4-s5[5] | **rs3-s5[2]** |

TABLE 7-continued

| 28G physical lane | | OTL4.4 of | OTL4.4 of FIG. 14 | | | | | |
|---|---|---|---|---|---|---|---|---|
| bit | LL#[bit] | FIG. 4 | No FAS | FAS on 1$^{st}$ 16B group | FAS on 2$^{nd}$ 16B group | FAS on 3$^{rd}$ 16B group | FAS on 4$^{th}$ 16B group | FAS on 5$^{th}$ 16B group |
| 91 | LL0[19] | rs3-s1[3] | rs4-s3[3] | **rs3-s1[3]** | rs4-s3[8] | rs4-s4[7] | rs4-s5[6] | rs4-s1[5] |
| 92 | LL1[19] | rs3-s2[3] | rs4-s3[4] | rs1-s3[1] | **rs3-s2[3]** | rs4-s4[8] | rs4-s5[7] | rs4-s1[6] |
| 93 | LL2[19] | rs3-s3[3] | rs4-s3[5] | rs1-s3[2] | rs1-s4[1] | **rs3-s3[3]** | rs4-s5[8] | rs4-s1[7] |
| 94 | LL3[19] | rs3-s4[3] | rs4-s3[6] | rs1-s3[3] | rs1-s4[2] | rs1-s5[1] | **rs3-s4[3]** | rs4-s1[8] |
| 95 | LL4[19] | rs3-s5[3] | rs4-s3[7] | rs1-s3[4] | rs1-s4[3] | rs1-s5[2] | rs1-s1[1] | **rs3-s5[3]** |
| 96 | LL0[20] | rs3-s1[4] | rs4-s3[8] | **rs3-s1[4]** | rs1-s4[4] | rs1-s5[3] | rs1-s1[2] | rs1-s2[1] |
| 97 | LL1[20] | rs3-s2[4] | rs1-s4[1] | rs1-s3[5] | **rs3-s2[4]** | rs1-s5[4] | rs1-s1[3] | rs1-s2[2] |
| 98 | LL2[20] | rs3-s3[4] | rs1-s4[2] | rs1-s3[6] | rs1-s4[5] | **rs3-s3[4]** | rs1-s1[4] | rs1-s2[3] |
| 99 | LL3[20] | rs3-s4[4] | rs1-s4[3] | rs1-s3[7] | rs1-s4[6] | rs1-s5[5] | **rs3-s4[4]** | rs1-s2[4] |
| 100 | LL4[20] | rs3-s5[4] | rs1-s4[4] | rs1-s3[8] | rs1-s4[7] | rs1-s5[6] | rs1-s1[5] | **rs3-s5[4]** |
| 101 | LL0[21] | rs3-s1[5] | rs1-s4[5] | **rs3-s1[5]** | rs1-s4[8] | rs1-s5[7] | rs1-s1[6] | rs1-s2[5] |
| 102 | LL1[21] | rs3-s2[5] | rs1-s4[6] | rs2-s4[1] | **rs3-s2[5]** | rs1-s5[8] | rs1-s1[7] | rs1-s2[6] |
| 103 | LL2[21] | rs3-s3[5] | rs1-s4[7] | rs2-s4[2] | rs2-s5[1] | **rs3-s3[5]** | rs1-s1[8] | rs1-s2[7] |
| 104 | LL3[21] | rs3-s4[5] | rs1-s4[8] | rs2-s4[3] | rs2-s5[2] | rs2-s1[1] | **rs3-s4[5]** | rs1-s2[8] |
| 105 | LL4[21] | rs3-s5[5] | rs2-s4[1] | rs2-s4[4] | rs2-s5[3] | rs2-s1[2] | rs2-s2[1] | **rs3-s5[5]** |
| 106 | LL0[22] | rs3-s1[6] | rs2-s4[2] | **rs3-s1[6]** | rs2-s5[4] | rs2-s1[3] | rs2-s2[2] | rs2-s3[1] |
| 107 | LL1[22] | rs3-s2[6] | rs2-s4[3] | rs2-s4[5] | **rs3-s2[6]** | rs2-s1[4] | rs2-s2[3] | rs2-s3[2] |
| 108 | LL2[22] | rs3-s3[6] | rs2-s4[4] | rs2-s4[6] | rs2-s5[5] | **rs3-s3[6]** | rs2-s2[4] | rs2-s3[3] |
| 109 | LL3[22] | rs3-s4[6] | rs2-s4[5] | rs2-s4[7] | rs2-s5[6] | rs2-s1[5] | **rs3-s4[6]** | rs2-s3[4] |
| 110 | LL4[22] | rs3-s5[6] | rs2-s4[6] | rs2-s4[8] | rs2-s5[7] | rs2-s1[6] | rs2-s2[5] | **rs3-s5[6]** |
| 111 | LL0[23] | rs3-s1[7] | rs2-s4[7] | **rs3-s1[7]** | rs2-s5[8] | rs2-s1[7] | rs2-s2[6] | rs2-s3[5] |
| 112 | LL1[23] | rs3-s2[7] | rs2-s4[8] | rs3-s5[1] | **rs3-s2[7]** | rs2-s1[8] | rs2-s2[7] | rs2-s3[6] |
| 113 | LL2[23] | rs3-s3[7] | rs3-s4[1] | rs3-s5[2] | rs3-s1[1] | **rs3-s3[7]** | rs2-s2[8] | rs2-s3[7] |
| 114 | LL3[23] | rs3-s4[7] | rs3-s4[2] | rs3-s5[3] | rs3-s1[2] | rs3-s2[1] | **rs3-s4[7]** | rs2-s3[8] |
| 115 | LL4[23] | rs3-s5[7] | rs3-s4[3] | rs3-s5[4] | rs3-s1[3] | rs3-s2[2] | rs3-s3[1] | **rs3-s5[7]** |
| 116 | LL0[24] | rs3-s1[8] | rs3-s4[4] | **rs3-s1[8]** | rs3-s1[4] | rs3-s2[3] | rs3-s3[2] | rs3-s4[1] |
| 117 | LL1[24] | rs3-s2[8] | rs3-s4[5] | rs3-s5[5] | **rs3-s2[8]** | rs3-s2[4] | rs3-s3[3] | rs3-s4[2] |
| 118 | LL2[24] | rs3-s3[8] | rs3-s4[6] | rs3-s5[6] | rs3-s1[5] | **rs3-s3[8]** | rs3-s3[4] | rs3-s4[3] |
| 119 | LL3[24] | rs3-s4[8] | rs3-s4[7] | rs3-s5[7] | rs3-s1[6] | rs3-s2[5] | **rs3-s4[8]** | rs3-s4[4] |
| 120 | LL4[24] | rs3-s5[8] | rs3-s4[8] | rs3-s5[8] | rs3-s1[7] | rs3-s2[6] | rs3-s3[5] | **rs3-s5[8]** |
| 121 | LL0[25] | rs4-s1[1] | rs4-s4[1] | **rs4-s1[1]** | rs3-s1[8] | rs3-s2[7] | rs3-s3[6] | rs3-s4[5] |
| 122 | LL1[25] | rs4-s2[1] | rs4-s4[2] | rs1-s2[1] | **rs4-s2[1]** | rs3-s2[8] | rs3-s3[7] | rs3-s4[6] |
| 123 | LL2[25] | rs4-s3[1] | rs4-s4[3] | rs1-s2[2] | rs1-s3[1] | **rs4-s3[1]** | rs3-s3[8] | rs3-s4[7] |
| 124 | LL3[25] | rs4-s4[1] | rs4-s4[4] | rs1-s2[3] | rs1-s3[2] | rs1-s4[1] | **rs4-s4[1]** | rs3-s4[8] |
| 125 | LL4[25] | rs4-s5[1] | rs4-s4[5] | rs1-s2[4] | rs1-s3[3] | rs1-s4[2] | rs1-s5[1] | **rs4-s5[1]** |
| 126 | LL0[26] | rs4-s1[2] | rs4-s4[6] | **rs4-s1[2]** | rs1-s3[4] | rs1-s4[3] | rs1-s5[2] | rs1-s1[1] |
| 127 | LL1[26] | rs4-s2[2] | rs4-s4[7] | rs1-s2[5] | **rs4-s2[2]** | rs1-s4[4] | rs1-s5[3] | rs1-s1[2] |
| 128 | LL2[26] | rs4-s3[2] | rs4-s4[8] | rs1-s2[6] | rs1-s3[5] | **rs4-s3[2]** | rs1-s5[4] | rs1-s1[3] |
| 129 | LL3[26] | rs4-s4[2] | rs1-s5[1] | rs1-s2[7] | rs1-s3[6] | rs1-s4[5] | **rs4-s4[2]** | rs1-s1[4] |
| 130 | LL4[26] | rs4-s5[2] | rs1-s5[2] | rs1-s2[8] | rs1-s3[7] | rs1-s4[6] | rs1-s5[5] | **rs4-s5[2]** |
| 131 | LL0[27] | rs4-s1[3] | rs1-s5[3] | **rs4-s1[3]** | rs1-s3[8] | rs1-s4[7] | rs1-s5[6] | rs1-s1[5] |
| 132 | LL1[27] | rs4-s2[3] | rs1-s5[4] | rs2-s3[1] | **rs4-s2[3]** | rs1-s4[8] | rs1-s5[7] | rs1-s1[6] |
| 133 | LL2[27] | rs4-s3[3] | rs1-s5[5] | rs2-s3[2] | rs2-s4[1] | **rs4-s3[3]** | rs1-s5[8] | rs1-s1[7] |
| 134 | LL3[27] | rs4-s4[3] | rs1-s5[6] | rs2-s3[3] | rs2-s4[2] | rs2-s5[1] | **rs4-s4[3]** | rs1-s1[8] |
| 135 | LL4[27] | rs4-s5[3] | rs1-s5[7] | rs2-s3[4] | rs2-s4[3] | rs2-s5[2] | rs2-s1[1] | **rs4-s5[3]** |
| . . . | . . . | . . . | . . . | . . . | . . . | . . . | . . . | . . . |
| . . . | . . . | . . . | . . . | . . . | . . . | . . . | . . . | . . . |
| . . . | . . . | . . . | . . . | . . . | . . . | . . . | . . . | . . . |
| 151 | LL0[31] | rs4-s1[7] | rs2-s4[7] | **rs4-s1[7]** | rs2-s4[8] | rs2-s1[7] | rs2-s2[6] | rs2-s3[5] |
| 152 | LL1[31] | rs4-s2[7] | rs2-s4[8] | rs3-s5[1] | **rs4-s2[7]** | rs2-s1[8] | rs2-s2[7] | rs2-s3[6] |
| 153 | LL2[31] | rs4-s3[7] | rs4-s5[1] | rs3-s5[2] | rs3-s1[1] | **rs4-s3[7]** | rs2-s2[8] | rs2-s3[7] |
| 154 | LL3[31] | rs4-s4[7] | rs4-s5[2] | rs3-s5[3] | rs3-s1[2] | rs3-s2[1] | **rs4-s4[7]** | rs2-s3[8] |
| 155 | LL4[31] | rs4-s5[7] | rs4-s5[3] | rs3-s5[4] | rs3-s1[3] | rs3-s2[2] | rs3-s3[1] | **rs4-s5[7]** |
| 156 | LL0[32] | rs4-s1[8] | rs4-s5[4] | **rs4-s1[8]** | rs3-s1[4] | rs3-s2[3] | rs3-s3[2] | rs3-s4[1] |
| 157 | LL1[32] | rs4-s2[8] | rs4-s5[5] | rs3-s5[5] | **rs4-s2[8]** | rs3-s2[4] | rs3-s3[3] | rs3-s4[2] |
| 158 | LL2[32] | rs4-s3[8] | rs4-s5[6] | rs3-s5[6] | rs3-s1[5] | **rs4-s3[8]** | rs3-s3[4] | rs3-s4[3] |
| 159 | LL3[32] | rs4-s4[8] | rs4-s5[7] | rs3-s5[7] | rs3-s1[6] | rs3-s2[5] | **rs4-s4[8]** | rs3-s4[4] |
| 160 | LL4[32] | rs4-s5[8] | rs4-s5[8] | rs3-s5[8] | rs3-s1[7] | rs3-s2[6] | rs3-s3[5] | **rs4-s5[8]** |
| 161 | LL0[33] | rs5-s1[1] | rs5-s1[1] | **rs5-s1[1]** | rs8-s1[8] | rs8-s2[7] | rs8-s3[6] | rs8-s4[5] |
| 162 | LL1[33] | rs5-s2[1] | rs5-s1[2] | rs6-s2[1] | **rs5-s2[1]** | rs8-s2[8] | rs8-s3[7] | rs8-s4[6] |
| 163 | LL2[33] | rs5-s3[1] | rs5-s1[3] | rs6-s2[2] | rs6-s3[1] | **rs5-s3[1]** | rs8-s3[8] | rs8-s4[7] |
| 164 | LL3[33] | rs5-s4[1] | rs5-s1[4] | rs6-s2[3] | rs6-s3[2] | rs6-s4[1] | **rs5-s4[1]** | rs8-s4[8] |
| 165 | LL4[33] | rs5-s5[1] | rs5-s1[5] | rs6-s2[4] | rs6-s3[3] | rs6-s4[2] | rs6-s5[1] | **rs5-s5[1]** |
| . . . | . . . | . . . | . . . | . . . | . . . | . . . | . . . | . . . |
| . . . | . . . | . . . | . . . | . . . | . . . | . . . | . . . | . . . |
| . . . | . . . | . . . | . . . | . . . | . . . | . . . | . . . | . . . |
| 572 | LL1[115] | rs15-s2[3] | rs16-s3[4] | rs13-s3[1] | **rs15-s2[3]** | rs16-s4[8] | rs16-s5[7] | rs16-s1[6] |
| 573 | LL2[115] | rs15-s3[3] | rs16-s3[5] | rs13-s3[2] | rs13-s4[1] | **rs15-s3[3]** | rs16-s5[8] | rs16-s1[7] |
| 574 | LL3[115] | rs15-s4[3] | rs16-s3[6] | rs13-s3[3] | rs13-s4[2] | rs13-s5[1] | **rs15-s4[3]** | rs16-s1[8] |
| 575 | LL4[115] | rs15-s5[3] | rs16-s3[7] | rs13-s3[4] | rs13-s4[3] | rs13-s5[2] | rs13-s1[1] | **rs15-s5[3]** |
| 576 | LL0[116] | rs15-s1[4] | rs16-s3[8] | **rs15-s1[4]** | rs13-s4[4] | rs13-s5[3] | rs13-s1[2] | rs13-s2[1] |
| 577 | LL1[116] | rs15-s2[4] | rs13-s4[1] | rs13-s3[5] | **rs15-s2[4]** | rs13-s5[4] | rs13-s1[3] | rs13-s2[2] |
| 578 | LL2[116] | rs15-s3[4] | rs13-s4[2] | rs13-s3[6] | rs13-s4[5] | **rs15-s3[4]** | rs13-s1[4] | rs13-s2[3] |
| 579 | LL3[116] | rs15-s4[4] | rs13-s4[3] | rs13-s3[7] | rs13-s4[6] | rs13-s5[5] | **rs15-s4[4]** | rs13-s2[4] |

TABLE 7-continued

| 28G physical lane | | OTL4.4 of | OTL4.4 of FIG. 14 | | | | | |
|---|---|---|---|---|---|---|---|---|
| | | | | FAS on 1st | FAS on 2nd | FAS on 3rd | FAS on 4th | FAS on 5th |
| bit | LL#[bit] | FIG. 4 | No FAS | 16B group | 16B group | 16B group | 16B group | 16B group |
| 580 | LL4[116] | rs15-s5[4] | rs13-s4[4] | rs13-s3[8] | rs13-s4[7] | rs13-s5[6] | rs13-s1[5] | **rs15-s5[4]** |
| 581 | LL0[117] | rs15-s1[5] | rs13-s4[5] | **rs15-s1[5]** | rs13-s4[8] | rs13-s5[7] | rs13-s1[6] | rs13-s2[5] |
| 582 | LL1[117] | rs15-s2[5] | rs13-s4[6] | rs14-s4[1] | **rs15-s2[5]** | rs13-s5[8] | rs13-s1[7] | rs13-s2[6] |
| 583 | LL2[117] | rs15-s3[5] | rs13-s4[7] | rs14-s4[2] | rs14-s5[1] | **rs15-s3[5]** | rs13-s1[8] | rs13-s2[7] |
| 584 | LL3[117] | rs15-s4[5] | rs13-s4[8] | rs14-s4[3] | rs14-s5[2] | rs14-s1[1] | **rs15-s4[5]** | rs13-s2[8] |
| 585 | LL4[117] | rs15-s5[5] | rs14-s4[1] | rs14-s4[4] | rs14-s5[3] | rs14-s1[2] | rs14-s2[1] | **rs15-s5[5]** |
| 586 | LL0[118] | rs15-s1[6] | rs14-s4[2] | **rs15-s1[6]** | rs14-s5[4] | rs14-s1[3] | rs14-s2[2] | rs14-s3[1] |
| 587 | LL0[119] | rs15-s2[6] | rs14-s4[3] | rs14-s4[5] | **rs15-s2[6]** | rs14-s1[4] | rs14-s2[3] | rs14-s3[2] |
| 588 | LL0[120] | rs15-s3[6] | rs14-s4[4] | rs14-s4[6] | rs14-s5[5] | **rs15-s3[6]** | rs14-s2[4] | rs14-s3[3] |
| 589 | LL0[121] | rs15-s4[6] | rs14-s4[5] | rs14-s4[7] | rs14-s5[6] | rs14-s1[5] | **rs15-s4[6]** | rs14-s3[4] |
| 590 | LL0[122] | rs15-s5[6] | rs14-s4[6] | rs14-s4[8] | rs14-s5[7] | rs14-s1[6] | rs14-s2[5] | **rs15-s5[6]** |
| 591 | LL0[119] | rs15-s1[7] | rs14-s4[7] | **rs15-s1[7]** | rs14-s5[8] | rs14-s1[7] | rs14-s2[6] | rs14-s3[5] |
| 592 | LL1[119] | rs15-s2[7] | rs14-s4[8] | rs15-s5[1] | **rs15-s2[7]** | rs14-s1[8] | rs14-s2[7] | rs14-s3[6] |
| 593 | LL2[119] | rs15-s3[7] | rs15-s4[1] | rs15-s5[2] | rs15-s1[1] | **rs15-s3[7]** | rs14-s2[8] | rs14-s3[7] |
| 594 | LL3[119] | rs15-s4[7] | rs15-s4[2] | rs15-s5[3] | rs15-s1[2] | rs15-s2[1] | **rs15-s4[7]** | rs14-s3[8] |
| 595 | LL4[119] | rs15-s5[7] | rs15-s4[3] | rs15-s5[4] | rs15-s1[3] | rs15-s2[2] | rs15-s3[1] | **rs15-s5[7]** |
| 596 | LL0[120] | rs15-s1[8] | rs15-s4[4] | **rs15-s1[8]** | rs15-s1[4] | rs15-s2[3] | rs15-s3[2] | rs15-s4[1] |
| 597 | LL1[120] | rs15-s2[8] | rs15-s4[5] | rs15-s5[5] | **rs15-s2[8]** | rs15-s2[4] | rs15-s3[3] | rs15-s4[2] |
| 598 | LL2[120] | rs15-s3[8] | rs15-s4[6] | rs15-s5[6] | rs15-s1[5] | **rs15-s3[8]** | rs15-s3[4] | rs15-s4[3] |
| 599 | LL3[120] | rs15-s4[8] | rs15-s4[7] | rs15-s5[7] | rs15-s1[6] | rs15-s2[5] | **rs15-s4[8]** | rs15-s4[4] |
| 600 | LL4[120] | rs15-s5[8] | rs15-s4[8] | rs15-s5[8] | rs15-s1[7] | rs15-s2[6] | rs15-s3[5] | **rs15-s5[8]** |
| 601 | LL0[121] | rs16-s1[1] | rs16-s4[1] | **rs16-s1[1]** | rs15-s1[8] | rs15-s2[7] | rs15-s3[6] | rs15-s4[5] |
| 602 | LL1[121] | rs16-s2[1] | rs16-s4[2] | rs13-s2[1] | **rs16-s2[1]** | rs15-s2[8] | rs15-s3[7] | rs15-s4[6] |
| 603 | LL2[121] | rs16-s3[1] | rs16-s4[3] | rs13-s2[2] | rs13-s3[1] | **rs16-s3[1]** | rs15-s3[8] | rs15-s4[7] |
| 604 | LL3[121] | rs16-s4[1] | rs16-s4[4] | rs13-s2[3] | rs13-s3[2] | rs13-s4[1] | **rs16-s4[1]** | rs15-s4[8] |
| 605 | LL4[121] | rs16-s5[1] | rs16-s4[5] | rs13-s2[4] | rs13-s3[3] | rs13-s4[2] | rs13-s5[1] | **rs16-s5[1]** |
| 606 | LL0[122] | rs16-s1[2] | rs16-s4[6] | **rs16-s1[2]** | rs13-s3[4] | rs13-s4[3] | rs13-s5[2] | rs13-s1[1] |
| 607 | LL1[122] | rs16-s2[2] | rs16-s4[7] | rs13-s2[5] | **rs16-s2[2]** | rs13-s4[4] | rs13-s5[3] | rs13-s1[2] |
| 608 | LL2[122] | rs16-s3[2] | rs16-s4[8] | rs13-s2[6] | rs13-s3[5] | **rs16-s3[2]** | rs13-s5[4] | rs13-s1[3] |
| 609 | LL3[122] | rs16-s4[2] | rs13-s5[1] | rs13-s2[7] | rs13-s3[6] | rs13-s4[5] | **rs16-s4[2]** | rs13-s1[4] |
| 610 | LL4[122] | rs16-s5[2] | rs13-s5[2] | rs13-s2[8] | rs13-s3[7] | rs13-s4[6] | rs13-s5[5] | **rs16-s5[2]** |
| 611 | LL0[123] | rs16-s1[3] | rs13-s5[3] | **rs16-s1[3]** | rs13-s3[8] | rs13-s4[7] | rs13-s5[6] | rs13-s1[5] |
| 612 | LL1[123] | rs16-s2[3] | rs13-s5[4] | rs14-s3[1] | **rs16-s2[3]** | rs13-s4[8] | rs13-s5[7] | rs13-s1[6] |
| 613 | LL2[123] | rs16-s3[3] | rs13-s5[5] | rs14-s3[2] | rs14-s4[1] | **rs16-s3[3]** | rs13-s5[8] | rs13-s1[7] |
| 614 | LL3[123] | rs16-s4[3] | rs13-s5[6] | rs14-s3[3] | rs14-s4[2] | rs14-s5[1] | **rs16-s4[3]** | rs13-s1[8] |
| 615 | LL4[123] | rs16-s5[3] | rs13-s5[7] | rs14-s3[4] | rs14-s4[3] | rs14-s5[2] | rs14-s1[1] | **rs16-s5[3]** |
| 616 | LL0[124] | rs16-s1[4] | rs13-s5[8] | **rs16-s1[4]** | rs14-s4[4] | rs14-s5[3] | rs14-s1[2] | rs14-s2[1] |
| 617 | LL1[124] | rs16-s2[4] | rs14-s5[1] | rs14-s3[5] | **rs16-s2[4]** | rs14-s5[4] | rs14-s1[3] | rs14-s2[2] |
| 618 | LL2[124] | rs16-s3[4] | rs14-s5[2] | rs14-s3[6] | rs14-s4[5] | **rs16-s3[4]** | rs14-s1[4] | rs14-s2[3] |
| 619 | LL3[124] | rs16-s4[4] | rs14-s5[3] | rs14-s3[7] | rs14-s4[6] | rs14-s5[5] | **rs16-s4[4]** | rs14-s2[4] |
| 620 | LL4[124] | rs16-s5[4] | rs14-s5[4] | rs14-s3[8] | rs14-s4[7] | rs14-s5[6] | rs14-s1[5] | **rs16-s5[4]** |
| 621 | LL0[125] | rs16-s1[5] | rs14-s5[5] | **rs16-s1[5]** | rs14-s4[8] | rs14-s5[7] | rs14-s1[6] | rs14-s2[5] |
| 622 | LL1[125] | rs16-s2[5] | rs14-s5[6] | rs15-s4[1] | **rs16-s2[5]** | rs14-s5[8] | rs14-s1[7] | rs14-s2[6] |
| 623 | LL2[125] | rs16-s3[5] | rs14-s5[7] | rs15-s4[2] | rs15-s5[1] | **rs16-s3[5]** | rs14-s1[8] | rs14-s2[7] |
| 624 | LL3[125] | rs16-s4[5] | rs14-s5[8] | rs15-s4[3] | rs15-s5[2] | rs15-s1[1] | **rs16-s4[5]** | rs14-s2[8] |
| 625 | LL4[125] | rs16-s5[5] | rs15-s5[1] | rs15-s4[4] | rs15-s5[3] | rs15-s1[2] | rs15-s2[1] | **rs16-s5[5]** |
| 626 | LL0[126] | rs16-s1[6] | rs15-s5[2] | **rs16-s1[6]** | rs15-s5[4] | rs15-s1[3] | rs15-s2[2] | rs15-s3[1] |
| 627 | LL1[126] | rs16-s2[6] | rs15-s5[3] | rs15-s4[5] | **rs16-s2[6]** | rs15-s1[4] | rs15-s2[3] | rs15-s3[2] |
| 628 | LL2[126] | rs16-s3[6] | rs15-s5[4] | rs15-s4[6] | rs15-s5[5] | **rs16-s3[6]** | rs15-s2[4] | rs15-s3[3] |
| 629 | LL3[126] | rs16-s4[6] | rs15-s5[5] | rs15-s4[7] | rs15-s5[6] | rs15-s1[5] | **rs16-s4[6]** | rs15-s3[4] |
| 630 | LL4[126] | rs16-s5[6] | rs15-s5[6] | rs15-s4[8] | rs15-s5[7] | rs15-s1[6] | rs15-s2[5] | **rs16-s5[6]** |
| 631 | LL0[127] | rs16-s1[7] | rs15-s5[7] | **rs16-s1[7]** | rs15-s5[8] | rs15-s1[7] | rs15-s2[6] | rs15-s3[5] |
| 632 | LL1[127] | rs16-s2[7] | rs15-s5[8] | rs16-s5[1] | **rs16-s2[7]** | rs15-s1[8] | rs15-s2[7] | rs15-s3[6] |
| 633 | LL2[127] | rs16-s3[7] | rs16-s5[1] | rs16-s5[2] | rs16-s1[1] | **rs16-s3[7]** | rs15-s2[8] | rs15-s3[7] |
| 634 | LL3[127] | rs16-s4[7] | rs16-s5[2] | rs16-s5[3] | rs16-s1[2] | rs16-s2[1] | **rs16-s4[7]** | rs15-s3[8] |
| 635 | LL4[127] | rs16-s5[7] | rs16-s5[3] | rs16-s5[4] | rs16-s1[3] | rs16-s2[2] | rs16-s3[1] | **rs16-s5[7]** |
| 636 | LL0[128] | rs16-s1[8] | rs16-s5[4] | **rs16-s1[8]** | rs16-s1[4] | rs16-s2[3] | rs16-s3[2] | rs16-s4[1] |
| 637 | LL1[128] | rs16-s2[8] | rs16-s5[5] | rs16-s5[5] | **rs16-s2[8]** | rs16-s2[4] | rs16-s3[3] | rs16-s4[2] |
| 638 | LL2[128] | rs16-s3[8] | rs16-s5[6] | rs16-s5[6] | rs16-s1[5] | **rs16-s3[8]** | rs16-s3[4] | rs16-s4[3] |
| 639 | LL3[128] | rs16-s4[8] | rs16-s5[7] | rs16-s5[7] | rs16-s1[6] | rs16-s2[5] | **rs16-s4[8]** | rs16-s4[4] |
| 640 | LL4[128] | rs16-s5[8] | rs16-s5[8] | rs16-s5[8] | rs16-s1[7] | rs16-s2[6] | rs16-s3[5] | **rs16-s5[8]** |

Although there has been a focus on OTL 4.4 (i.e. OTU4 frames over four 28 G physical lanes), as noted above, other OTLs are possible in which there may be a different number of physical and logical lanes, and/or the physical and logical lanes may be rated to a speed different from that described. More generally, any suitable implementation in which data for transmission is at least partially clustered with sequential bits belonging to the same symbol is possible and is within the scope of this disclosure. Additionally, or alternatively, any suitable implementation in which data portions are mixed without mixing any data portion containing FAS information is possible and is within the scope of this disclosure.

OTL for Receiving OTN Frames

The OTLs described above with reference to FIGS. 11-16 have been described with a focus on transmitting OTN frames. However, it is to be understood that the scope of this disclosure includes a complementary apparatus and method for receiving OTN frames. Data can be received over one or more physical lanes and processed in a complementary manner. For instance, for each physical lane, a demultiplexer performs bit de-interleaving of data from the physical lane to logical lanes corresponding to the physical lane.

Note that the de-interleaved data would include clusters of sequential bits of different symbols due to the demultiplexer performing the bit de-interleaving of data. However, according to an embodiment of this disclosure, recovery circuitry recovers the data by mixing the de-interleaved data in order to achieve contiguous bits for each symbol. Thus, the original OTN frames can be recovered. Additionally, or alternatively, the recovery circuitry mixes the de-interleaved data without mixing any data portion containing FAS information, as the FAS information should not be mixed if its location has not been manipulated by the transmitting OTL.

In some implementations, the recovery circuitry is configured for mixing the de-interleaved data as a function of where the FAS information is located. Such mixing may for example be complementary to the allocation described above with reference to FIGS. 12 and 13, or the allocation described above with reference FIGS. 15 and 16. In some implementations, the recovery circuitry is configured for identifying each logical lane by using LLM information and for deskewing and reordering the logical lanes for reassembling the original frame.

Clauses

Additional aspects are defined by the following clauses:

Clause 1. A method for transmitting data over a communication channel having at least one physical lane for transmitting data, the method comprising:

for each physical lane, allocating data in logical lanes corresponding to the physical lane; and for each physical lane, bit-interleaving the data from the logical lanes corresponding to the physical lane into interleaved data for transmission over the physical lane;

wherein, for each physical lane, the allocating is executed such that the interleaved data for transmission over the physical lane has clusters of sequential bits of a same symbol.

Clause 2. The method of Clause 1, wherein the method is for transmitting data frames each having a plurality of data portions, each data portion comprising at least one symbol, the method further comprising:

initially distributing each data portion in round robin to one of the logical lanes;

wherein, for each physical lane, the allocating is subsequently executed by mixing the data portions such that the interleaved data for transmission over the physical lane has clusters of sequential bits of a same symbol.

Clause 3. The method of Clause 2, comprising:

performing lane rotation on each frame boundary such that sequential frames differ in terms of how the data portions are distributed to the logical lanes.

Clause 4. The method of Clause 2 or Clause 3, comprising:

for each physical lane, mixing the data portions without mixing any data portion containing FAS (Frame Alignment Signal) information.

Clause 5. The method of Clause 4, comprising:

mixing the data portions as a function of where the FAS information is located.

Clause 6. The method of Clause 4, comprising:

for each physical lane, reducing occurrence of sequential bits of different symbols in the interleaved data for transmission without manipulating placement of any bits corresponding to the FAS information.

Clause 7. The method of any one of Clause 2 to Clause 6, wherein the communication channel has four physical lanes for transmitting data, the method comprising:

distributing each data portion in round robin to one of twenty logical lanes, the twenty logical lanes comprising four sets of five logical lanes with each set corresponding to a respective one of the physical lanes;

for each physical lane, bit-interleaving data from the five logical lanes corresponding to the physical lane.

Clause 8. The method of Clause 7, comprising transmitting data frames having 1020 16-byte data portions.

Clause 9. The method of Clause 8, comprising:

for each physical lane, allocating the data in the five logical lanes corresponding to the physical lane in accordance with Table 4, column "OTL4.4 of FIG. 11" or Table 5, column "OTL4.4 of FIG. 11".

Clause 10. The method of Clause 8, comprising:

for each physical lane, allocating the data in the five logical lanes corresponding to the physical lane in accordance with Table 6, column "OTL4.4 of FIG. 14" or Table 7, column "OTL4.4 of FIG. 14".

Clause 11. The method of any one of Clause 2 to Clause 6, wherein the communication channel has ten physical lanes for transmitting data, the method comprising:

distributing each data portion in round robin to one of twenty logical lanes, the twenty logical lanes comprising ten sets of two logical lanes with each set corresponding to a respective one of the physical lanes;

for each physical lane, bit-interleaving data from the two logical lanes corresponding to the physical lane.

Clause 12. The method of Clause 11, comprising transmitting data frames having 1020 16-byte data portions.

Additional aspects are defined by the following clauses:

Clause 13. A method for receiving data over a communication channel having at least one physical lane for receiving data, the method comprising:

for each physical lane, bit de-interleaving data from the physical lane to logical lanes corresponding to the physical lane thereby generating de-interleaved data in each logical lane, wherein the de-interleaved data has clusters of sequential bits of different symbols;

recovering the data by mixing the de-interleaved data in order to achieve contiguous bits for each symbol.

Clause 14. The method of Clause 13, comprising:

identifying each logical lane by using LLM (Logical Lane Marker) information; and deskewing and reordering the logical lanes for reassembling an original frame.

Clause 15. The method of Clause 13 or Clause 14, wherein the communication channel has four physical lanes for receiving data, and wherein the logical lanes comprises four sets of five logical lanes with each set corresponding to a respective one of the physical lanes.

Additional aspects are defined by the following clauses:

Clause 16. A chip comprising an apparatus configured for implementing the method of any one of Clause 1 to Clause 12 for transmitting data over physical lanes of an OTN backplane.

Clause 17. The chip of Clause 16, further comprising an apparatus configured for implementing the method of any one of Clause 13 to Clause 15 for receiving data over the physical lanes of the OTN backplane.

Clause 18. The chip of Clause 16 or Clause 17, wherein the chip is an electrical chip.

Additional aspects are defined by the following clauses:

Clause 19. A method for transmitting data over a communication channel having at least one physical lane for transmitting data, the method comprising:

for each physical lane, allocating data in logical lanes corresponding to the physical lane; and for each physical lane, bit-interleaving the data from the logical lanes corresponding to the physical lane into interleaved data for transmission over the physical lane;

wherein, for each physical lane, the allocating is executed by mixing data portions without mixing any data portion containing FAS (Frame Alignment Signal) information.

Clause 20. The method of Clause 19, comprising mixing data portions as a function of where the FAS information is located.

Additional aspects are defined by the following clauses:

Clause 21. A method for receiving data over a communication channel having at least one physical lane for receiving data, the method comprising:

for each physical lane, bit de-interleaving data from the physical lane to logical lanes corresponding to the physical lane thereby generating de-interleaved data in each logical lane;

recovering the data by mixing the de-interleaved data without mixing any data portion containing FAS (Frame Alignment Signal) information.

Clause 22. The method of Clause 19, comprising mixing the de-interleaved data as a function of where the FAS information is located.

Additional aspects are defined by the following clauses:

Clause 23. A chip comprising an apparatus configured for implementing the method of Clause 19 or Clause 20 for transmitting data over physical lanes of an OTN backplane.

Clause 24. The chip of Clause 23, further comprising an apparatus configured for implementing the method of Clause 21 or Clause 22 for receiving data over the physical lanes of the OTN backplane.

Clause 25. The chip of Clause 23 or Clause 24, wherein the chip is an electrical chip.

Numerous modifications and variations of the present disclosure are possible in light of the above teachings. It is therefore to be understood that within the scope of the appended claims, the present disclosure may be practised otherwise than as specifically described herein.

What is claimed is:

1. An OTL (Optical Channel Transport Lane) configured for transmitting data over a communication channel having at least one physical lane for transmitting data, the OTL comprising:

for each physical lane, allocation circuitry configured for allocating data in logical lanes corresponding to the physical lane; and for each physical lane, a multiplexer configured for bit-interleaving the data from the logical lanes corresponding to the physical lane into interleaved data for transmission over the physical lane;

wherein, for each physical lane, the allocation circuitry is configured for allocating the data such that the interleaved data for transmission over the physical lane has clusters of sequential bits of a same symbol.

2. The OTL of claim 1, wherein the OTL is configured for transmitting data frames each having a plurality of data portions, each data portion comprising at least one symbol, the OTL further comprising:

distribution circuitry coupled to all of the logical lanes, the distribution circuitry being configured for initially distributing each data portion in round robin to one of the logical lanes;

wherein, for each physical lane, the allocation circuitry is configured for subsequently allocating the data in the logical lanes corresponding to the physical lane by mixing the data portions such that the interleaved data for transmission over the physical lane has clusters of sequential bits of a same symbol.

3. The OTL of claim 2, wherein:

the distribution circuitry is further configured for performing lane rotation on each frame boundary such that sequential frames differ in terms of how the data portions are distributed to the logical lanes.

4. The OTL of claim 2, wherein for each physical lane, the allocation circuitry is configured for mixing the data portions without mixing any data portion containing FAS (Frame Alignment Signal) information.

5. The OTL of claim 4, wherein the allocation circuitry is configured for mixing the data portions as a function of where the FAS information is located.

6. The OTL of claim 4, wherein:

for each physical lane, the allocating circuitry is configured for reducing occurrence of sequential bits of different symbols in the interleaved data for transmission without manipulating placement of any bits corresponding to the FAS information.

7. The OTL of claim 2, wherein the communication channel has four physical lanes for transmitting data, and wherein:

the distribution circuitry is configured for distributing each data portion in round robin to one of twenty logical lanes, the twenty logical lanes comprising four sets of five logical lanes with each set corresponding to a respective one of the physical lanes;

for each physical lane, the multiplexor is configured for bit-interleaving data from the five logical lanes corresponding to the physical lane.

8. The OTL of claim 7, wherein the OTL is configured for transmitting data frames having 1020 16-byte data portions.

9. The OTL of claim 8, wherein:

for each physical lane, the allocation circuitry is configured for allocating the data in the five logical lanes corresponding to the physical lane in accordance with Table 4, column "OTL4.4 of FIG. 11" or Table 5, column "OTL4.4 of FIG. 11".

10. The OTL of claim 8, wherein:

for each physical lane, the allocation circuitry is configured for allocating the data in the five logical lanes corresponding to the physical lane in accordance with Table 6, column "OTL4.4 of FIG. 14" or Table 7, column "OTL4.4 of FIG. 14".

11. The OTL of claim 2, wherein the communication channel has ten physical lanes for transmitting data, and wherein:

the distribution circuitry is configured for distributing each data portion in round robin to one of twenty logical lanes, the twenty logical lanes comprising ten sets of two logical lanes with each set corresponding to a respective one of the physical lanes;

for each physical lane, the multiplexor is configured for bit-interleaving data from the two logical lanes corresponding to the physical lane.

12. The OTL of claim 11, wherein the OTL is configured for transmitting data frames having 1020 16-byte data portions.

13. An OTL (Optical Channel Transport Lane) configured for receiving data over a communication channel having at least one physical lane for receiving data, the OTL comprising:

for each physical lane, a demultiplexer for bit de-interleaving data from the physical lane to logical lanes corresponding to the physical lane thereby generating de-interleaved data in each logical lane, wherein the de-interleaved data has clusters of sequential bits of different symbols;

recovery circuitry for recovering the data by mixing the de-interleaved data in order to achieve contiguous bits for each symbol.

14. The OTL of claim 13, wherein the recovery circuitry is configured for:

identifying each logical lane by using LLM (Logical Lane Marker) information; and deskewing and reordering the logical lanes for reassembling an original frame.

15. The OTL of claim 13, wherein the communication channel has four physical lanes for transmitting data, and wherein the logical lanes comprises four sets of five logical lanes with each set corresponding to a respective one of the physical lanes.

16. An OTN (Optical Transport Network) system comprising:

an OTN backplane having physical lanes;

a first OTN device comprising an OTL (Optical Channel Transport Lane) according to claim 1 for transmitting data over the physical lanes of the OTN backplane.

17. The OTN system of claim 16, further comprising:

a second OTN device comprising an OTL according to claim 13 for receiving data over the physical lanes of the OTN backplane.

18. The OTN system of claim 17, wherein:

the second OTN device further comprises an OTL according to claim 1 for transmitting data over the physical lanes of the OTN backplane; and the first OTN device further comprises an OTL according to claim 13 for receiving data over the physical lanes of the OTN backplane.

19. An OTL (Optical Channel Transport Lane) configured for transmitting data over a communication channel having at least one physical lane for transmitting data, the OTL comprising:

for each physical lane, allocation circuitry configured for allocating data in logical lanes corresponding to the physical lane, the data comprising data portions containing FAS (Frame Alignment Signal) information and data portions devoid of FAS information; and for each physical lane, a multiplexer configured for bit-interleaving the data from the logical lanes corresponding to the physical lane into interleaved data for transmission over the physical lane;

wherein, for each physical lane, the allocation circuitry is configured for mixing the data portions devoid of FAS information without mixing the data portions containing FAS information.

20. The OTL of claim 19, wherein the allocation circuitry is configured for mixing the data portions devoid of FAS information as a function of where the FAS information is located in the data.

21. An OTL (Optical Channel Transport Lane) configured for receiving data over a communication channel having at least one physical lane for receiving data, the OTL comprising:

for each physical lane, a demultiplexer for bit de-interleaving data from the physical lane to logical lanes corresponding to the physical lane thereby generating de-interleaved data in each logical lane, the de-interleaved data comprising data portions containing FAS (Frame Alignment Signal) information and data portions devoid of FAS information;

recovery circuitry for recovering the data by mixing the data portions devoid of FAS information to achieve contiguous bits for symbols without mixing the portions containing FAS information.

22. The OTL of claim 21, wherein the recovery circuitry is configured for mixing the data portions devoid of FAS information as a function of where the FAS information is located in the de-interleaved data.

23. An OTN (Optical Transport Network) system comprising:

an OTN backplane having physical lanes;

a first OTN device comprising an OTL (Optical Channel Transport Lane) according to claim 19 for transmitting data over the physical lanes of the OTN backplane.

24. The OTN system of claim 23, further comprising:

a second OTN device comprising an OTL according to claim 21 for receiving data over the physical lanes of the OTN backplane.

25. The OTN system of claim 24, wherein:

the second OTN device further comprises an OTL according to claim 19 for transmitting data over the physical lanes of the OTN backplane; and the first OTN device further comprises an OTL according to claim 21 for receiving data over the physical lanes of the OTN backplane.

26. An OTL (Optical Channel Transport Lane) configured for transmitting data over a communication channel having at least one physical lane for transmitting data, the OTL comprising:

for each physical lane, allocation means for allocating data in logical lanes corresponding to the physical lane; and for each physical lane, means for bit-interleaving the data from the logical lanes corresponding to the physical lane into interleaved data for transmission over the physical lane;

wherein, for each physical lane, the allocation means is configured for allocating the data such that the interleaved data for transmission over the physical lane has clusters of sequential bits of a same symbol;

wherein, for each physical lane, the allocation means is configured for mixing data portions without mixing any data portion containing FAS (Frame Alignment Signal) information.

* * * * *